(12) United States Patent
Vegesna et al.

(10) Patent No.: US 12,341,687 B2
(45) Date of Patent: **\*Jun. 24, 2025**

(54) RELIABLE FABRIC CONTROL PROTOCOL EXTENSIONS FOR DATA CENTER NETWORKS WITH FAILURE RESILIENCE

(71) Applicant: Microsoft Technology Licensing, LLC, Redmond, WA (US)

(72) Inventors: Srihari Raju Vegesna, San Jose, CA (US); Narendra Jayawant Gathoo, San Jose, CA (US); Pradeep Sindhu, Los Altos Hills, CA (US); Jean-Marc Frailong, Rancho Mirage, CA (US); Gopesh Goyal, Cupertino, CA (US); Suresh Vemula, Milpitas, CA (US); John David Huber, San Diego, CA (US); Chetan Ambalal Shah, Milpitas, CA (US)

(73) Assignee: Microsoft Technology Licensing, LLC, Redmond, WA (US)

( \* ) Notice: Subject to any disclaimer, the term of this patent is extended or adjusted under 35 U.S.C. 154(b) by 1050 days.

This patent is subject to a terminal disclaimer.

(21) Appl. No.: 17/303,900

(22) Filed: Jun. 10, 2021

(65) Prior Publication Data

US 2021/0297343 A1 Sep. 23, 2021

Related U.S. Application Data

(63) Continuation-in-part of application No. 16/147,070, filed on Sep. 28, 2018, now Pat. No. 11,178,262.
(Continued)

(51) Int. Cl.
*H04L 45/00* (2022.01)
*H04L 43/16* (2022.01)
(Continued)

(52) U.S. Cl.
CPC ............. *H04L 45/38* (2013.01); *H04L 43/16* (2013.01); *H04L 45/24* (2013.01); *H04L 47/2466* (2013.01); *H04L 47/624* (2013.01)

(58) Field of Classification Search
CPC ..... H04L 12/4633; H04L 45/16; H04L 45/42; H04L 45/64; H04L 47/15; H04L 47/18;
(Continued)

(56) References Cited

U.S. PATENT DOCUMENTS

| 4,872,157 A | 10/1989 | Hemmady |
| 4,872,159 A | 10/1989 | Hemmady et al. |

(Continued)

FOREIGN PATENT DOCUMENTS

| CN | 102123052 A | 7/2011 |
| CN | 103067291 A | 4/2013 |

(Continued)

OTHER PUBLICATIONS

Non-Final Office Action mailed on Apr. 5, 2024, in U.S. Appl. No. 17/304,654, 19 pages.
(Continued)

*Primary Examiner* — Nizam U Ahmed
(74) *Attorney, Agent, or Firm* — Alleman Hall & Tuttle LLP

(57) ABSTRACT

A fabric control protocol (FCP) is a data transmission protocol that enables spraying of individual packets for a given packet flow across a data center from an ingress interface of the source data processing unit (DPU) across a plurality of parallel data paths of a logical tunnel in the network fabric to the egress interface of the destination DPU. The FCP has congestion control mechanisms used to determine a degree of congestion at the egress interface of the destination DPU and to modify a send window size at the source DPU based on the degree of congestion. Reliable
(Continued)

FCP (rFCP) extensions provide reliability enhancements and improved failure resilience within the data center. The rFCP extensions provide an unsolicited mode for low latency operation with enhanced reliability mechanisms. The rFCP extensions provide failure resilience mechanisms to identify and avoid failed paths among multiple parallel data paths within the logical tunnel.

22 Claims, 21 Drawing Sheets

Related U.S. Application Data

(60) Provisional application No. 63/070,114, filed on Aug. 25, 2020, provisional application No. 63/037,404, filed on Jun. 10, 2020, provisional application No. 62/638,788, filed on Mar. 5, 2018, provisional application No. 62/566,060, filed on Sep. 29, 2017.

(51) Int. Cl.
 *H04L 45/24* (2022.01)
 *H04L 47/2466* (2022.01)
 *H04L 47/62* (2022.01)

(58) Field of Classification Search
 CPC ......... H04L 47/52; H04L 49/25; H04L 69/26; H04L 69/324; H04L 45/38; H04L 43/16; H04L 45/24; H04L 47/2466; H04L 47/624; H04L 43/0847
 USPC ....................................................... 370/231
 See application file for complete search history.

(56) References Cited

U.S. PATENT DOCUMENTS

| | | |
|---|---|---|
| 5,301,324 A | 4/1994 | Dewey et al. |
| 5,812,549 A | 9/1998 | Sethu |
| 5,828,860 A | 10/1998 | Miyaoku et al. |
| 6,021,473 A | 2/2000 | Davis et al. |
| 6,055,579 A | 4/2000 | Goyal et al. |
| 6,314,491 B1 | 11/2001 | Freerksen et al. |
| 6,526,022 B1 | 2/2003 | Chiu |
| 6,553,030 B2 | 4/2003 | Ku et al. |
| 6,842,906 B1 | 1/2005 | Bowman-Amuah |
| 6,901,451 B1 | 5/2005 | Miyoshi et al. |
| 6,901,500 B1 | 5/2005 | Hussain |
| 6,990,063 B1 | 1/2006 | Lenoski et al. |
| 6,993,630 B1 | 1/2006 | Williams et al. |
| 7,035,914 B1 | 4/2006 | Payne et al. |
| 7,058,009 B1 | 6/2006 | Skirmont et al. |
| 7,102,999 B1 | 9/2006 | Sindhu et al. |
| 7,275,103 B1 | 9/2007 | Thrasher et al. |
| 7,289,436 B2 | 10/2007 | Schaller et al. |
| 7,289,513 B1 | 10/2007 | Medved et al. |
| 7,289,964 B1 | 10/2007 | Bowman-Amuah et al. |
| 7,342,887 B1 | 3/2008 | Sindhu |
| 7,480,304 B2 | 1/2009 | Yeh et al. |
| 7,483,370 B1 | 1/2009 | Dayal et al. |
| 7,486,678 B1 | 2/2009 | Devanagondi et al. |
| 7,623,524 B2 | 11/2009 | Muthukrishnan et al. |
| 7,633,861 B2 | 12/2009 | Willhite et al. |
| 7,664,110 B1 | 2/2010 | Lovett et al. |
| 7,733,781 B2 | 6/2010 | Petersen |
| 7,738,452 B1 | 6/2010 | O'Rourke et al. |
| 7,802,001 B1 | 9/2010 | Petry et al. |
| 7,822,731 B1 | 10/2010 | Yu et al. |
| 7,843,907 B1 | 11/2010 | Abou-Emara et al. |
| 7,965,624 B2 | 6/2011 | Ripa et al. |
| 8,345,675 B1 | 1/2013 | Raghunath |
| 8,386,540 B1 | 2/2013 | McAlister et al. |
| 8,560,757 B2 | 10/2013 | Pangborn et al. |
| 8,565,218 B2 | 10/2013 | Sharma |
| 8,582,440 B2 | 11/2013 | Ofelt et al. |
| 8,599,863 B2 | 12/2013 | Davis |
| 8,625,427 B1 | 1/2014 | Terry et al. |
| 8,689,049 B2 | 4/2014 | Ziegler et al. |
| 8,737,410 B2 | 5/2014 | Davis et al. |
| 8,798,077 B2 | 8/2014 | Mehra et al. |
| 8,811,183 B1 | 8/2014 | Anand |
| 8,848,728 B1 | 9/2014 | Revah et al. |
| 8,850,101 B2 | 9/2014 | Pangborn et al. |
| 8,850,125 B2 | 9/2014 | Pangborn et al. |
| 8,854,953 B2 | 10/2014 | Enyedi |
| 8,918,631 B1 | 12/2014 | Kumar et al. |
| 8,937,865 B1 | 1/2015 | Kumar et al. |
| 8,953,441 B2 | 2/2015 | Nakil |
| 8,966,152 B2 | 2/2015 | Bouchard et al. |
| 9,065,860 B2 | 6/2015 | Pangborn et al. |
| 9,118,984 B2 | 8/2015 | DeCusatis et al. |
| 9,154,376 B2 | 10/2015 | Aziz et al. |
| 9,225,628 B2 | 12/2015 | Zahavi |
| 9,262,225 B2 | 2/2016 | Davis et al. |
| 9,282,384 B1 | 3/2016 | Graves |
| 9,294,304 B2 | 3/2016 | Sindhu |
| 9,294,398 B2 | 5/2016 | DeCusatis et al. |
| 9,369,408 B1 | 6/2016 | Raghavan et al. |
| 9,405,550 B2 | 8/2016 | Biran et al. |
| 9,565,114 B1 | 2/2017 | Kabbani et al. |
| 9,569,366 B2 | 2/2017 | Pangborn et al. |
| 9,632,936 B1 | 4/2017 | Zuckerman |
| 9,660,897 B1 | 5/2017 | Gredler |
| 9,800,495 B2 | 10/2017 | Lu et al. |
| 9,853,901 B2 | 12/2017 | Kampmann et al. |
| 9,866,427 B2 * | 1/2018 | Yadav .................. H04L 41/08 |
| 9,876,735 B2 | 1/2018 | Davis et al. |
| 9,946,671 B1 | 4/2018 | Tawri et al. |
| 10,003,552 B2 | 6/2018 | Kumar et al. |
| 10,135,731 B2 | 11/2018 | Davis et al. |
| 10,140,245 B2 | 11/2018 | Davis et al. |
| 10,218,629 B1 | 2/2019 | An et al. |
| 10,304,154 B2 | 5/2019 | Appu et al. |
| 10,387,179 B1 | 8/2019 | Hildebrant et al. |
| 10,425,707 B2 | 9/2019 | Sindhu et al. |
| 10,540,288 B2 | 1/2020 | Noureddine et al. |
| 10,565,112 B2 | 2/2020 | Noureddine et al. |
| 10,637,685 B2 | 4/2020 | Goel et al. |
| 10,645,187 B2 | 5/2020 | Goyal et al. |
| 10,659,254 B2 | 5/2020 | Sindhu et al. |
| 10,686,729 B2 | 6/2020 | Sindhu et al. |
| 10,725,825 B2 | 7/2020 | Sindhu et al. |
| 10,841,245 B2 | 11/2020 | Gray et al. |
| 10,904,367 B2 | 1/2021 | Goel et al. |
| 10,965,586 B2 | 3/2021 | Goel et al. |
| 11,070,474 B1 | 7/2021 | Jain |
| 11,165,691 B1 | 11/2021 | Kompella |
| 11,178,262 B2 | 11/2021 | Goel et al. |
| 11,412,076 B2 | 8/2022 | Goel et al. |
| 11,601,359 B2 | 3/2023 | Goel et al. |
| 11,934,964 B2 | 3/2024 | Goyal |
| 2002/0015387 A1 | 2/2002 | Houh |
| 2002/0049859 A1 | 4/2002 | Bruckert et al. |
| 2002/0075862 A1 | 6/2002 | Mayes |
| 2002/0094151 A1 | 7/2002 | Li et al. |
| 2002/0118415 A1 | 8/2002 | Dasylva et al. |
| 2002/0126634 A1 | 9/2002 | Mansharamani et al. |
| 2002/0126671 A1 | 9/2002 | Ellis et al. |
| 2003/0043798 A1 | 3/2003 | Pugel |
| 2003/0091271 A1 | 5/2003 | Dragone |
| 2003/0229839 A1 | 12/2003 | Wang et al. |
| 2004/0236912 A1 | 11/2004 | Glasco |
| 2005/0073963 A1 | 4/2005 | Goodfellow et al. |
| 2005/0108444 A1 | 5/2005 | Flauaus et al. |
| 2005/0166086 A1 | 7/2005 | Watanabe |
| 2006/0029323 A1 | 2/2006 | Nikonov et al. |
| 2006/0056406 A1 | 3/2006 | Bouchard et al. |
| 2006/0067273 A1 * | 3/2006 | Suman .................. H04W 80/00 370/331 |
| 2006/0112226 A1 | 5/2006 | Hady et al. |
| 2006/0277421 A1 | 12/2006 | Balestriere |
| 2007/0030807 A1 | 2/2007 | Gummalla |
| 2007/0036072 A1 | 2/2007 | Raj et al. |

(56) References Cited

U.S. PATENT DOCUMENTS

| | | |
|---|---|---|
| 2007/0073966 A1 | 3/2007 | Corbin |
| 2007/0172235 A1 | 7/2007 | Snider et al. |
| 2007/0192545 A1 | 8/2007 | Gara et al. |
| 2007/0198656 A1 | 8/2007 | Mazzaferi et al. |
| 2007/0255906 A1 | 11/2007 | Handgen et al. |
| 2008/0002702 A1 | 1/2008 | Bajic |
| 2008/0138067 A1 | 6/2008 | Beshai |
| 2008/0244231 A1 | 10/2008 | Kunze et al. |
| 2008/0253294 A1 | 10/2008 | Ripa et al. |
| 2009/0024836 A1 | 1/2009 | Shen et al. |
| 2009/0046576 A1 | 2/2009 | Shand et al. |
| 2009/0046587 A1 | 2/2009 | Kothari |
| 2009/0083263 A1 | 3/2009 | Felch et al. |
| 2009/0135739 A1 | 5/2009 | Hoover et al. |
| 2009/0135832 A1 | 5/2009 | Fan et al. |
| 2009/0154391 A1 | 6/2009 | Wittenschlaeger |
| 2009/0228890 A1 | 9/2009 | Vaitovirta et al. |
| 2009/0234987 A1 | 9/2009 | Lee et al. |
| 2009/0285228 A1 | 11/2009 | Bagepalli et al. |
| 2009/0303880 A1 | 12/2009 | Maltz et al. |
| 2009/0310610 A1 | 12/2009 | Sandstrom |
| 2010/0061257 A1 | 3/2010 | Kitawaki |
| 2010/0061391 A1 | 3/2010 | Sindhu et al. |
| 2010/0318725 A1 | 12/2010 | Kwon |
| 2011/0289179 A1 | 1/2011 | Pekcan et al. |
| 2011/0055827 A1 | 3/2011 | Lin et al. |
| 2011/0113184 A1 | 3/2011 | Chu |
| 2011/0170553 A1 | 7/2011 | Beecroft et al. |
| 2011/0173392 A1 | 7/2011 | Gara et al. |
| 2011/0202658 A1 | 8/2011 | Okuno et al. |
| 2011/0225594 A1 | 9/2011 | Iyengar et al. |
| 2011/0228783 A1 | 9/2011 | Flynn et al. |
| 2011/0238816 A1 | 9/2011 | Vohra et al. |
| 2011/0238923 A1 | 9/2011 | Hooker |
| 2011/0289180 A1 | 11/2011 | Sonnier et al. |
| 2011/0289279 A1 | 11/2011 | Sonnier et al. |
| 2012/0030431 A1 | 2/2012 | Anderson et al. |
| 2012/0036178 A1 | 2/2012 | Gavini et al. |
| 2012/0076153 A1 | 3/2012 | Manzella et al. |
| 2012/0096211 A1 | 4/2012 | Davis et al. |
| 2012/0163375 A1 | 6/2012 | Sindhu |
| 2012/0177047 A1 | 7/2012 | Roitshtein |
| 2012/0207165 A1 | 8/2012 | Davis |
| 2012/0254587 A1 | 10/2012 | Biran et al. |
| 2012/0314710 A1 | 12/2012 | Shikano |
| 2013/0003725 A1 | 1/2013 | Hendel et al. |
| 2013/0010636 A1 | 1/2013 | Regula |
| 2013/0024875 A1 | 1/2013 | Wang et al. |
| 2013/0028083 A1 | 1/2013 | Yoshida et al. |
| 2013/0060940 A1 | 3/2013 | Koponen et al. |
| 2013/0088971 A1 | 4/2013 | Anantharam et al. |
| 2013/0145375 A1 | 6/2013 | Kang |
| 2013/0191443 A1 | 7/2013 | Gan et al. |
| 2013/0258912 A1 | 10/2013 | Zimmerman et al. |
| 2013/0308597 A1 | 11/2013 | Murphy et al. |
| 2013/0330076 A1 | 12/2013 | Liboiron-Ladouceur et al. |
| 2013/0346789 A1 | 12/2013 | Brunel et al. |
| 2014/0023080 A1 | 1/2014 | Zhang et al. |
| 2014/0040909 A1 | 2/2014 | Winser et al. |
| 2014/0044128 A1 | 2/2014 | Suresh et al. |
| 2014/0059537 A1 | 2/2014 | Kamble et al. |
| 2014/0075085 A1 | 3/2014 | Schroder et al. |
| 2014/0161450 A1 | 6/2014 | Graves et al. |
| 2014/0187317 A1 | 7/2014 | Kohler et al. |
| 2014/0237156 A1 | 8/2014 | Regula et al. |
| 2014/0258479 A1 | 9/2014 | Tenginakai et al. |
| 2014/0269261 A1 | 9/2014 | D'souza et al. |
| 2014/0269351 A1 | 9/2014 | Graves et al. |
| 2014/0310467 A1 | 10/2014 | Shalf |
| 2014/0359044 A1 | 12/2014 | Davis et al. |
| 2015/0019702 A1 | 1/2015 | Kancherla |
| 2015/0037032 A1 | 2/2015 | Xu et al. |
| 2015/0043330 A1 | 2/2015 | Hu et al. |
| 2015/0117860 A1 | 4/2015 | Braun |
| 2015/0124826 A1 | 5/2015 | Edsall et al. |
| 2015/0143045 A1 | 5/2015 | Han et al. |
| 2015/0143073 A1 | 5/2015 | Winser et al. |
| 2015/0146526 A1 | 5/2015 | Kulkarni |
| 2015/0163171 A1 | 6/2015 | Sindhu et al. |
| 2015/0180603 A1 | 6/2015 | Darling et al. |
| 2015/0186313 A1 | 7/2015 | Sodhi et al. |
| 2015/0222533 A1 | 8/2015 | Birrittella et al. |
| 2015/0244617 A1 | 8/2015 | Nakil et al. |
| 2015/0256405 A1 | 9/2015 | Janardhanan et al. |
| 2015/0278148 A1 | 10/2015 | Sindhu |
| 2015/0278984 A1 | 10/2015 | Koker et al. |
| 2015/0280939 A1 | 10/2015 | Sindhu |
| 2015/0281128 A1 | 10/2015 | Sindhu |
| 2015/0324205 A1 | 11/2015 | Eisen et al. |
| 2015/0325272 A1 | 11/2015 | Murphy |
| 2015/0334034 A1 | 11/2015 | Smedley et al. |
| 2015/0334202 A1 | 11/2015 | Frydman et al. |
| 2015/0378776 A1 | 12/2015 | Lippett |
| 2015/0381528 A9 | 12/2015 | Davis et al. |
| 2016/0056911 A1 | 2/2016 | Ye et al. |
| 2016/0062800 A1 | 3/2016 | Stanfill et al. |
| 2016/0087885 A1 | 3/2016 | Tripathi |
| 2016/0092362 A1 | 3/2016 | Barron et al. |
| 2016/0154756 A1 | 6/2016 | Dodson et al. |
| 2016/0164625 A1 | 6/2016 | Gronvall et al. |
| 2016/0210159 A1 | 7/2016 | Wilson et al. |
| 2016/0212038 A1 | 7/2016 | Musiol |
| 2016/0239415 A1 | 8/2016 | Davis et al. |
| 2016/0241430 A1 | 8/2016 | Yadav et al. |
| 2016/0269278 A1 | 9/2016 | Gopalarathnam |
| 2016/0337723 A1 | 11/2016 | Graves |
| 2016/0364333 A1 | 12/2016 | Brown et al. |
| 2016/0364334 A1 | 12/2016 | Asaro et al. |
| 2016/0380885 A1 | 12/2016 | Jani et al. |
| 2017/0005921 A1 | 1/2017 | Liu et al. |
| 2017/0031719 A1 | 2/2017 | Clark et al. |
| 2017/0032011 A1 | 2/2017 | Song et al. |
| 2017/0060615 A1 | 3/2017 | Thakkar et al. |
| 2017/0061566 A1 | 3/2017 | Min et al. |
| 2017/0068639 A1 | 3/2017 | Davis et al. |
| 2017/0163569 A1 | 6/2017 | Koganti |
| 2017/0187632 A1 | 6/2017 | Ko et al. |
| 2017/0235581 A1 | 8/2017 | Nickolls et al. |
| 2017/0265220 A1 | 9/2017 | Andreoli-Fang et al. |
| 2017/0279708 A1* | 9/2017 | Liu .............. H04L 45/02 |
| 2017/0286143 A1 | 10/2017 | Wagner et al. |
| 2017/0286157 A1 | 10/2017 | Hasting et al. |
| 2017/0346766 A1 | 11/2017 | Dutta |
| 2018/0011739 A1 | 1/2018 | Pothula et al. |
| 2018/0024771 A1 | 1/2018 | Miller et al. |
| 2018/0115494 A1 | 4/2018 | Bhatia et al. |
| 2018/0152317 A1 | 5/2018 | Chang |
| 2018/0183673 A1 | 6/2018 | Iyengar |
| 2018/0239702 A1 | 8/2018 | Farmahini Farahani et al. |
| 2018/0241688 A1 | 8/2018 | Williams, Jr. |
| 2018/0262392 A1 | 9/2018 | White et al. |
| 2018/0287818 A1 | 10/2018 | Goel et al. |
| 2018/0287858 A1 | 10/2018 | Flajslik |
| 2018/0287965 A1 | 10/2018 | Sindhu et al. |
| 2018/0288505 A1 | 10/2018 | Sindhu et al. |
| 2018/0293168 A1 | 10/2018 | Noureddine et al. |
| 2018/0300928 A1 | 10/2018 | Koker et al. |
| 2018/0307494 A1 | 10/2018 | Ould-Ahmed-Vall et al. |
| 2018/0307535 A1 | 10/2018 | Suzuki et al. |
| 2018/0322386 A1 | 11/2018 | Sridharan et al. |
| 2018/0357169 A1 | 12/2018 | Lai |
| 2019/0005176 A1 | 1/2019 | Illikkal et al. |
| 2019/0012278 A1 | 1/2019 | Sindhu et al. |
| 2019/0012350 A1 | 1/2019 | Sindhu et al. |
| 2019/0013965 A1 | 1/2019 | Sindhu et al. |
| 2019/0018806 A1 | 1/2019 | Koufaty et al. |
| 2019/0042292 A1 | 2/2019 | Palermo et al. |
| 2019/0042518 A1 | 2/2019 | Marolia et al. |
| 2019/0095333 A1 | 3/2019 | Heirman et al. |
| 2019/0102311 A1 | 4/2019 | Gupta et al. |
| 2019/0104057 A1 | 4/2019 | Goel et al. |
| 2019/0104206 A1 | 4/2019 | Goel et al. |
| 2019/0104207 A1 | 4/2019 | Goel et al. |
| 2019/0158428 A1 | 5/2019 | Gray et al. |

(56) References Cited

U.S. PATENT DOCUMENTS

| | | | |
|---|---|---|---|
| 2019/0188079 A1 | 6/2019 | Kohli | |
| 2019/0243765 A1 | 8/2019 | Sindhu et al. | |
| 2019/0319871 A1 | 10/2019 | Indiresan et al. | |
| 2019/0363989 A1 | 11/2019 | Shalev et al. | |
| 2020/0021664 A1 | 1/2020 | Goyal et al. | |
| 2020/0021898 A1 | 1/2020 | Sindhu et al. | |
| 2020/0084155 A1 | 3/2020 | Song | |
| 2020/0119903 A1 | 4/2020 | Thomas et al. | |
| 2020/0133771 A1 | 4/2020 | Goyal et al. | |
| 2020/0145680 A1 | 5/2020 | Dikshit et al. | |
| 2020/0151101 A1 | 5/2020 | Noureddine et al. | |
| 2020/0159568 A1 | 5/2020 | Goyal et al. | |
| 2020/0159859 A1 | 5/2020 | Beckman et al. | |
| 2020/0162282 A1 | 5/2020 | Ashtaputre et al. | |
| 2020/0169513 A1 | 5/2020 | Goel et al. | |
| 2020/0183841 A1 | 6/2020 | Noureddine et al. | |
| 2020/0236052 A1 | 7/2020 | Srinivasan | |
| 2020/0259682 A1 | 8/2020 | Goel et al. | |
| 2020/0280462 A1 | 9/2020 | Sindhu et al. | |
| 2020/0314026 A1 | 10/2020 | Sindhu et al. | |
| 2020/0356414 A1 | 11/2020 | Sindhu et al. | |
| 2021/0097108 A1 | 4/2021 | Goyal et al. | |
| 2021/0176347 A1 | 6/2021 | Goel et al. | |
| 2021/0218665 A1 | 7/2021 | Goel et al. | |
| 2021/0297350 A1 | 9/2021 | Vegesna et al. | |
| 2021/0297351 A1 | 9/2021 | Vegesna et al. | |
| 2021/0320820 A1 | 10/2021 | Ruan et al. | |
| 2021/0399941 A1 | 12/2021 | Fang | |
| 2022/0103661 A1 | 3/2022 | Goel et al. | |
| 2023/0208748 A1 | 6/2023 | Goel et al. | |
| 2023/0269184 A1 | 8/2023 | Zemach | |
| 2023/0388222 A1 | 11/2023 | Sindhu | |

FOREIGN PATENT DOCUMENTS

| | | |
|---|---|---|
| CN | 104052618 A | 9/2014 |
| CN | 104521196 A | 4/2015 |
| CN | 104937892 A | 9/2015 |
| CN | 104954251 A | 9/2015 |
| CN | 105024844 A | 11/2015 |
| CN | 105814848 A | 7/2016 |
| CN | 107196854 A | 9/2017 |
| EP | 1079571 A2 | 2/2001 |
| EP | 1489796 A2 | 12/2004 |
| EP | 1501246 A2 | 1/2005 |
| EP | 2289206 A2 | 3/2011 |
| EP | 2928134 A2 | 10/2015 |
| WO | 2009114554 A2 | 9/2009 |
| WO | 2013184846 A1 | 12/2013 |
| WO | 2014178854 | 11/2014 |
| WO | 2015087474 A1 | 6/2015 |
| WO | 2016037262 A1 | 3/2016 |
| WO | 2019014268 A1 | 1/2019 |

OTHER PUBLICATIONS

Non-Final Office action mailed on Mar. 21, 2024, in U.S. Appl. No. 17/303,901, 26 pages.

First Office Action and Search Report, and translation thereof, from counterpart Chinese Application No. 201880062872.7 dated Oct. 8, 2021, 11 pp.

International Search Report and Written Opinion of International Application No. PCT/US2018/053586, mailed Jan. 17, 2019, 16 pages.

International Search Report and Written Opinion of International Application No. PCT/US2018/053591, mailed Jan. 17, 2019, 15 pp.

International Search Report and Written Opinion of International Application No. PCT/US2018/053597, mailed Jan. 17, 2019, 18 pages.

Notice of Allowance mailed on Aug. 2, 2024, in U.S. Appl. No. 17/303,901, 10 pages.

Notice of Allowance mailed on Jul. 15, 2024, in U.S. Appl. No. 18/175,376, 9 pages.

Notice of Allowance mailed on Jun. 12, 2024, in U.S. Appl. No. 17/303,887, 9 pages.

Notice of Allowance mailed on Jun. 17, 2024, in U.S. Appl. No. 16/774,941, 09 pages.

Notice of Allowance mailed on Jun. 26, 2024, in U.S. Appl. No. 17/454,731, 9 pages.

"Non-Final Office Action Issued in U.S. Appl. No. 17/454,731", Mailed Date: Jul. 20, 2023, 39 Pages.

"Non-Final Office Action Issued in U.S. Appl. No. 18/175,376", Mailed Date: Aug. 3, 2023, 22 Pages.

Zhang et al., "A LDP Fast Protection Switching Scheme for Concurrent Multiple Failures in MPLS Network," IEEE, 2009 International Conference on Multimedia Information Networking and Security, Nov. 18-20, 2009, pp. 259-262.

"QFX10000 Switches System Architecture," White Paper, Juniper Networks, Apr. 2015, 15 pp.

Adya et al., "Cooperative Task Management without Manual Stack Management," Proceedings of the 2002 Usenix Annual Technical Conference, Jun. 2002, 14 pp.

Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.

Alizadeh et al., "CONGA: Distributed Congestion-Aware Load Balancing for Datacenters," SIGCOMM '14 Proceedings of the 2014 ACM Conference on SIGCOMM, Aug. 17- 22, 2014, pp. 503-514.

Bakkum et al., "Accelerating SQL Database Operations on a GPU with CUDA," Proceedings of the 3rd Workshop on Genral-Purpose Computation on Graphics Processing Units, Mar. 14, 2010, 10 pp.

Banga et al., "Better operating system features for faster network servers," ACM Sigmetrics Performance Evaluation Review, vol. 26, Issue 3, Dec. 1998, 11 pp.

Barroso et al., "Attack of the killer Microseconds," Communications of the ACM, vol. 60, No. 4, Apr. 2017, 7 pp.

Benson et al., "MicroTE: Fine Grained Traffic Engineering for Data Centers," CoNEXT '11 Proceedings of the Seventh Conference on emerging Networking Experiments and Technologies Article No. 8, Dec. 6-9, 2011, 12 pp.

Benson et al., "Network Traffic Characteristics of Data Centers in the Wild," IMC '10 Proceedings of the 10th ACM SIGCOMM Conference on Internet Measurement, Nov. 1-30, 2010, pp. 267-280.

Deutsch, "Deflate Compressed Data Format Specification version 1.3," IETF Network Working Group, RFC 1951, May 1996, 15 pp.

Ford et al., "TCP Extensions for Multipath Operation with Multiple Addresses," Internet Engineering Task Force (IETF), RFC 6824, Jan. 2013, 64 pp.

Friedman et al., "Programming with Continuations," Technical Report 151, Nov. 1983, 14 pp.

Gay et al., "The nesC Language: A Holistic Approach to Networked Embedded Systems," accessed from http://nescc.sourceforge.net, last updated Dec. 14, 2004, 11 pp.

Halbwachs et al., "The Synchronous Data Flow Programming Language LUSTRE," Proceedings of the IEEE, vol. 79, No. 9, Sep. 1991, 16 pp.

Haynes et al., "Continuations and Coroutines," Technical Report No. 158, Jun. 1984, 19 pp.

Hewitt, "Viewing Control Structures as Patterns of Passing Messages," Massachusetts Institute of Technology, Artificial Intelligence Laboratory, Dec. 1976, 61 pp.

Hseush et al., Data Path Debugging: Data-Oriented Debugging for a Concurrent Programming Language, PADD '88 Proceedings of the 1988 ACM SIGPLAN and SIGOPS workshop on Parallel and distributed debugging, May 5-6, 1988, 12 pp.

Huang et al., "Erasure Coding in Windows Azure Storage," 2012 USENIX Annual Technical Conference, Jun. 13-15, 2012, 12 pp.

Hurson, "Advances in Computers, vol. 92," Jan. 13, 2014, Academic Press, XP055510879, 94-95 pp.

Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.

(56) References Cited

OTHER PUBLICATIONS

Kahn et al., "Actors as a Special Case of Concurrent Constraint Programming," ECOOP/OOPSLA '90 Proceedings, Oct. 21-25, 1990, 10 pp.

Kaminow, "Optical Integrated Circuits: A Personal Perspective," Journal of Lightwave Technology, vol. 26, No. 9, May 1, 2008, pp. 994-1004.

Kandula et al., "Dynamic Load Balancing Without Packet Reordering," SIGCOMM Computer Communication Review, vol. 37, No. 2, Apr. 2007, pp. 53-62.

Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.

Kelly et al., A Block Diagram Compiler, The Bell System Technical Journal, Dec. 7, 1960, 10 pp.

Kounavis et al., "Programming the data path in network processor-based routers," Software-Practice and Experience, Oct. 21, 2003, 38 pp.

Larus et al., "Using Cohort Scheduling to Enhance Server Performance," Usenix Annual Technical Conference, Jun. 2002, 12 pp.

Levis et al., "Tiny OS: An Operating System for Sensor Networks," Ambient Intelligence, Jan. 2005, 34 pp.

Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.

Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.

Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.

Schroeder et al., "Flash Reliability in Production: The Expected and the Unexpected," 14th USENIX Conference on File and Storage Technologies (FAST '16), Feb. 22-25, 2016, 15 pp.

U.S. Appl. No. 16/774,941, by Deepak Goel et al., filed Jan. 28, 2020.

U.S. Appl. No. 17/303,901, filed Jun. 10, 2021, naming inventors Vegesna et al.

U.S. Appl. No. 17/303,887, filed Jun. 9, 2021, naming inventors Vegesna et al.

U.S. Appl. No. 17/304,654, filed Jun. 24, 2021, naming inventors Ruan et al.

Varela et al., "The Salsa Programming Language 2.0.0alpha Release Tutorial," Tensselaer Polytechnic Institute, Nov. 2009, 52 pp.

Von Behren et al., "Why Events Are a Bad Idea (for high-concurrency servers)," Proceedings of HotOS IX, May 2003, 6 pp.

Wang et al., "A Spatial and Temporal Locality-Aware Adaptive Cache Design with Network Optimization for Tiled Many-Core Architectures," IEEE Transactions on Very Large Scale Integration (VLSI) Systems, vol. 25. No. 9, Sep. 2017, pp. 2419-2433.

Welsh et al., "SEDA: An Architecture for Well-Conditioned, Scalable Internet Services," Eighteenth Symposium on Operating Systems Principles, Oct. 21-24, 2001, 14 pp.

Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.

Prosecution History from U.S. Appl. No. 16/774,941, dated May 28, 2020 through Dec. 30, 2020, 41 pp.

Prosecution History from U.S. Appl. No. 16/147,070 dated Dec. 31, 2019 through Jul. 26, 2021, 271 pp.

Oh et al., "Feedback-Based Path Failure Detection and Buffer Blocking Protection for MPTCP," IEEE/ACM Transactions on Networking, vol. 24, No. 6, Dec. 2016, 12 pp.

Chen et al., "Data Center Congestion Management requirements; draft-yueven-tsvwg-dccm-requirements-01," TSVWG, Internet-Draft, Retrieved Jul. 7, 2021 from: https://tools.ietf.org/id/draft-yueven-tsvwg-dccm-requirements-01.html, Jul. 7, 2019, 7 pp.

U.S. Appl. No. 17/301,185, filed Mar. 2021, naming inventors Goel et al.

Allman et al., "TCP Congestion Control", IETF Network Working Group, RFC 5681, Sep. 2009, 18 pp.

Bensley et al., "Data Center TCP (DCTCP): TCP Congestion Control for Data Centers", IETF, RFC 8257, Oct. 2017, 17 pp.

"Transmission Control Protocol," Darpa Internet Program Protocol Specification, Information Sciences Institute, RFC 793, Sep. 1981, 91 pp.

Jacobson et al., "TCP Extensions for High Performance", IETF Network Working Group, RFC 1323, May 1992, 37 pp.

Stevens, "TCP Slow Start, Congestion Avoidance, Fast Retransmit and Fast Recovery Algorithms", IETF Network Working Group, RFC 2001, Jan. 1997, 6 pp.

Mathis et al., "TCP Selective Acknowledgment Options", IETF Network Working Group, RFC 2018, Oct. 1996, 12 pp.

Paxson et al.., "Known TCP Implementation Problems", IETF Network Working Group, RFC 2525, Mar. 1999, 61 pp.

Alizadeh et al., "Analysis of DCTCP: Stability, Convergence, and Fairness," Department of Electrical Engineering, Standford University, SIGMETRICS'11, Jun. 7-11, 2011, 14 pp.

Mittal et al., "Revisiting Network Support for RDMA", Department of Electrical Engineering, Standford University, SIGMETRICS, Jun. 21, 2018, 18 pp.

Cardwell et al., "BBR Congestion Control", IETF Draft, Jul. 3, 2017, 34 pp.

Cardwell et al., "BBR Congestion Control", IETF, Nov. 2016, 37 pp.

Notice of Allowance mailed on Dec. 4, 2023, in U.S. Appl. No. 18/175,376, 9 pages.

Notice of Allowance mailed on Dec. 18, 2023 in U.S. Appl. No. 17/454,731, 9 Pages.

Notice of Allowance mailed on Nov. 22, 2023 in U.S. Appl. No. 16/774,941, 9 Pages.

Notice of Allowance from U.S. Appl. No. 17/248,354, dated Apr. 12, 2022, 9 pp.

Non-Final Office Action mailed on Feb. 13, 2024, in U.S. Appl. No. 17/303,887, 21 pages.

Notice of Allowance mailed on Feb. 12, 2024, in U.S. Appl. No. 16/774,941, 02 pages.

Notice of Allowance mailed on Mar. 18, 2024, in U.S. Appl. No. 18/175,376, 9 pages.

Office Action from U.S. Appl. No. 17/248,354, dated Dec. 9, 2021, 11 pp.

Prosecution History from U.S. Appl. No. 16/147,099, dated Jan. 8, 2020 through Dec. 30, 2020, 41 pp.

Response to Office Action dated Dec. 9, 2021, from U.S. Appl. No. 17/248,354, filed Mar. 4, 2022, 3 pp.

U.S. Appl. No. 17/454,731, filed Nov. 12, 2021, naming inventors Goel et al.

"Non Final Office Action Issued in U.S. Appl. No. 16/774,941", Mailed Date: May 24, 2023, 18 Pages.

"Notice of Allowance Issued in U.S. Appl. No. 17/301,185", Mailed Date: Oct. 11, 2022, 9 Pages.

Notice of Allowance from U.S. Appl. No. 16/147,070, mailed Sep. 23, 2021, 11 pp.

* cited by examiner

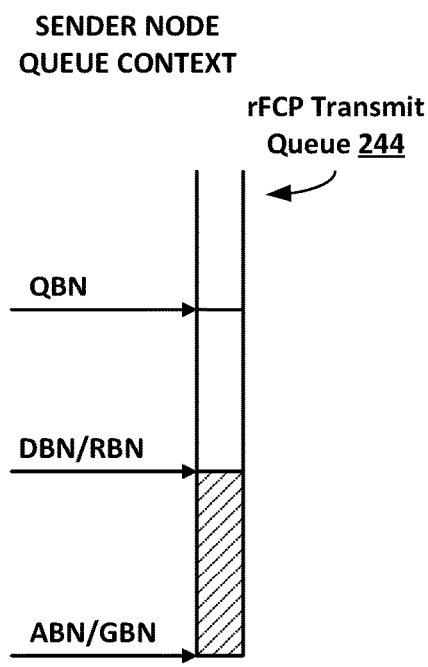 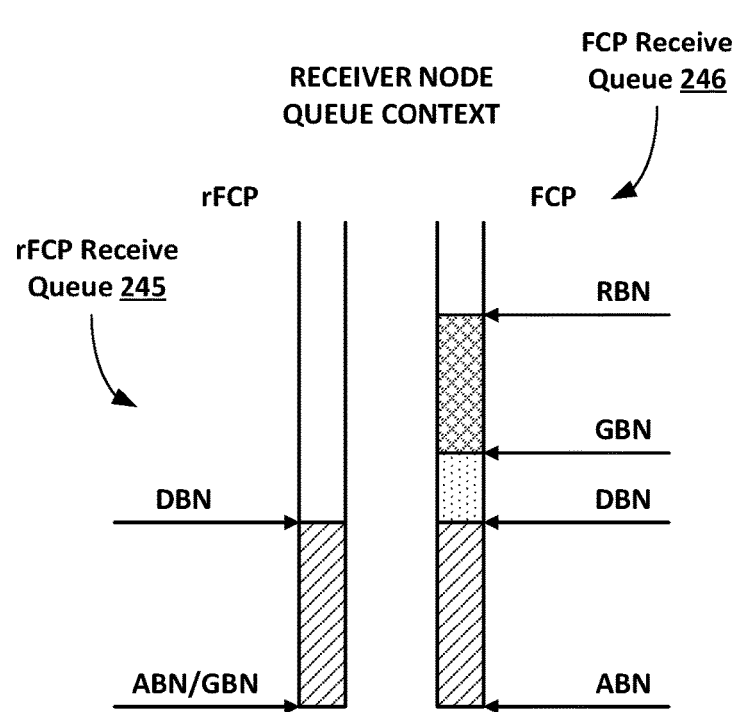
FIG. 11A
FIG. 11B

RELIABLE FABRIC CONTROL PROTOCOL EXTENSIONS FOR DATA CENTER NETWORKS WITH FAILURE RESILIENCE

This application is a continuation in-part of U.S. patent application Ser. No. 16/147,070, filed 28 Sep. 2018, which claims the benefit of U.S. Provisional Patent Application No. 62/638,788, filed 5 Mar. 2018 and U.S. Provisional Patent Application No. 62/566,060, filed 29 Sep. 2017, and claims the benefit of U.S. Provisional Patent Application No. 63/070,114, filed 25 Aug. 2020 and U.S. Provisional Patent Application No. 63/037,404, filed 10 Jun. 2020, the entire content of each application is incorporated herein by reference.

TECHNICAL FIELD

The invention relates to computer networks and, more particularly, data center networks.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems.

In most data centers, clusters of storage systems and application servers are interconnected via a high-speed network fabric provided by one or more tiers of physical network switches and routers. Data centers vary greatly in size, with some public data centers containing hundreds of thousands of servers, and are usually distributed across multiple geographies for redundancy. A typical data center network fabric includes multiple tiers of interconnected switches and routers. In current implementations, packets for a given packet flow between a source server and a destination server or storage system are always forwarded from the source to the destination along a single path through the routers and switches comprising the network fabric.

SUMMARY

Example implementations of a new data transmission protocol, referred to generally herein as a fabric control protocol (FCP), are described for use within a data center or other computing environment. As further described herein, the FCP is a data transmission protocol that may provide certain advantages in environments in which a network fabric provides full mesh interconnectivity between at least a set of servers such that any of the plurality of servers may communicate packet data for a given packet flow to any other of the plurality of servers using any of a number of parallel data paths within the network fabric.

In general, this disclosure describes the FCP having congestion control mechanisms used to determine a degree of congestion at an egress interface of a destination data processing unit (DPU) within a data center network fabric and modify a send window size at a source DPU within the network fabric based on the degree of congestion. As described herein, in some examples, the network fabric topology and functionality are constructed such that the egress interfaces are typically more congested than any other interface in the network fabric. In this way, detecting any congestion that may exist at each egress interface and modifying an amount of data-in-flight on the network fabric in response to the congestion will be sufficient to avoid congestion within the network fabric. The congestion control mechanisms may comprise any of a number of different types of mechanisms configured to dynamically and, in some examples, continuously determine, either directly or indirectly, the degree of congestion at the egress interface of each DPU in the network fabric. In some examples, the destination DPU may directly or indirectly determine the degree of congestion at the egress interface and communicate the degree of congestion back to each source DPU from which packets are received. In other examples, a source DPU may itself indirectly determine the degree of congestion at the egress interface of each destination DPU to which packets are to be sent.

Example implementations of the FCP enable spraying of individual packets for a given packet flow from an ingress interface of the source DPU across a plurality of parallel data paths of a logical tunnel in the network fabric to the egress interface of the destination DPU. As a further example, the FCP may provide end-to-end admission control mechanisms in which a sender node of the source DPU explicitly requests a receiver node of the destination DPU with the intention to transfer a certain number of bytes of payload data, and in response, the receiver node issues a grant based at least in part on the degree of congestion at the egress interface of the destination DPU. Moreover, the sender node of the source DPU modifies a send window size based on the degree of congestion at the egress interface of the destination DPU. The sender node may itself determine the degree of congestion at the egress interface, or the sender node may receive congestion control information in the grant messages that indicates the degree of congestion at the egress interface. The FCP may, however, encounter an additional round trip latency for the request-grant exchange before a data packet can be sent to the destination.

This disclosure further describes various reliable FCP (rFCP) extensions that provide reliability enhancements and improved failure resilience within a data center or other computing environment. The rFCP extensions refer to new fields and/or parameters added to standard FCP communications along with functionality for implementing operations associated with those fields and/or parameters. As described herein, DPUs execute the rFCP extensions to implement the instructions and/or operations of the rFCP extensions.

The various rFCP extensions described herein may provide certain technical advantages. As one example, the rFCP extension provides an unsolicited mode for low latency operation with enhanced reliability mechanisms. In the unsolicited mode of the rFCP extension, the explicit request-grant exchange is eliminated and replaced by a data packet-grant/ACK exchange between the sender node and the receiver node with the data packet acting as an implicit request. The rFCP extension uses send window-based congestion control mechanisms to mitigate the eliminated admission control mechanisms of the request-grant exchange. As described above, the sender node of the source DPU modifies a send window size based on the degree of congestion at the egress interface of the destination DPU. The sender node may itself determine the degree of congestion at the egress interface, or the sender node may receive congestion control information in the grant/ACK messages that indicates the degree of congestion at the egress interface.

As another example, the rFCP extension provides failure resilience mechanisms to identify and avoid failed paths among the multiple parallel data paths within a logical tunnel across the network fabric. The rFCP extension includes a retry mechanism that uses per tunnel packet sequence numbers to detect missing packets at a receiver node, and uses path numbers to identify potentially failed paths on which the missing packets were expected to be received at the receiver node. According to the retry mechanism, the receiver node sends a negative acknowledgement (NACK) for each detected missing packet on any path within the logical tunnel except for the potentially failed path on which the missing packet was expected to be received. Upon receipt of the NACK, the sender node retransmits the missing packet along any path within the logical tunnel except for the potentially failed path. In some scenarios, a number of failed paths within the logical tunnel may be used as congestion control information that indicates a degree of congestion at the egress interface of the destination DPU. For example, the sender node of the source DPU may modify the send window size based on the number of failed paths within the logical tunnel.

In one example, this disclosure is directed to a network system comprising a plurality of servers including a source server and a destination server; a network fabric comprising a plurality of core switches; and a plurality of data processing units (DPUs) including a source DPU coupled to the source server and a destination DPU coupled to the destination server, wherein the source DPU and the destination DPU are each executing a reliable fabric control protocol (rFCP) extension, and wherein the source DPU and the destination DPU are configured to establish a rFCP tunnel over a plurality of parallel data paths across the core switches included within the network fabric between the source DPU and the destination DPU. A sender node of the source DPU is configured to spray rFCP packets of a packet flow across the plurality of parallel data paths of the rFCP tunnel to a receiver node of the destination DPU by directing each of the rFCP packets to one of the parallel data paths, wherein the rFCP packets of the packet flow include packet sequence numbers that indicate an order of the rFCP packets; the receiver node is configured to, in response to receipt of at least a portion of the rFCP packets of the packet flow, detect a missing packet of the packet flow based on the packet sequence numbers of the received portion of the rFCP packets, and send a rFCP negative acknowledgment (NACK) message indicating the missing packet; and the sender node is configured to, in response to receipt of the rFCP NACK message, retransmit the missing packet of the packet flow to the receiver node.

In another example, this disclosure is directed to a method comprising establishing a reliable fabric control protocol (rFCP) tunnel over a plurality of parallel data paths between a source data processing unit (DPU) and a destination DPU connected by a network fabric having a plurality of core switches, wherein the source DPU is coupled to a source server and the destination DPU is coupled to a destination server, and wherein the source DPU and the destination DPU are each executing the rFCP extension; spraying, by a sender node of the source DPU, rFCP packets of a packet flow across the plurality of parallel data paths of the rFCP tunnel to a receiver node of the destination DPU by directing each of the rFCP packets to one of the parallel data paths, wherein the rFCP packets of the packet flow include packet sequence numbers that indicate an order of the rFCP packets; in response to receipt of at least a portion of the rFCP packets of the packet flow: detecting, by the receiver node, a missing packet of the packet flow based on the packet sequence numbers of the received portion of the rFCP packets, and sending, by the receiver node, a rFCP negative acknowledgment (NACK) message indicating the missing packet; and in response to receipt of the rFCP NACK message, retransmitting, by the sender node, the missing packet of the packet flow to the receiver node.

In a further example, this disclosure is directed to a computer-readable storage medium storing instructions that, when executed, cause one or more programmable processor to: establish a reliable fabric control protocol (rFCP) tunnel over a plurality of parallel data paths between a source data processing unit (DPU) and a destination DPU connected by a network fabric having a plurality of core switches, wherein the source DPU is coupled to a source server and the destination DPU is coupled to a destination server, and wherein the source DPU and the destination DPU are each executing the rFCP extension; spray, by a sender node of the source DPU, rFCP packets of a packet flow across the plurality of parallel data paths of the rFCP tunnel to a receiver node of the destination DPU by directing each of the rFCP packets to one of the parallel data paths, wherein the rFCP packets of the packet flow include packet sequence numbers that indicate an order of the rFCP packets; in response to receipt of at least a portion of the rFCP packets of the packet flow: detect, by the receiver node, a missing packet of the packet flow based on the packet sequence numbers of the received portion of the rFCP packets, and send, by the receiver node, a rFCP negative acknowledgment (NACK) message indicating the missing packet; and in response to receipt of the rFCP NACK message, retransmit, by the sender node, the missing packet of the packet flow to the receiver node.

The details of one or more examples are set forth in the accompanying drawings and the description below. Other features, objects, and advantages of the invention will be apparent from the description and drawings, and from the claims.

BRIEF DESCRIPTION OF DRAWINGS

FIG. 11A is a conceptual diagram illustrating an example of rFCP extension queue context at a sender node.

FIG. 11B is a conceptual diagram illustrating an example of rFCP extension queue context at a receiver node.

DETAILED DESCRIPTION

Figure 1:
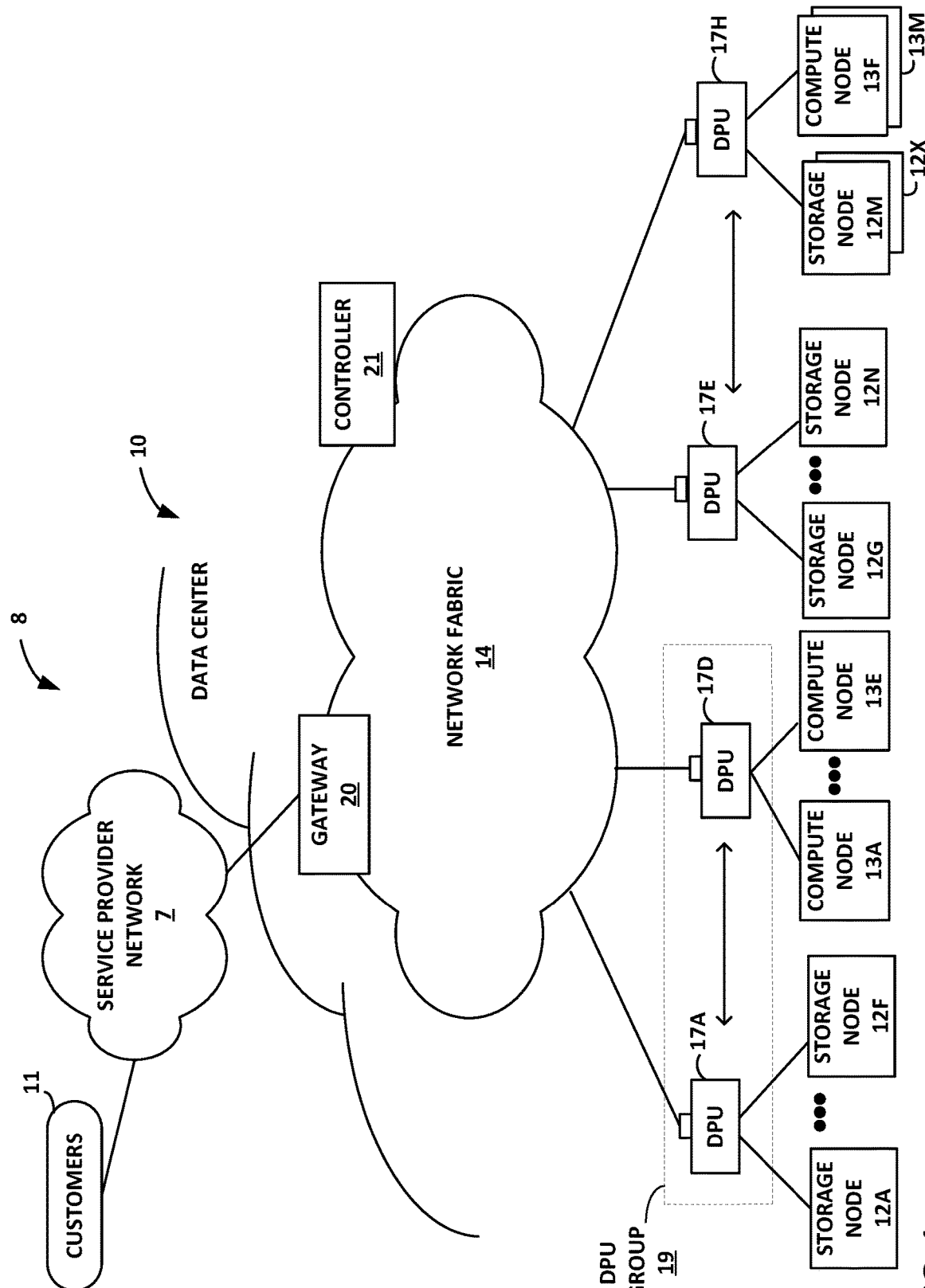
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. This disclosure describes a fabric control protocol (FCP) having congestion control mechanisms executed by data processing units (DPUs) 17 to determine a degree of congestion at an egress interface of a destination DPU within a network fabric 14 of data center 10 and modify a send window size at a source DPU within network fabric 14 based on the degree of congestion. This disclosure further describes reliable FCP (rFCP) extensions executed by DPUs 17 that provide reliability enhancements and improved failure resilience within data center 10. The rFCP extensions refer to new fields and/or parameters added to standard FCP communications along with functionality for implementing operations associated with those fields and/or parameters. DPUs 17 execute the rFCP extensions to implement the instructions and/or operations of the rFCP extensions. In the example of FIG. 1, various data structures and processing techniques are described with respect to DPUs 17 within data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. In other examples, service provider network 7 may be a data center wide-area network (DC WAN), private network or other type of network. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

Controller 21, such as a software-defined networking (SDN) controller, provides a high-level controller for configuring and managing the routing and switching infrastructure of data center 10. Controller 21 provides a logically and in some cases physically centralized controller for facilitating operation of one or more virtual networks within data center 10. In some examples, controller 21 may operate in response to configuration input received from a network administrator. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, data center 10 includes a set of storage nodes 12A-12X (collectively, "storage nodes 12") and a set of compute nodes 13A-13M (collectively, "compute nodes 13") interconnected via a high-speed network fabric 14. In some examples, storage nodes 12 and compute nodes 13 are arranged into multiple different groups, each including any number of nodes. Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

As illustrated, each of storage nodes 12 and compute nodes 13 is coupled to network fabric 14 by one of DPUs 17A-17H (collectively, "DPUs 17") for processing streams of information, such as network packets or storage packets. In example implementations, DPUs 17 are configurable to operate in a standalone network appliance having one or more DPUs. For example, DPUs 17 may be arranged into multiple different DPU groups 19, each including any number of DPUs. In other examples, each DPU may be implemented as a component (e.g., electronic chip) within a device, such as a compute node, storage node, or application server, and may be deployed on a motherboard of the device or within a removable card, such as a storage and/or network interface card.

In general, each DPU group 19 may be configured to operate as a high-performance input/output (I/O) hub designed to aggregate and process network and/or storage I/O for multiple storage nodes 12 and compute nodes 13. The set of DPUs 17 within each of the DPU groups 19 provides highly-programmable, specialized I/O processing circuits for handling networking and communications operations on behalf of storage nodes 12 and compute nodes 13.

In one example, each DPU 17 is a highly programmable I/O processor specially designed for offloading certain functions from storage nodes 12 and compute nodes 13. In one example, each DPU 17 includes a number of internal processor clusters, each including two or more processing cores and equipped with hardware engines that offload cryptographic functions, compression and regular expression (RegEx) processing, data storage functions including deduplication and erasure coding, and networking operations. In this way, each DPU 17 includes components for fully implementing and processing network and storage stacks on behalf of one or more storage nodes 12 or compute nodes 13. In addition, DPUs 17 may be programmatically configured to serve as a security gateway for its respective storage nodes 12 and/or compute nodes 13, freeing up the processors of the nodes to dedicate resources to application workloads. In some example implementations, each DPU 17 may be viewed as a network interface subsystem that implements full offload of the handling of data packets (with zero copy in server memory) and storage acceleration for the attached nodes. In one example, each DPU 17 may be implemented as one or more application-specific integrated circuits (ASICs) or other hardware and software components, each supporting a subset of the storage nodes 12 and/or compute nodes 13.

DPUs 17 may also be referred to as access nodes, or devices including access nodes. In other words, the term access node may be used herein interchangeably with the term DPU. Additional example details of various example DPUs and access nodes are described in U.S. Pat. No. 10,659,254, issued May 19, 2020, entitled "ACCESS NODE INTEGRATED CIRCUIT FOR DATA CENTERS WHICH INCLUDES A NETWORKING UNIT, A PLURALITY OF HOST UNITS, PROCESSING CLUSTERS, A DATA NETWORK FABRIC, AND A CONTROL NETWORK FABRIC,"; U.S. Patent Publication No. 2019/0012278, published Jan. 10, 2019, entitled "DATA PROCESSING UNIT FOR COMPUTE NODES AND STORAGE NODES"; and U.S. Pat. No. 10,725,825, issued Jul. 28, 2020, entitled "DATA PROCESSING UNIT FOR STREAM PROCESSING", the entire content of each is incorporated herein by reference.

In the example of FIG. 1, each DPU 17 provides connectivity to network fabric 14 for a different group of storage nodes 12 and/or compute nodes 13 and may be assigned respective IP addresses and provide routing operations for storage nodes 12 and/or compute nodes 13 coupled thereto. DPUs 17 may interface with and utilize network fabric 14 so as to provide any-to-any interconnectivity such that any of storage nodes 12 and/or compute nodes 13 may communicate packet data for a given packet flow to any other of the nodes using any of a number of parallel data paths within the data center 10. In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the nodes. More details on the data center network architecture and interconnected DPUs illustrated in FIG. 1 are available in U.S. Pat. No. 10,686,729, issued Jun. 16, 2020, entitled "NON-BLOCKING ANY-TO-ANY DATA CENTER NETWORK WITH PACKET SPRAYING OVER MULTIPLE ALTERNATE DATA PATHS", the entire contents of which is incorporated herein by reference.

The architecture of each DPU 17 comprises a multiple core processor system that represents a high performance, hyper-converged network, storage, and data processor and input/output hub. The architecture of each DPU 17 is optimized for high performance and high efficiency stream processing. DPUs 17 may process stream information by managing "work units." In general, a work unit (WU) is a container that is associated with a stream state and used to describe (i.e. point to) data within a stream (stored in memory) along with any associated meta-data and operations to be performed on the data. An example architecture of a DPU, such as one of DPUs 17, is described below with respect to FIG. 4.

Although DPUs 17 are described in FIG. 1 with respect to network fabric 14 of data center 10, in other examples, DPUs may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is network connectivity between the DPUs. The packet switched network may use any technology, including IP over Ethernet as well as other technologies. Irrespective of the type of packet switched network, DPUs may spray individual packets for packet flows between the DPUs and across multiple parallel data paths in the packet switched network and, optionally, reorder the packets for delivery to the destinations. A packet flow may be defined using a 5-tuple that may indicate a source IP address, a destination IP address, a source port, a destination port, and a protocol.

This disclosure describes a fabric control protocol (FCP) having congestion control mechanisms used to determine a degree of congestion at an egress interface of a destination DPU within the network (e.g., network fabric 14 of data center 10) and modify a send window size at a source DPU within the network based on the degree of congestion. The network (e.g., network fabric 14 of data center 10) is built such that the egress interfaces (i.e., storage/compute node-facing output interfaces of DPUs 17) will be more congested than any other interface in network fabric 14 (e.g., interfaces of intermediate switches/routers). In this way, detecting congestion present at each egress interface of DPUs 17 and modifying an amount of data-in-flight on the network in response to the congestion will be sufficient to avoid congestion within the network. The congestion control mechanisms may comprise any of a number of different types of mechanisms configured to dynamically and continuously determine the degree of congestion at the egress interface of each DPU 17 in the network. In some examples, the destination DPU may directly or indirectly determine the degree of congestion at the egress interface and communicate the degree of congestion back to each source DPU from which packets are received. In other examples, a source DPU may itself indirectly determine the degree of congestion at the egress interface of each destination DPU to which packets are to be sent.

The FCP executed by DPUs 17 is a data transmission protocol that may provide certain advantages in environments in which a network fabric, e.g., network fabric 14, provides full mesh interconnectivity such that any of a plurality of servers (e.g., storage nodes 12 and/or compute nodes 13) may communicate packet data for a given packet flow to any other of the plurality of servers using any of a number of parallel data paths of a logical tunnel within the network fabric. Example implementations of the FCP enable spraying of individual packets for a given packet flow from an ingress interface of a source DPU across some or all of the multiple parallel data paths of the logical tunnel in the network fabric to an egress interface of a destination DPU and, optionally, reordering of the packets for delivery to the destination server. As a further example, the FCP may provide end-to-end admission control mechanisms in which a sender node explicitly requests a receiver node with the intention to transfer a certain number of bytes of payload data, and in response, the receiver node issues a grant based on its buffer resources, quality of service (QOS), the degree of congestion at the egress interface, and/or a measure of fabric congestion. The FCP may, however, encounter an additional round trip latency for the request-grant exchange before a data packet can be sent to the destination. The FCP is described in further detail in U.S. Patent Publication No. 2019/0104206, published Apr. 4, 2019, entitled "FABRIC CONTROL PROTOCOL FOR DATA CENTER NETWORKS WITH PACKET SPRAYING OVER MULTIPLE ALTERNATE DATA PATHS,", the entire content of which is incorporated herein by reference.

This disclosure further describes various rFCP extensions executed by DPUs 17 may provide reliability enhancements and improved failure resilience within data center 10. As one example, the rFCP extension provides an unsolicited mode for low latency operation with enhanced reliability mechanisms. In the unsolicited mode of the rFCP extension, the explicit request-grant exchange is eliminated and replaced by a data packet-grant/ACK exchange between the sender node and the receiver node with the data packet acting as an implicit request. The rFCP extension further provides send window-based congestion control mechanisms to mitigate the eliminated admission control mechanisms of the request-grant exchange.

As described herein, when executing either the FCP or the rFCP extensions, the sender node of the source DPU is configured to modify a send window size based on the degree of congestion at the egress interface of the destination DPU. The sender node may itself determine the degree of congestion at the egress interface, or the sender node may receive congestion control information from the destination DPU that indicates the degree of congestion at the egress interface. In the case of FCP, the sender node of the source DPU may receive congestion control information in the grant messages received from the receiver node of the destination DPU. In the case of the rFCP extensions, the sender node of the source DPU may receive congestion control information in the grant/ACK messages received from the receiver node of the destination DPU.

As another example, the rFCP extension provides failure resilience mechanisms to identify and avoid failed paths among the multiple parallel data paths within a logical tunnel across the network fabric. The rFCP extension includes a retry mechanism that uses per tunnel packet sequence numbers to detect missing packets at a receiver node, and uses path numbers to identify potentially failed paths on which the missing packets were expected to be received at the receiver node. According to the retry mechanism, the receiver node sends a negative acknowledgement (NACK) for each detected missing packet on any path within the logical tunnel except for the potentially failed path on which the missing packet was expected to be received. Upon receipt of the NACK, the sender node retransmits the missing packet along any path within the logical tunnel except for the potentially failed path. In some scenarios, a number of failed paths within the logical tunnel may be used as congestion control information that indicates a degree of congestion at the egress interface of the destination DPU. For example, the sender node of the source DPU may modify the send window size based on the number of failed paths within the logical tunnel.

Figure 2A:
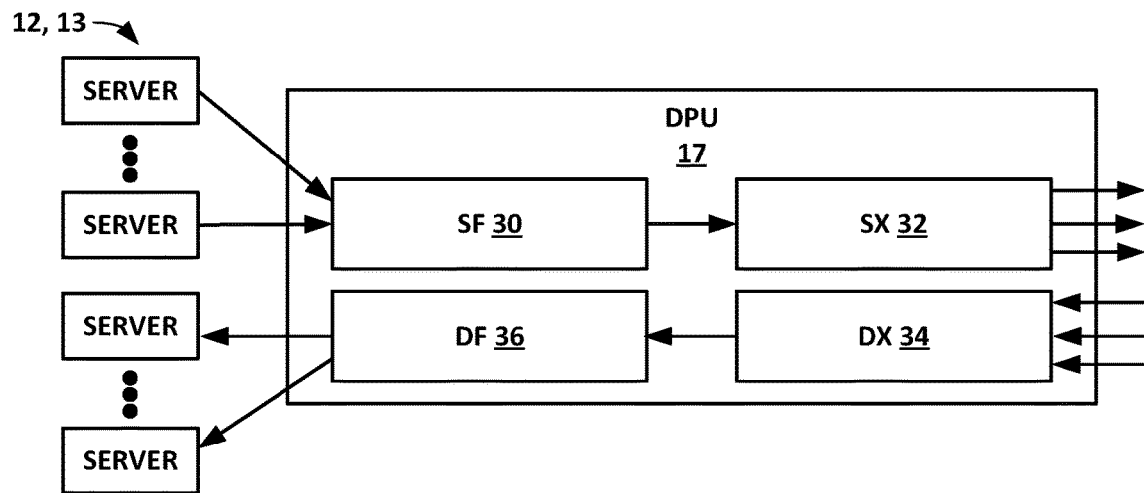
FIG. 2A is a block diagram illustrating a logical view of the networking data paths and operations within a data processing unit.

FIG. 2A is a block diagram illustrating a logical view of networking data paths and operations within a DPU 17. As shown in the example of FIG. 2A, in some example implementations, each DPU 17 implements at least four different operational networking components or functions: (1) a source (SF) component 30 operable to receive traffic from a set of servers (e.g., storage nodes 12 and/or compute nodes 13 from FIG. 1) supported by DPU 17, (2) a source switching (SX) component 32 operable to switch source traffic to other source switching components of different DPUs 17 (possibly of different DPU groups 19) or to core switches within a network fabric (e.g., network fabric 14 from FIG. 1), (3) a destination switching (DX) component 34 operable to switch inbound traffic received from other source switching components of different DPUs 17 or from cores switches, and (4) a destination (DF) component 36 operable to reorder packet flows and provide the packet flows to destination servers 12, 13.

In some examples, the different operational networking components of DPU 17 may perform flow-based switching and equal-cost multi-path (ECMP) based load balancing for Transmission Control Protocol (TCP) packet flows. Typically, however, ECMP load balances poorly as it randomly hashes the flows to paths such that a few large flows may be assigned to the same path and severely imbalance the fabric. In addition, ECMP relies on local path decisions and does not use any feedback about possible congestion or link failure downstream for any of the chosen paths.

In other examples, the different operational networking components of DPU 17 may use a data transmission protocol referred to as FCP. Instead of the flow-based switching and ECMP forwarding used to send all packets of a TCP flow on the same path to avoid packet reordering, the FCP enables packets of an individual packet flow (e.g., defined by a 5-tuple) to be sprayed to all available links between a source node and a destination node. The source node assigns a packet sequence number (PSN) to each packet of the flow, and the destination node may use the PSN to put the incoming packets of the same flow in order.

The FCP is an end-to-end admission control protocol in which a sender explicitly requests a receiver with the intention to transfer a certain number of bytes of payload data. In response, the receiver issues a grant based on its buffer resources, QoS, and/or a measure of fabric congestion. For example, the FCP includes admission control mechanisms through which a source node requests permission before transmitting a packet on the fabric to a destination node. For example, the source node sends a request message to the destination node requesting a certain number of bytes to be transferred, and the destination node sends a grant message to the source node after reserving the egress bandwidth.

This disclosure further describes extensions to FCP, referred to as reliable FCP (rFCP), that provide reliability enhancements and improved failure resilience within a data center or other computing environment. The various rFCP extensions described herein may provide certain advantages. As one example, the rFCP extension provides an unsolicited mode for low latency operation with enhanced reliability mechanisms. As another example, the rFCP extension provides failure resilience mechanisms to identify and avoid failed paths among the multiple parallel data paths within a logical tunnel across the network fabric.

SF component 30 of DPU 17 is considered a source node or sender node of the fabric. For FCP and rFCP traffic, SF component 30 is configured to spray its input bandwidth (e.g., 200 Gbps) over links to multiple SX components of DPUs within one or more DPU groups. For example, as described in more detail with respect to FIG. 2B, SF component 30 may spray packets of the same flow across eight links to SX component 32 and seven other SX components of other DPUs within a logical rack (e.g., two DPU groups 19A-19B). For non-FCP traffic, SF component 30 is configured to select one of the connected SX components to which to send packets of the same flow.

SX component 32 of DPU 17 may receive incoming packets from multiple SF components of DPUs within the one or more DPU groups, e.g., SF component 30 and seven other SF components of other DPUs within the logical rack. For FCP and rFCP traffic, SX component 32 is also configured to spray its incoming bandwidth over links to multiple core switches in the fabric. For example, as described in more detail with respect to FIG. 3, SX component 32 may spray its bandwidth across eight links to eight core switches. In some cases, SX component 32 may spray its bandwidth across eight links to four or eight intermediate devices, e.g., top-of-rack (TOR) Ethernet switches, electrical permutation devices, or optical permutation devices, which in turn forward traffic to the core switches. For non-FCP traffic, SX component 32 is configured to select one of the core switches to which to send packets of the same packet flow. Since the incoming bandwidth to SX component 32 and the outgoing bandwidth from SX component 32 is same (e.g., 200 Gbps), congestion likely will not occur at the SX stage even for a large number of packet flows.

DX component 34 of DPU 17 may receive incoming packets from multiple core switches either directly or via one or more intermediate devices, e.g., TOR Ethernet switches, electrical permutation devices, or optical permutation devices. For example, DX component 34 may receive incoming packets from eight core switches, or four or eight intermediate devices. DX component 34 is configured to select a DF component to which to send the received packets. For example, DX component 34 may be connected to DF component 36 and seven other DF components of other DPUs within the logical rack. In some cases, DX component 34 may become a congestion point because DX component 34 may receive a large amount of bandwidth (e.g., 200 Gbps) that is all to be sent to the same DF component. DX component 34 may avoid long term congestion using the admission control mechanisms of FCP and/or using send window-based congestion control mechanisms and other congestion control mechanisms provided by FCP or the rFCP extensions.

DF component 36 of DPU 17 may receive incoming packets from multiple DX components of DPUs within the one or more DPU groups, e.g., DX component 34 and seven other DX components of other DPUs within the logical rack. DF component 36 is considered a destination node or receiver node of the fabric. For FCP and rFCP traffic, DF component 36 may optionally reorder packets of the same flow prior to transmitting the flow to a destination server 12.

In some examples, SX component 32 and DX component 34 of DPU 17 may use the same forwarding table to perform packet switching. In this example, the personality of DPU 17 and the nexthop identified by the forwarding table for the same destination IP address may depend on a source port type of the received data packet. For example, if a source packet is received from a SF component, DPU 17 operates as SX component 32 and determines a nexthop to forward the source packet over the fabric toward a destination node. If a packet is received from a fabric-facing port, DPU 17 operates as DX component 34 and determines a final nexthop to forward the incoming packet directly to a destination node. In some examples, the received packet may include an input tag that specifies its source port type.

Figure 2B:
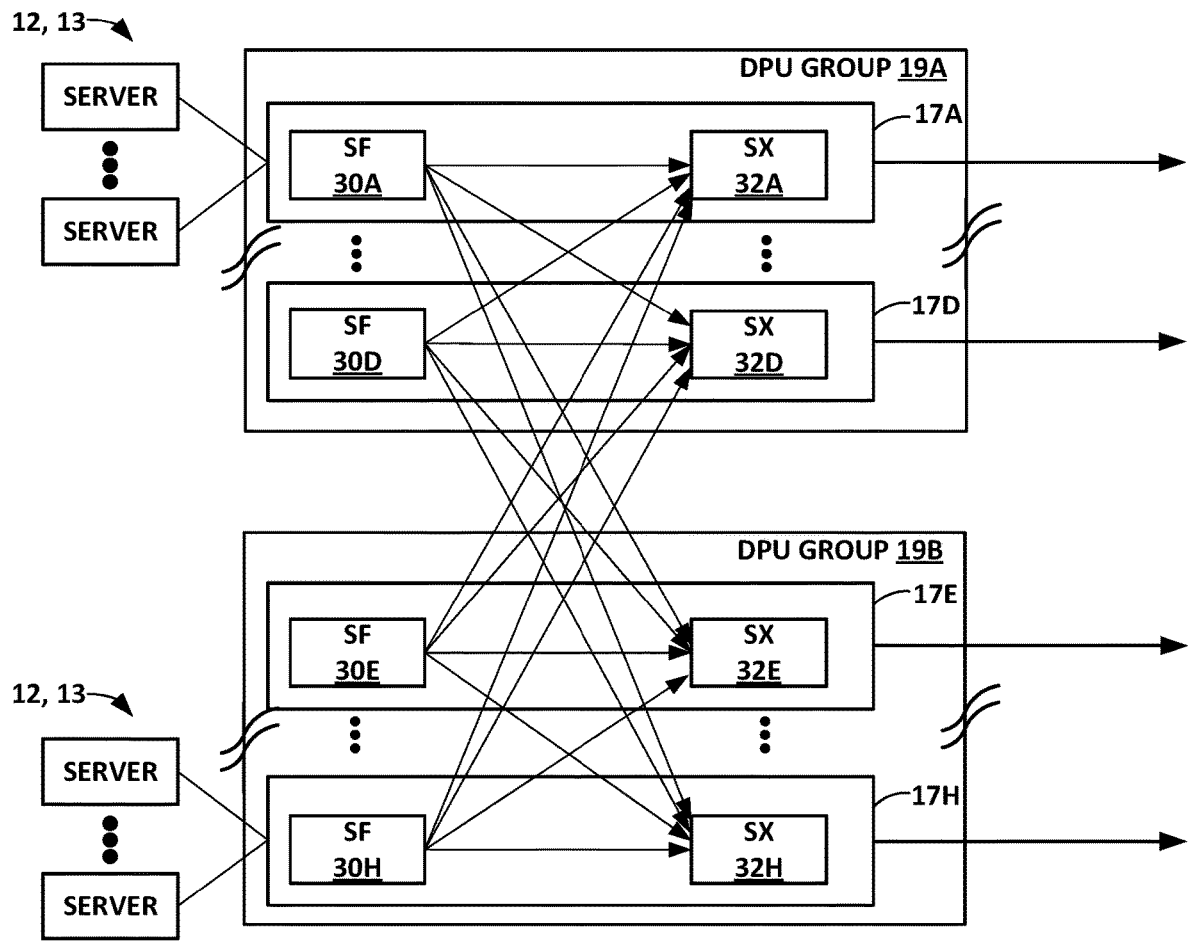
FIG. 2B is a block diagram illustrating an example first-level network fanout achieved between a set of data processing units.

FIG. 2B is a block diagram illustrating an example first-level network fanout achieved between a set of DPUs 17A-17H. In the illustrated example of FIG. 2B, the set of DPUs 17A-17H is defined as being within a logical rack that includes two DPU groups 19A-19B containing eight DPUs 17A-17H in total and servers 12, 13 supported by each of the DPUs 17.

As shown in FIG. 2B, SF components 30A-30H and SX components 32A-32H of DPUs 17A-17H have full mesh connectivity in that each SF component 30 is connected to all of the SX components 32 of the set of DPUs 17A-17H. The set of DPUs 17A-17H may be connected to each other by an 8-way mesh of electrical Ethernet connections. In the case of FCP or rFCP traffic, SF components 30 of the set of DPUs 17A-17H apply spraying algorithms to spray packets for any given packet flow across all available links to SX components 32. In this way, SF components 30 need not necessarily perform a full lookup operation for L2/L3 switching of outbound packets of packet flows originating from servers 12, 13. In other words, packets for a given packet flow may be received by an SF component 30, such as SF component 30A, and sprayed across some or all of the links to SX components 32 for the set of DPUs 17A-17H. In this way, the set of DPUs 17A-17H achieve a first-level fan out of, in this example, 1:8 and may do so, in some examples, without incurring any L2/L3 forwarding lookup relative to keying information in the packet headers. As such, packets for a single packet flow need not follow the same path when sprayed by a given SF component 30.

Thus, according to the disclosed techniques, upon receiving source traffic from one of servers 12, 13, SF component 30A implemented by DPU 17A, for example, performs an 8-way spray of packets of the same flow across all available links to SX components 32 implemented by the set of DPUs 17A-17H. More specifically, SF component 30A sprays across one internal SX component 32A of the same DPU 17A and seven external SX components 32B-32H of the other DPUs 17B-17H. In some implementations, this 8-way spray between SFs 30 and SXs 32 within the set of DPUs 17A-17H may be referred to as a first-stage spray. As described in other portions of this disclosure, a second-stage spray may be performed over a multi-level network fanout within the network fabric between DPUs 17 and core switches. For example, the second-stage spray may be performed through an intermediate device, such as a TOR Ethernet switch, an electric permutation device, or an optical permutation device.

In some examples, the first four DPUs 17A-17D may be included in a first DPU group 19A and the second four DPUs 17E-17H may be included in a second DPU group 19B. The DPUs 17A-17H within the first and second DPU groups 19A-19B may be connected to each other via a full-mesh in order to allow the 8-way spray between SFs 30 and SXs 32 within the set of DPUs 17A-17H. In some examples, a logical rack including the two DPU groups 19A-19B together with their supported servers 12, 13 may be referred to as a half-rack or a half physical rack. In other examples, more or fewer DPUs may be connected together using full-mesh connectivity. In one example, sixteen DPUs 17 may be connected together in a full-mesh to enable a first-stage 16-way spray within a full physical rack.

Figure 3:
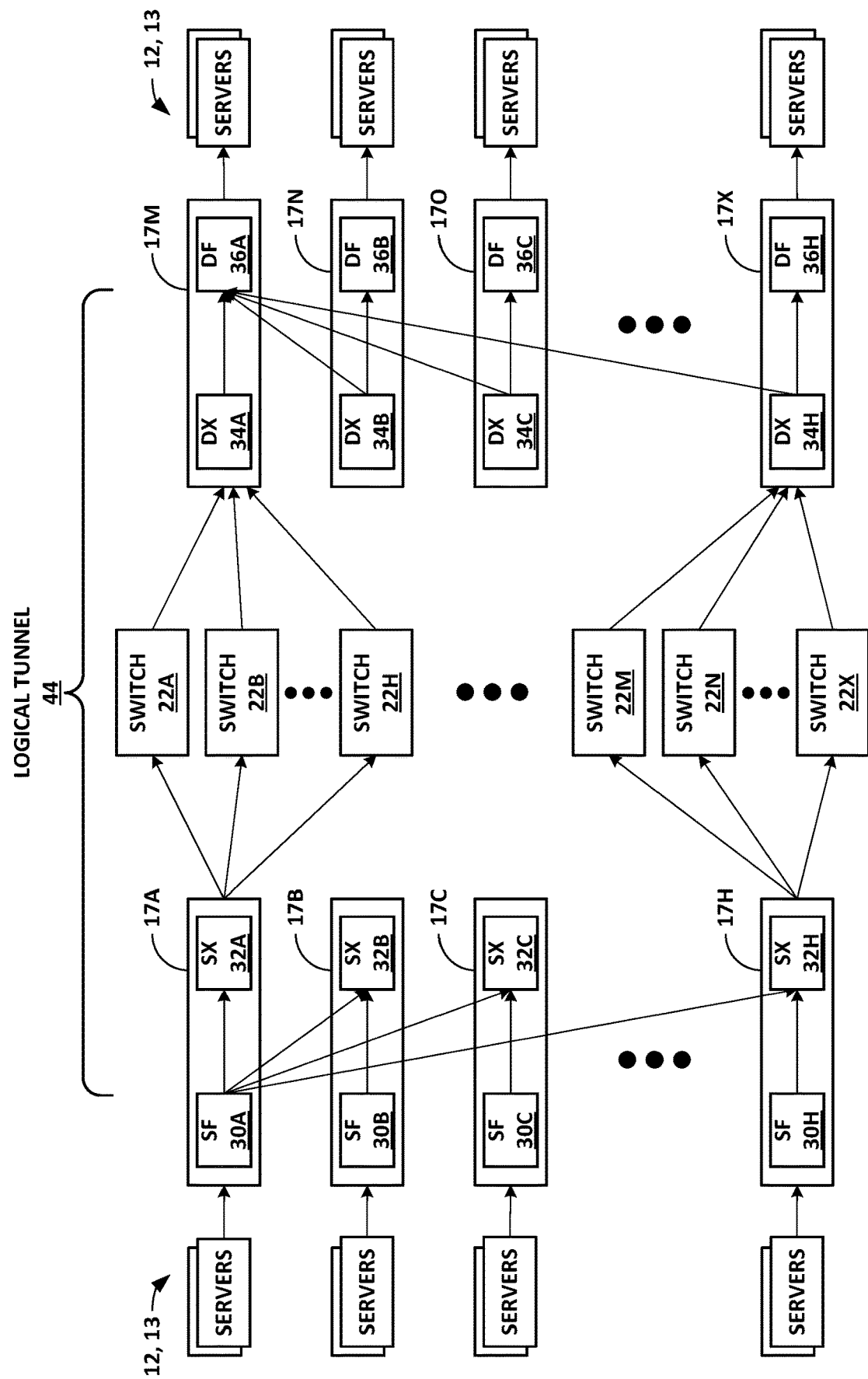
FIG. 3 is a block diagram illustrating an example multi-level network fanout across a data center network fabric between data processing units.

FIG. 3 is a block diagram illustrating an example multi-level network fanout across a data center network fabric between DPUs 17. In the illustrated example of FIG. 3, a first set of DPUs 17A-17H and server nodes 12, 13 supported by the first set of DPUs are connected to a set of core switches 22A-22X (collectively, "core switches 22") within the network fabric. A second set of DPUs 17M-17X and servers 12, 13 supported by the second set of DPUs are also connected to the set of core switches 22 within the network fabric. In some examples, the first set of DPUs 17A-17H and the second set of DPUs 17M-17X may be included in the same logical or physical rack.

According to the disclosed techniques, the network fabric comprises FCP-based flow control and network communication within a network fabric. The network fabric may be visualized as including multiple channels, e.g., an FCP data channel and a non-FCP data channel. As illustrated in FIG. 3, the FCP data channel carries FCP and rFCP data packets via a logical tunnel 44 that includes all paths between a source node, e.g., SF component 30A of DPU 17A and a destination node, e.g., DF component 36A of DPU 17M. The FCP data channel carries the data packets using either the FCP or the rFCP extension. The FCP or rFCP packets are sprayed over the fabric from the source node to the destination node through a suitable load balancing scheme. The FCP or rFCP packets are not expected to be delivered in order, but the destination node may perform packet reordering. For example, packets of a packet flow received from a source server 12, 13 by SF component 30A of DPU 17A may be sprayed over some or all possible links within logical tunnel 44 toward DF component 36A of DPU 17M.

In some examples, DF component 36A is configured to reorder the received packets to recreate the original sequence of the packet flow prior to transmitting the packet flow to the destination server 12, 13. In other examples, DF component 36A may not need to reorder the received packets of the packet flow prior to transmitting the packet flow to the destination server 12, 13. In these examples, DF component 36A may instead deliver the packets to the destination server 12, 13 in the order in which the packets arrive. For example, packets that comprise storage access requests or responses to a destination storage appliance may not need to be reordered into the original sequence in which they were sent.

The non-FCP data channel within the network fabric carries data packets that do not use the FCP or the rFCP extension. The non-FCP data packets may be forwarded or routed using ECMP based load balancing, and, for a given flow identified by a 5-tuple, the packets are expected to be delivered in order to the destination node.

The example of FIG. 3 illustrates both the first-level network fanout between the first set of DPUs 17A-17H, as described above with respect to FIG. 2B, and a multi-level network fanout between the first set of DPUs 17A-17H and the core switches 22. The first set of DPUs 17A-17H are connected to core switches 22 using either electrical or optical Ethernet connections. The second set of DPUs 17M-17X are similarly connected to the core switches 22. In some examples, each of DPUs 17A-17H and each of DPUs 17M-17X may connect to eight of core switches 22. In the case of FCP traffic, SX components 32 of the first set of DPUs 17A-17H apply spraying algorithms to spray packets for any given packet flow across all available paths to the core switches 22. In this way, the SX components 32 may not perform a full lookup operation for L2/L3 switching of received packets.

Upon receiving source traffic from one of the servers 12, 13, an SF component 30A of DPU 17A performs an 8-way spray of FCP or rFCP packets of the packet flow across all available paths to SX components 32 implemented by the first set of DPUs 17A-17H. As further illustrated in FIG. 3, each of the SX components 32 then sprays the FCP packets of the packet flow across all available paths to the core switches 22. In the illustrated example, the multi-level fanout is 8-by-8 and, therefore, supports up to sixty-four core switches 22. In other examples, in which the first-level fanout is 1:16 within a full physical rack, the multi-level fanout may be 16-by-16 and support up to 256 core switches.

Although illustrated in FIG. 3 as occurring directly between the DPUs 17 and the core switches 22, the multi-level fanout may be performed through one or more TOR devices, such as top of rack Ethernet switches, optical permutation devices, or electrical permutation devices. The multi-level network fanout enables packets of a packet flow received at any of the first set of DPUs 17A-17H to reach core switches 22 for further forwarding to any of the second set of DPUs 17M-17X.

According to the disclosed techniques, in one example implementation, each of SF components 30 and SX components 32 uses an FCP spray engine configured to apply a suitable load balancing scheme to spray the packets of a given FCP or rFCP packet flow across all available paths to a destination node. In some examples, the load balancing scheme may direct each of the FCP or rFCP packets of the packet flow to one of the parallel data paths selected based on available bandwidth (i.e., least loaded path). In other examples, the load balancing scheme may direct each of the FCP or rFCP packets of the packet flow to a randomly, pseudo-randomly, or round-robin selected one of the parallel data paths. In a further example, the load balancing scheme may direct each of the FCP or rFCP packets of the packet flow to a weighted randomly selected one of the parallel data paths in proportion to available bandwidth in the network fabric.

In the example of the least loaded path selection, the FCP spray engine may track a number of bytes transmitted on each path in order to select a least loaded path on which to forward a packet. In addition, in the example of the weighted random path selection, the FCP spray engine may track path failures downstream to provide flow fairness by spraying packets in proportion to bandwidth weight on each active path. For example, if one of core switches 22A-22H connected to SX component 32A of DPU 17A fails, then the path weights between SF component 30A and SX components 32 change to reflect the smaller proportion of network fabric bandwidth available behind DPU 17A. In this example, SF component 30A will spray to SX components 32 in proportion to the available bandwidth behind the first set of DPUs 17A-17H. More specifically, SF component 30A will spray fewer packets to SX component 32A then the other SX components 32 based on the reduced network fabric bandwidth behind DPU 17A due to the failure of one of the connected core switches 22A-22H. In this way, the spray of packets may not be uniform across the available paths toward the destination node, but bandwidth will be balanced across the active paths even over relatively short periods.

The source node may use all active links in proportion to the source and destination bandwidths. As an example, assume there are N links between the source node and the destination node each with source bandwidth $Sb_i$ and destination bandwidth $Db_i$, where i=1 .... N. The actual bandwidth from the source nodes to the destination node is equal to min (Sb, Db) determined on a link-by-link basis in order to take failures into account. More specifically, the source bandwidth (Sb) is equal to $$\sum_{i=1}^{N} Sb_i,$$

and destination bandwidth (Db) is equal to $$\sum_{i=1}^{N} Db_i,$$

and the bandwidth ($b_i$) Or each link is equal to $min(Sb_i, Db_i)$. The weight of the bandwidth used on each link is equal to $$b_i / \sum_{i=1}^{N} b_i.$$

In the case of FCP or rFCP traffic, SF components 30 and SX components 32 use the FCP spray engine to distribute FCP or rFCP packets of the packet flow based on the load on each link toward the destination node, proportional to its weight. The spray engine maintains credit memory to keep track of credits (i.e., available bandwidth) per nexthop member link, uses packet length included in an FCP or rFCP header to deduct credits (i.e., reduce available bandwidth), and associates a given packet to the one of the active links having the most credits (i.e., the least loaded link). In this way, for FCP or rFCP packets, the SF components 30 and SX components 32 spray packets across member links of a nexthop for a destination node in proportion to the member links' bandwidth weights. More details on fabric failure resiliency are available in U.S. Pat. No. 10,965,586, issued Mar. 30, 2021, entitled "Resilient Network Communication Using Selective Multipath Packet Flow Spraying,", the entire content of which is incorporated herein by reference.

In another example implementation, each of SF components 30 or SX components 32 modifies a UDP portion of a header for each of the FCP or rFCP packets of a packet flow in order to force the packet spraying downstream to core switches 22. More specifically, each of SF components 30 or SX components 32 is configured to randomly set a different UDP source port in the UDP portion of the header for each of the FCP or rFCP packets of the packet flow. Each of core switches 22 computes a hash of N-fields from the UDP portion of the header for each of the FCP or rFCP packets and, based on the randomly set UDP source port for each of the FCP or rFCP packets, selects one of the parallel data paths on which to spray the FCP or rFCP packet. This example implementation enables spraying by core switches 22 without modifying core switches 22 to understand the FCP.

Core switches 22 operate as the single hop along logical tunnel 44 between the source node, e.g., SF component 30A of DPU 17A, and the destination node, e.g., DF component 36A of DPU 17M. Core switches 22 perform a full lookup operation for L2/L3 switching of the received packets. In this way, core switches 22 may forward all the packets for the same packet flow toward the destination node, e.g., DF component 36A of DPU 17M, that supports the destination server 12, 13. Although illustrated in FIG. 3 as occurring directly between the core switches 22 and the second set of DPUs 17M-17X, the core switches 22 may forward all the packets for the same packet flow to an intermediate TOR device that has connectivity to the destination node. In some examples, the intermediate TOR device may forward all the packet for the packet flow directly to DX component 34A implemented by DPU 17M. In other examples, the intermediate TOR device may be an optical or electrical permutation device configured to provide another fanout over which the packets can be sprayed between input and output ports of the permutation device. In this example, all or some portion of the DX components 34 of the second set of DPUs 17M-17X may receive sprayed packets of the same packet flow.

DX components 34 and DF components 36 of the second set of DPUs 17M-17X also have full mesh connectivity in that each DX component 34 is connected to all of the DF components 36 within the second set of DPUs 17M-17X. When any of DX components 34 receive the packets of the packet flow from core switches 22, the DX components 34 forward the packets on a direct path to DF component 36A of DPU 17M. DF component 36A may perform a limited lookup necessary only to select the proper output port for forwarding the packets to the destination server 12, 13. In response to receiving the packets of the packet flow, DF component 36A of DPU 17M may optionally reorder the packets of the packet flow based on sequence numbers of the packets. As such, with respect to full routing tables for the data center, only the core switches 22 may need to perform full lookup operations. Thus, the network fabric provides a highly-scalable, flat, high-speed interconnect in which servers are effectively one L2/L3 hop from any other server 12 within the data center.

Figure 4:
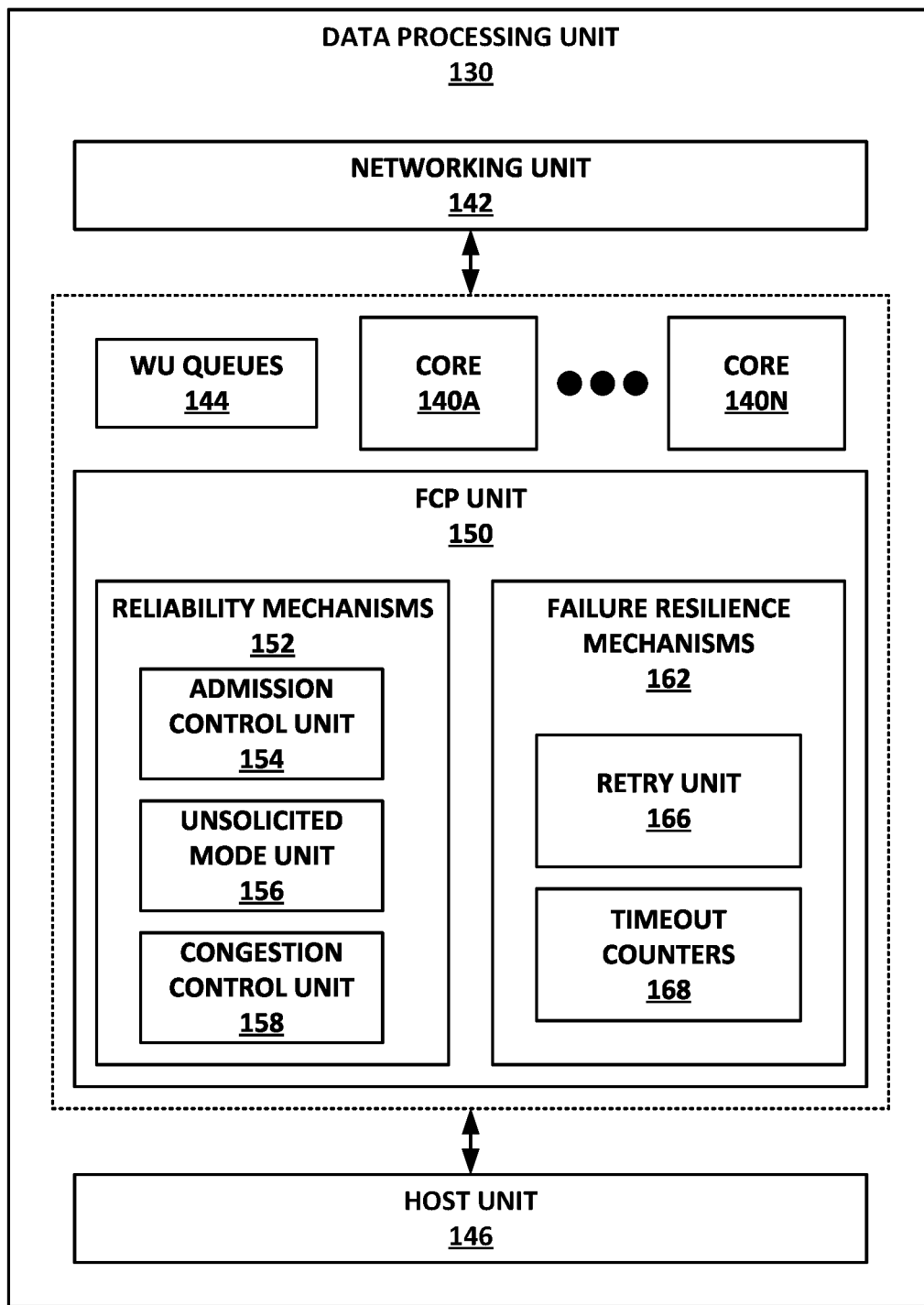
FIG. 4 is a block diagram illustrating an example data processing unit executing FCP and rFCP extensions, in accordance with the techniques of this disclosure.

FIG. 4 is a block diagram illustrating an example data processing unit 130 executing FCP and rFCP extensions, in accordance with the techniques of this disclosure. DPU 130 generally represents a hardware chip implemented in digital logic circuitry. DPU 130 may be implemented as one or more ASICs or other hardware and software components. As various examples, DPU 130 may be provided as an integrated circuit mounted on a motherboard of a computing device or installed on a card connected to the motherboard of the computing device via Peripheral Component Interconnect express (PCIe), or the like. In some examples, DPU may be an integrated circuit within a DPU group (e.g., one of DPU groups 19) configured as a standalone network device for installation within a compute rack, a storage rack, or a converged rack.

DPU 130 may operate substantially similar to any of the DPUs 17 of FIGS. 1-3. DPU 130 may be communicatively coupled to one or more storage nodes, compute nodes, network devices, server devices, storage devices, network fabrics, or the like, e.g., via a network interface such as Ethernet (wired or wireless), a system bus connection interface such as Peripheral Component Interconnect express (PCIe), or other such communication media.

In the illustrated example of FIG. 4, DPU 130 includes a plurality of programmable processing cores 140A-140N ("cores 140"). DPU 130 also includes a networking unit 142, a plurality of work unit (WU) queues 144, and at least one host unit 146. Although not illustrated in FIG. 4, each of cores 140, networking unit 142, WU queues 144, and host unit 146 are communicatively coupled to each other. In accordance with the techniques of this disclosure, FCP unit 150 may be implemented on DPU 130 to provide a data transmission control protocol along with reliability enhancements and improved failure resilience within a data center or other computing environment that includes DPU 130 interconnected with a plurality of other DPUs that are also executing FCP and/or the rFCP extensions.

In this example, DPU 130 represents a high performance, hyper-converged network, storage, and data processor and input/output hub. For example, networking unit 142 may be configured to send and receive stream data units with one or more external devices, e.g., network devices. Networking unit 142 may perform network interface card functionality, packet switching, and the like, and may use large forwarding tables and offer programmability. Networking unit 142 may expose network interface (e.g., Ethernet) ports for connectivity to a network, such as network fabric 14 of FIG. 1. Host unit 146 may expose one or more host unit interface (e.g., PCIe) ports to send and receive stream data units with end PCIe devices (e.g., PCIe host and PCIe endpoint devices). DPU 130 may further include one or more high bandwidth interfaces for connectivity to off-chip external memory (not illustrated in FIG. 4).

At least one of WU queues 144 may be associated with each of cores 140 and configured to store a plurality of work units enqueued for processing on the respective one of the cores 140. In some examples, each of cores 140 may have a dedicated one of WU queues 144 that stores work units for processing by the respective one of cores 140. In other examples, each of cores 140 may have two or more dedicated WU queues 144 that store work units of different priorities for processing by the respective one of cores 140.

Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or complex instruction set computing (CISC or x86) cores. Each of cores 140 may be programmed to process one or more events or activities related to a given packet flow such as, for example, a networking packet flow, a storage packet flow, a security packet flow, or an analytics packet flow. Each of cores 140 may be programmable using a high-level programming language, e.g., C, C++, or the like.

In some examples, the plurality of cores 140 executes instructions for processing a plurality of events related to each data packet of a packet flow, received by networking unit 142 or host unit 146, in a sequential manner in accordance with one or more work units associated with the data packets. Work units are sets of data exchanged between cores 140 and networking unit 142 or host unit 146 where each work unit may represent one or more of the events related to a given data packet. More specifically, a work unit is associated with one or more data packets, and specifies a software function for processing the data packets and further specifies one of cores 140 for executing the software function.

In general, to process a work unit, the one of cores 140 specified by the work unit is configured to retrieve the data packets associated with the work unit from a memory, and execute the software function specified by the work unit to process the data packets. For example, receiving a work unit is signaled by receiving a message in a work unit receive queue (e.g., one of WU queues 144). Each of WU queues 144 is associated with one of cores 140 and is addressable in the header of the work unit message. Upon receipt of the work unit message from networking unit 142, host unit 146, or another one of cores 140, the work unit is enqueued in the one of WU queues 144 associated with the one of cores 140 specified by the work unit. The work unit is later dequeued from the one of WU queues 144 and delivered to the one of cores 140. The software function specified by the work unit is then invoked on the one of cores 140 for processing the work unit. The one of cores 140 then outputs the corresponding results of processing the work unit back to WU queues 144.

In the example illustrated in FIG. 4, FCP unit 150 includes reliability mechanisms 152 and failure resilience mechanisms 162. According to the techniques described in this disclosure, DPU 130 executes reliability mechanisms 152 of FCP unit 150 in either a request-grant mode or an unsolicited mode to reliably exchange data packets with other nodes within a data center or other computing environment. When operating as a source or sender node in the request-grant mode, DPU 130 executes admission control unit 154 to send explicit request messages to a destination or receiver node indicating an intention to transfer a certain number of bytes of payload data prior to sending data packets of a packet flow based on receipt of explicit grant messages from the destination or receiver node. When operating as a source or sender node in the unsolicited mode, DPU 130 executes unsolicited mode unit 156 to send data packets of a packet flow that act as implicit requests to a destination or receiver node followed by receipt of grant/ACK messages from the destination or receiver node. In this way, DPU 130 may reduce or eliminate the additional latency that arises from an explicit request-grant exchange that must be performed before the data packets can be sent to the destination node.

In either mode, DPU 130 may execute congestion control unit 158 to perform send window-based congestion control mechanisms and other congestion control mechanisms in addition to the admission control mechanisms of the request-grant exchange when DPU 130 is operating in the request-grant mode or to mitigate the eliminated admission control mechanisms of the request-grant exchange when DPU 130 is operating in the unsolicited mode. In accordance with the techniques described in this disclosure, the congestion control mechanisms provided by FCP and/or the rFCP extensions are used to determine a degree of congestion at an egress interface of a destination DPU within a network and to modify a send window size at a source DPU within the network based on the degree of congestion.

The network that includes the interconnected DPUs, including DPU 130, is primarily described herein as a data center with a network fabric, e.g., data center 10 with network fabric 14 from FIG. 1, but may comprise any packet switched network that connects a set of DPUs to each other. Each DPU is connect to the network at some fixed interface bandwidth that is independent of the number DPUs, which permits scaling. Each DPU's interface is full duplex having an ingress or sender node used to send packets to other DPUs and an egress or receiver node used to receive packets from other DPUs. In general, the ingress and egress bandwidths may be different from each other. It should be noted that the terms ingress and egress as used herein are relative to the network and not to a DPU.

In accordance with the techniques described herein, the network is built such that the egress interfaces of the network will be more congested than any other interface within the network. This is based on how FCP and/or the rFCP extensions utilize all available links of a logical tunnel between a source DPU and a destination DPU. More specifically, a given source DPU executing FCP or the rFCP extensions sends packets evenly on all available paths of the logical tunnel to a given destination DPU. It may be assumed that all interior interfaces along the available paths combined can supply equal to or more bandwidth than the egress interface of the destination DPU. In other words, the cross-sectional bandwidth of the network provides any-to-any connectivity between DPUs at full bandwidth. The network, therefore, operates such that any congestion within the network would be seen at the egress interfaces of the network. In this way, detecting congestion at each egress interface of the network and modifying an amount of data-in-flight on the network in response to the congestion will be sufficient to avoid congestion within the network. In addition, this scheme is relatively simple as the number of egress interfaces in a network of N nodes is exactly N, whereas the total number of interfaces in the network may be considerably larger.

Congestion control unit 158 of DPU 130 may perform any of a number of different types of congestion control mechanisms configured to dynamically and continuously determine the degree of congestion at the egress interface of each DPU in the network. In examples where DPU 130 is operating as the destination DPU, congestion control unit 158 may directly or indirectly determine the degree of congestion at the egress interface of DPU 130 and communicate the degree of congestion back to each source DPU from which packets are received. In other examples where DPU 130 is operating as the source DPU, congestion control unit 158 may indirectly determine the degree of congestion at the egress interface of each destination DPU to which packets are sent, or may receive congestion control information in the grant or grant/ACK messages that indicates the degree of congestion at the egress interface. Continuing the example where DPU 130 is operating as the source DPU, congestion control unit 158 may modify a send window size based on the degree of congestion at the egress interface of the destination DPU, regardless of how DPU 130 determines the degree of congestion.

The control loop stabilization time for the congestion control mechanisms to determine and react to the degree of congestion at the egress interface will be approximately equal to the fabric round trip time. The congestion control mechanisms described herein operate such that the sum of the bandwidths sent by the source DPUs to a given destination DPU does not exceed the egress interface bandwidth of the destination DPU. Moreover, the congestion control mechanisms operate such that the bandwidths allocated to each of the source DPUs is distributed fairly across the source DPUs continuously and dynamically.

Several examples of the congestion control mechanisms used to determine the degree of congestion at an egress interface of a destination DPU are described. The congestion control mechanisms may comprise any method of dynamically and continuously measuring the degree of congestion at the egress interface of each DPU in the network and should not be limited to the below described examples.

As a first example, the congestion control mechanisms may include determining the bandwidth utilization of the egress interface. For example, when DPU 130 is operating as the destination DPU, congestion control unit 158 may directly determine the degree of congestion by measuring an amount of bandwidth at the egress interface of DPU 130 and comparing the used bandwidth to a maximum bandwidth that the egress interface is capable of handling. If the amount of bandwidth is greater than the maximum bandwidth, congestion control unit 158 may send an indication of the degree of congestion at the egress interface back to the source DPUs. The indication of the degree of congestion at the egress interface may comprise congestion control information included in a grant message or a grant/ACK message sent to the source DPUs as part of the message exchange for FCP or the rFCP extensions. In response to the indication, each of the source DPUs may modify a send window size or otherwise modify the rate of data transmission to DPU 130.

As a second example, the congestion control mechanisms may include measuring the length of a queue maintained by the destination DPU to receive packets from the source DPUs. For example, when DPU 130 is operating as the destination DPU, congestion control unit 158 may indirectly determine the degree of congestion by measuring the length of the queue to determine whether the queue depth is increasing. If the queue depth is increasing, congestion control unit 158 may send an indication of the degree of congestion at the egress interface back to the source DPUs. The indication of the degree of congestion at the egress interface may comprise congestion control information included in a grant message or a grant/ACK message sent to the source DPUs as part of the message exchange for FCP or the rFCP extensions. In response to the indication, each of the source DPUs may modify a send window size or otherwise modify the rate of data transmission to DPU 130.

As a third example, the congestion control mechanisms may include measuring one-way latency from a source DPU to a destination DPU, and using the one-way latency or latency variation to indirectly determine the degree of congestion at the egress interface of the destination DPU. For example, when DPU 130 is operating as the destination DPU, congestion control unit 158 may compare a source timestamp of a packet and a destination timestamp of the packet to measure the one-way latency. If the source and destination timestamps are far apart such that the one-way latency is large (or larger than usual), congestion control unit 158 may send an indication of the degree of congestion at the egress interface back to the source DPU. The indication of the degree of congestion at the egress interface may comprise congestion control information included in a grant message or a grant/ACK message sent to the source DPU as part of the message exchange for FCP or the rFCP extensions. In response to the indication, the source DPU may modify a send window size or otherwise modify the rate of data transmission to DPU 130.

As a fourth example, the congestion control mechanisms may include measuring round-trip latency (i.e., from a source DPU to a destination DPU and back to the source DPU), and using the round-trip latency or latency variation to indirectly determine the degree of congestion at the egress interface of the destination DPU. For example, when DPU 130 is operating as the source DPU, congestion control unit 158 may compare an initial source timestamp of a packet and a return source timestamp of the grant or grant/ACK message for the packet to measure the round-trip latency.

Based on the difference between the initial source and return source timestamps, congestion control unit 158 of the source DPU 130 may determine the degree of congestion at the egress interface of the destination DPU. In response to the determination, DPU 130 may modify a send window size or otherwise modify the rate of data transmission to the destination DPU.

As a fifth example, the congestion control mechanisms may include determining a number of failed paths within a logical tunnel between a source DPU and a destination DPU to indirectly determine the degree of congestion at the egress interface of the destination DPU in accordance with the number of remaining available paths of the logical tunnel. In general, when there are path or fabric link failures, the congestion in the network may be moved to some other points within the network. When DPU 130 is operating as the destination DPU, congestion control unit 158 may monitor the health of all the available network paths of the logical tunnel. Whenever one or more of the paths suffer a failure, congestion control unit 158 detects the resulting congestion and may send an indication of the path failure and/or the detected congestion back to the source DPU. The indication may be a global path health (GPH) vector or an avoid path number (APN) field included in a grant message, a grant/ACK message or a NACK message sent to the source DPU as part of the message exchange for FCP or the rFCP extensions. In response to the indication, the source DPU may modify a send window size or otherwise modify the rate of data transmission to DPU 130 to ensure that the remaining available parallel paths of the logical tunnel remain uncongested.

In further accordance with the techniques described in this disclosure, DPU 130 executes failure resilience mechanisms 162 of FCP unit 150 to identify and avoid failed paths among multiple parallel data paths within a logical tunnel across the network fabric between DPU 130 and the other nodes. For example, DPU 130 may execute retry unit 166 to detect missing packets based on per tunnel PSNs and timeout counters 168, which may include a packet reorder timer and/or a packet retransmit timer. DPU 130 may further execute retry unit 166 to identify potentially failed paths on which the missing packets were expected to be received using per tunnel path numbers. When operating as a destination or receiver node, DPU 130 sends a NACK for each detected missing packet on any path within the logical tunnel except for the potentially failed path on which the missing packet was expected to be received. When operating as a source or sender node, DPU 130 retransmits the missing packet along any path within the logical tunnel except for the potentially failed path in response to receipt of a NACK or failure to receive an ACK from the destination node. As described above in the fifth example of the congestion control mechanisms, a number of failed paths within the logical tunnel may be used as congestion control information that indicates a degree of congestion at the egress interface of the destination DPU. In the example where DPU 130 is operating as the source DPU, congestion control unit 158 may modify the send window size based on the number of failed paths within the logical tunnel.

In general, the rFCP extensions provide one or more of the following features. The rFCP extensions may provide low latency operation through elimination of the explicit request-grant exchange, which is replaced by a data packet-grant/ACK exchange with the data packet acting as implicit request. The rFCP extensions may provide send-window based congestion control either in addition to the admission control mechanisms in the request-grant mode or to mitigate the removal of admission control mechanisms in the unsolicited mode. The rFCP extensions may provide receiver flow control based on per priority memory occupancy and reorder database utilization. The rFCP extensions may provide hardware support for packet loss detection and a packet ACK/NACK mechanism to enable selective packet retransmission. The rFCP extensions may overload the FCP grant message with an rFCP extension header and the data packet with an extension header. The rFCP extensions may provide support for a new NACK packet type to carry NACK and selective NACK information. The rFCP extensions may coexist with FCP, but an FCP tunnel can support either FCP or rFCP. Although rFCP is a superset of FCP, it is not backward compatible with FCP such that an rFCP endpoint operating in rFCP mode cannot interoperate with an endpoint supporting only FCP. The rFCP extensions may provide support for large send offload (LSO). The rFCP extensions may support rFCP queues that use a 1:1 queue to tunnel mapping to track packet reorder/loss and enable retransmission using the grant message ACK and NACK message mechanism. An arbitrary block of FCP queues can be assigned from the high end of the total number of FCP queues to support rFCP operation. The remaining queues continue to support FCP. This guarantees that FCP and rFCP tunnel IDs do not alias. In addition to NACK based retransmission, the rFCP senders or source nodes also support timeout based retransmission of the oldest un-ACKed packet. The rFCP grant and NACK messages are paced similarly to regular FCP grant messages, and the grant scheduler provides a separate hierarchy for ACK vs. NACK generation, prioritizing NACKs over ACKs. The ACK information carried by the grant messages and NACK messages implicitly acknowledges all packets carried by the ACK reference (i.e., the ACK block sequence number (ABN)). The rFCP receivers or destination nodes send a NACK per missing packet or send a selective NACK bit vector through a NACK message and the rFCP senders, after freeing up the packets that are implicitly ACKed, retransmit the last (next) un-ACKed packet from the queue or missing packets as indicated in the NACK bit vector. The rFCP receivers send a 1-bit congestion status as a part of the grant message or NACK message based on its resource status or packet drops detected. This signals the rFCP senders to optionally switch to request-grant mode from the low latency unsolicited mode.

Figure 5:
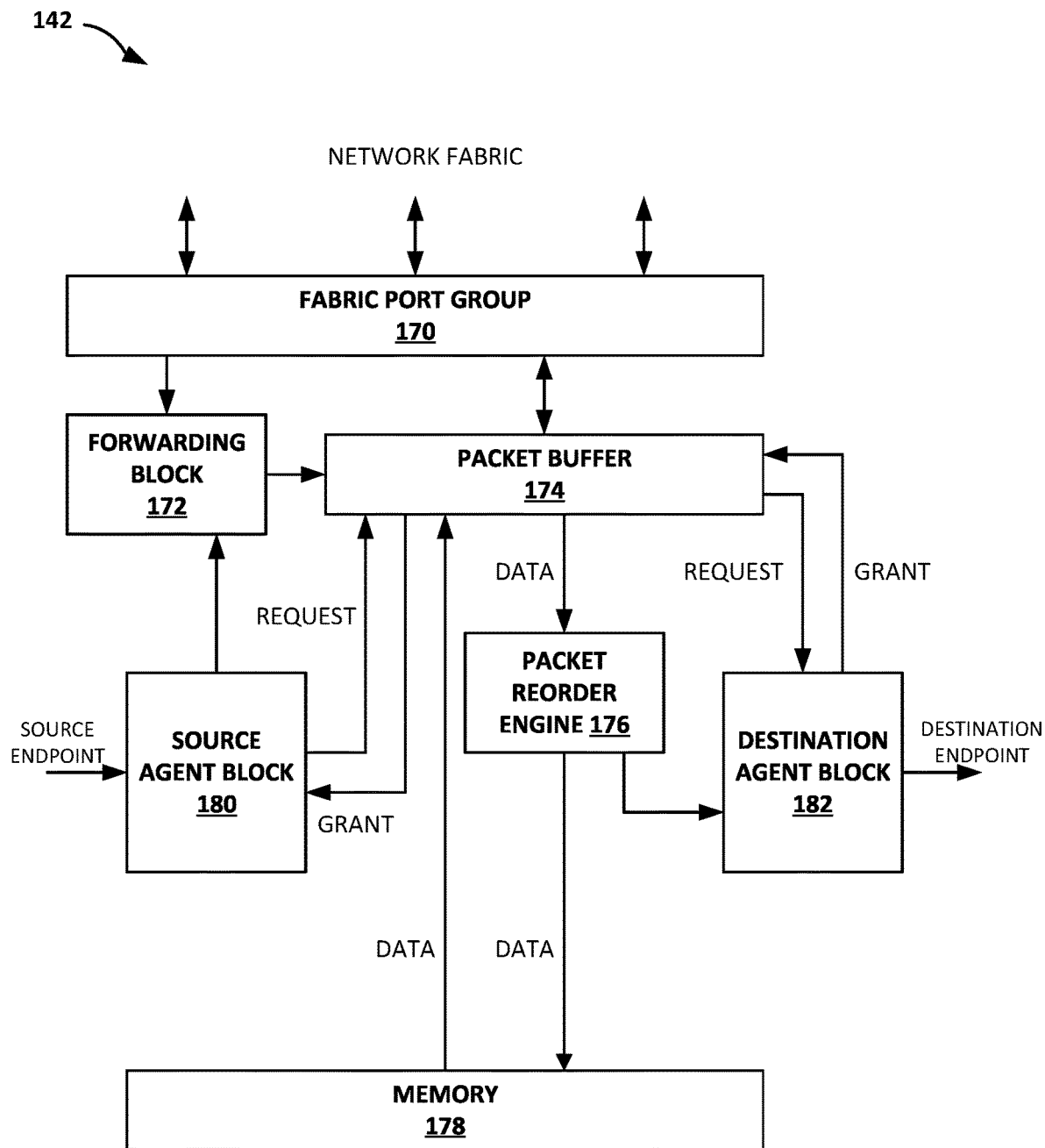
FIG. 5 is a block diagram illustrating an example networking unit of a data processing unit.

FIG. 5 is a block diagram illustrating an example networking unit 142 of DPU 130 from FIG. 4, in more detail. Networking unit (NU) 142 exposes Ethernet ports, also referred to herein as fabric ports, to connect DPU 130 to the network fabric. NU 142 supports switching packets from one fabric port to another fabric port without storing the complete packet (i.e., transit switching), which helps to achieve low latency for transit traffic. In this way, NU 142 enables creation of a fabric of DPUs with or without external switching elements. NU 142 may fulfill the following roles: (1) transmit packets from PCIe devices to the network fabric, and receive packets from the network fabric and send them to the PCIe devices; (2) support switching packets from one fabric port to another fabric port; (3) support sending network control packets to a controller; and (4) implement FCP tunneling.

As illustrated in FIG. 5, NU 142 includes a fabric port group (FPG) 170. In other examples, NU 142 may include multiple FPGs 170. FPG 170 includes two or more fabric ports connected to the network fabric. FPG 170 is configured to receive Ethernet packets from the network fabric and transmit packets to the network fabric. FPG 170 may be responsible for generating and receiving link pause and priority flow control (PFC) frames. In the receive direction, FPG 170 may have a flexible parser to parse incoming bytes and generate a parsed result vector (PRV). In the transmit direction, FPG 170 may have a packet rewrite sub-unit to modify the outgoing packets based on the rewrite instructions stored with the packet.

NU 142 has a forwarding block 172 to forward the packets coming from the fabric ports of FPG 170 and from the endpoint ports of source agent block 180. Forwarding block 172 may include a fixed pipeline configured to process one PRV, received from FPG 170 and/or source agent block 180, every cycle. The forwarding pipeline of forwarding block 172 may include the following processing sections: attributes, ingress filter, packet lookup, nexthop resolution, egress filter, packet replication, and statistics.

In the attributes processing section, different forwarding attributes, such as virtual layer 2 interface, virtual routing interface, and traffic class, are determined. These forwarding attributes are passed to further processing sections in the pipeline. In the ingress filter processing section, a search key can be prepared from different fields of a PRV and searched against programmed rules. The ingress filter block can be used to modify the normal forwarding behavior using the set of rules. In the packet lookup processing section, certain fields of the PRV are looked up in tables to determine the nexthop index. The packet lookup block supports exact match and longest prefix match lookups.

In the nexthop resolution processing section, nexthop instructions are resolved and the destination egress port and the egress queue are determined. The nexthop resolution block supports different nexthops such as final nexthop, indirect nexthop, equal cost multi-path (ECMP) nexthop, and weighted equal cost multi-path (WECMP) nexthop. The final nexthop stores the information of the egress stream and how egress packets should be rewritten. The indirect nexthop may be used by software to embed an address of the nexthop in memory, which can be used to perform an atomic nexthop update.

The WECMP nexthop may have multiple members and be used to spray packets over all links between SF components and SX components of DPUs (see, e.g., SF components 30 and SX components 32 of FIG. 3). Due to failure of links between rack and spine switches, SFs may need to spray among SXs based on the active links for a destination rack IP address. For FCP and rFCP traffic, the FCP spray engine sprays packets based on the load on each link proportional to its weight. The WECMP nexthop stores an address of the credits memory, and the FCP spray engine selects the link with the most credits and deducts its credits based on packet length. The ECMP nexthop may have multiple members and be used to spray packets over all links connected to spine switches (see, e.g., core switches 22 of FIG. 3). For FCP and rFCP traffic, the FCP spray engine again sprays packets based on the load on each link proportional to its weight. The ECMP nexthop stores an address of the credits memory, and the FCP spray engine selects the link with the most credits and deducts its credits based on packet length.

In the egress filter processing section, packets are filtered based on the egress port and the egress queue. The egress filter block cannot change the egress destination or egress queue, but can sample or mirror packets using the rule sets. If any of the processing stages has determined to create a copy of a packet, the packet replication block generates its associated data. NU 142 can create only one extra copy of the incoming packet. The statistics processing section has a set of counters to collect statistics for network management purpose. The statistics block also supports metering to control packet rate to some of the ports or queues.

NU 142 also includes a packet buffer 174 to store packets for port bandwidth oversubscription. Packet buffer 174 may be used to store three kinds of packets: (1) transmit packets received from cores 140 on the endpoint ports of source agent block 180 to be transmitted to the fabric ports of FPG 170; (2) receive packets received from the fabric ports of FPG 170 to be transmitted to cores 140 via the endpoint ports of destination agent block 182; and (3) transit packets coming on the fabric ports of FPG 170 and leaving on the fabric ports of FPG 170.

Packet buffer 174 keeps track of memory usage for traffic in different directions and priority. Based on a programmed profile, packet buffer 174 may decide to drop a packet if an egress port or queue is very congested, assert flow control to a work unit scheduler, or send pause frames to the other end. The key features supported by packet buffer 174 may include: cut-through for transit packets, weighted random early detection (WRED) drops for non-explicit congestion notification (ECN)-aware packets, ECN marking for ECN aware packets, input and output based buffer resource management, and PFC support.

NU 142 includes source agent control block 180 and destination agent control block 182 that, collectively, are responsible for FCP control packets. In other examples, source agent control block 180 and destination control block 182 may comprise a single control block. In the example where DPU 130 is operating in the request-grant mode, source agent control block 180 generates FCP request messages for every tunnel, and, in response to FCP grant messages received in response to the FCP request messages, source agent block 180 instructs packet buffer 174 to send FCP or rFCP data packets based on the amount of bandwidth allocated by the FCP grant messages. In the example where DPU 130 is operating in the unsolicited mode, source agent control block 180 instructs packet buffer 174 to send rFCP data packets that act as implicit requests. In some examples, NU 142 includes an endpoint transmit pipe (not shown) that sends packets to packet buffer 174. The endpoint transmit pipe may perform the following functions: packet spraying, packet fetching from memory 178, packet segmentation based on programmed maximum transmission unit (MTU) size, packet encapsulation, packet encryption, and packet parsing to create a PRV. In some examples, the endpoint transmit pipe may be included in source agent block 180 or packet buffer 174.

In the example where DPU 130 is operating in the request-grant mode, destination agent control block 182 generates FCP grant messages for every tunnel. In response to received FCP request messages, destination agent block 182 updates a state of the tunnel and instructs packet buffer 174 to send FCP grant messages allocating bandwidth on the tunnel, as appropriate. In the example where DPU 130 is operating in the unsolicited mode, in response to received rFCP data packets, destination agent control block 182 generates rFCP grant/ACK messages for every tunnel and instructs packet buffer 174 to send the rFCP grant/ACK messages. In response to receipt of FCP and rFCP data packets, packet buffer 174 optionally sends the received data packets to packet reorder engine 176 for reordering and reassembly before storage in memory 178. Memory 178 may comprise an on-chip memory or an external, off-chip memory. Memory 178 may comprise RAM or DRAM. In some examples, NU 142 includes an endpoint receive pipe (not shown) that receives packets from packet buffer 174. The endpoint receive pipe may perform the following functions: packet decryption, packet parsing to create a PRV, flow key generation based on the PRV, determination of one of cores 140 for the incoming packet and allocation of a buffer handle in buffer memory, send the incoming FCP and rFCP control and data packets to destination agent block 182, and write the incoming data packets to buffer memory with the allocated buffer handle.

Figure 6:
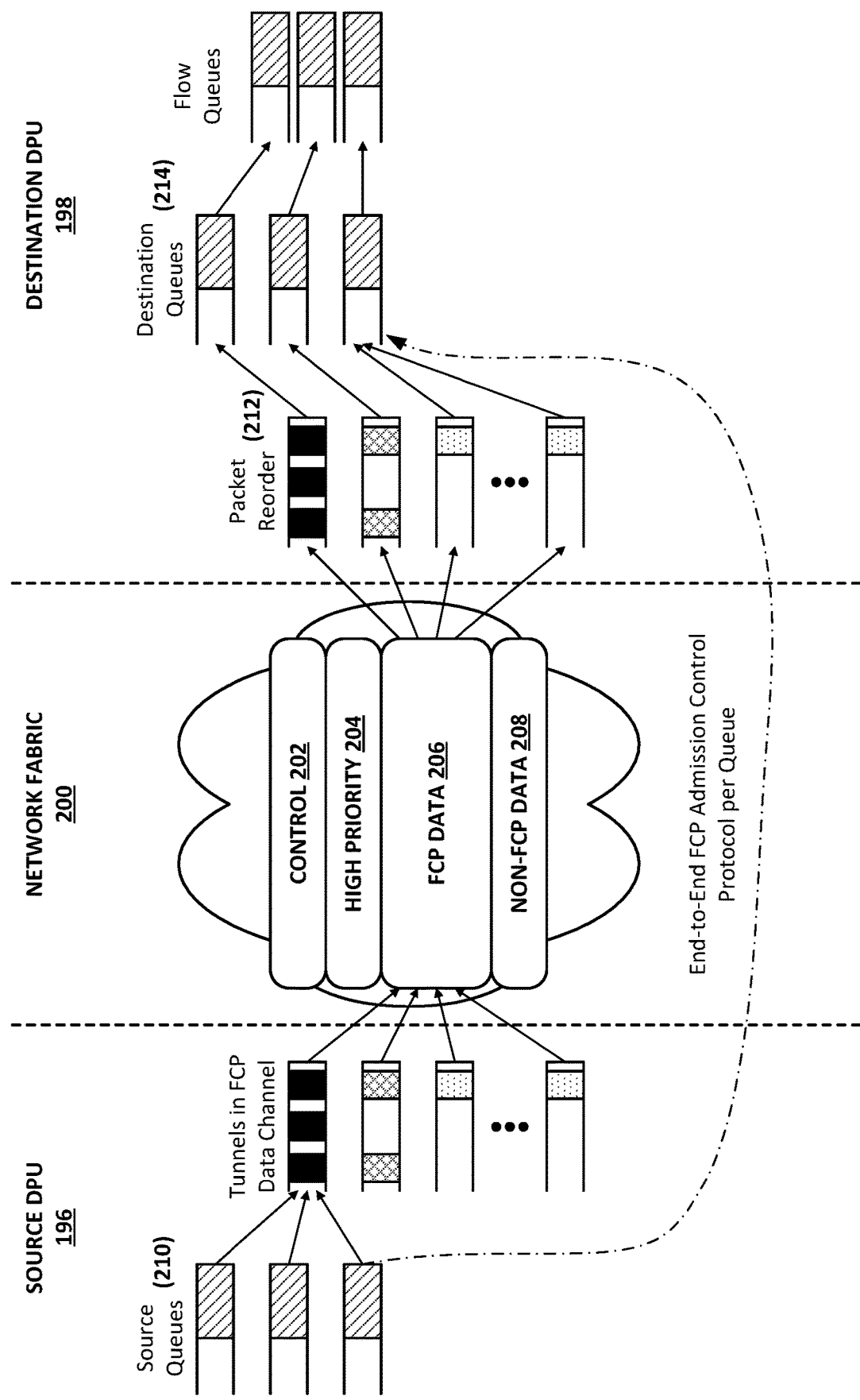
FIG. 6 is a conceptual diagram illustrating an example of flow control over a network fabric between a source data processing unit and a destination data processing unit.

FIG. 6 is a conceptual diagram illustrating an example flow control over a network fabric 200, such as a date center switch fabric or other packet-based network. As illustrated, when using FCP and rFCP, network fabric 200 is visualized as a fabric with multiple channels between a source DPU 196 and a destination DPU 198. The FCP data channel 206 carries traffic for multiple tunnels and for multiple queues within each tunnel. Each tunnel within FCP data channel 206 supports either FCP or rFCP data traffic. Each channel is designated for specific type of traffic. The various channels and their attributes are described below.

The control channel 202 has a strict priority over all other channels. Control channel 202 may be used to carry FCP grant messages and/or rFCP grant/ACK messages. The grant/ACK messages are sprayed over all available paths towards the sender node of source DPU 196. They are not expected to arrive at the sender node in order. The control channel 202 is rate limited to minimize overhead on network fabric 200. The high priority channel 204 has a higher priority over FCP data channel 206 and non-FCP data channel 208. The high priority channel 204 may be used to carry FCP request messages. The messages are sprayed over all available paths towards the receiver node of destination DPU 198, and are not expected to arrive at the receiver node in order. The high priority channel 204 is rate limited to minimize overhead on network fabric 200.

The FCP data channel 206 carries data packets using FCP tunnels and rFCP tunnels. The data channel 206 has a higher priority over a non-FCP data channel 208. The FCP or rFCP packets are sprayed over network fabric 200 through a suitable load balancing scheme. The FCP or rFCP packets are not expected to be delivered at the receiver node of destination DPU 198 in order. Destination DPU 198 may optionally implement packet reordering. The non-FCP data channel 208 carries data packets that do not use FCP or rFCP. The non-FCP data channel 208 has the lowest priority over all other channels. The FCP data channel 206 carries a strict priority over the non-FCP data channel 208. The non-FCP packets, therefore, use opportunistic bandwidth in the network and, depending upon the requirements, the FCP data rate can be controlled through request/grant-based or congestion control-based pacing schemes allowing non-FCP traffic to gain a required share of the bandwidth. The non-FCP data packets are forwarded/routed using ECMP based load balancing and for a given flow (e.g., identified by a 5-tuple) the packets are expected to be delivered in order at the receiver node of destination DPU 198. The non-FCP data channel 208 may have multiple queues with any prioritization/QoS applied at the time of scheduling the packets to the fabric.

In the example of FIG. 6, the FCP or rFCP data packets are sent between source DPU 196 and destination DPU 198 via a logical tunnel. The tunnel can support either FCP or rFCP data traffic. The tunnel is considered unidirectional and, for a destination, the incoming tunnel identifier (ID) is unique for all packets from a specific source DPU. The tunnel encapsulation may carry the packet forwarding as well as the reordering information. A single tunnel carries packets for one or multiple source queues (210) between source DPU 196 and destination DPU 198. Only the packets within a tunnel are reordered based on sequence number tags that span across queues of the same tunnel. The packets are tagged with a tunnel packet sequence number (PSN) when they are sent from the source DPU 196. The destination DPU 198 may reorder the packets based on the tunnel ID and PSN (212). The tunnel encapsulation is stripped at the end of reorder and packets are forwarded to respective destination queues (214).

The queues are defined as buckets of independent traffic streams that use FCP or rFCP to transport payload across network fabric 200. An FCP queue or rFCP queue is identified by the [Tunnel-ID, Priority] whereas the Tunnel ID is identified by the source/destination DPU pair. Alternatively, the DPUs 196, 198 may use a mapping table to derive Tunnel ID, and queue/priority pair based on an internal queue ID.

As indicated above, when source DPU 196 is operating in the request-grant mode of FCP, the FCP messages include request, grant, and data messages. The request message is generated when source DPU 196 wishes to transfer a certain amount of data to destination DPU 198. The request message carries a destination tunnel ID, queue ID, request block number (RBN) of the queue, and metadata. The request message is sent over high priority channel 204 on the network fabric 200 and the message is sprayed over all available paths. The metadata may be used to indicate a request retry among other things. The grant message is generated when destination DPU 198 responds to a request from source DPU 196 to transfer a certain amount of data. The grant message carries the source tunnel ID, queue ID, grant block number (GBN) of the queue, metadata (scale factor, etc.), and timestamp. The grant message is sent over control channel 202 on network fabric 200 and the message is sprayed over all available paths. The FCP data packets carry an FCP header including the destination tunnel ID, queue ID, packet sequence number (PSN) and data block number (DBN), and metadata. The FCP data packets are sent over an FCP tunnel of FCP data channel 206 on network fabric 200 and the packets sprayed over all available paths.

When source DPU 196 is operating in the unsolicited mode of rFCP, the rFCP messages include data messages and grant/ACK messages. The rFCP data packets carry an rFCP header including the destination tunnel ID, queue ID, PSN and DBN, and metadata. The rFCP data packets are sent over an rFCP tunnel of FCP data channel 206 on network fabric 200 and the packets sprayed over all available paths. The grant/ACK message is generated when destination DPU 198 responds to receipt of one or more rFCP data packets from source DPU 196. The grant/ACK message carries the source tunnel ID, queue ID, GBN and/or ACK block sequence number (ABN) of the queue, metadata (scale factor, etc.), and timestamp. The grant/ACK message is sent over control channel 202 on network fabric 200 and the message is sprayed over all available paths.

Figure 7:
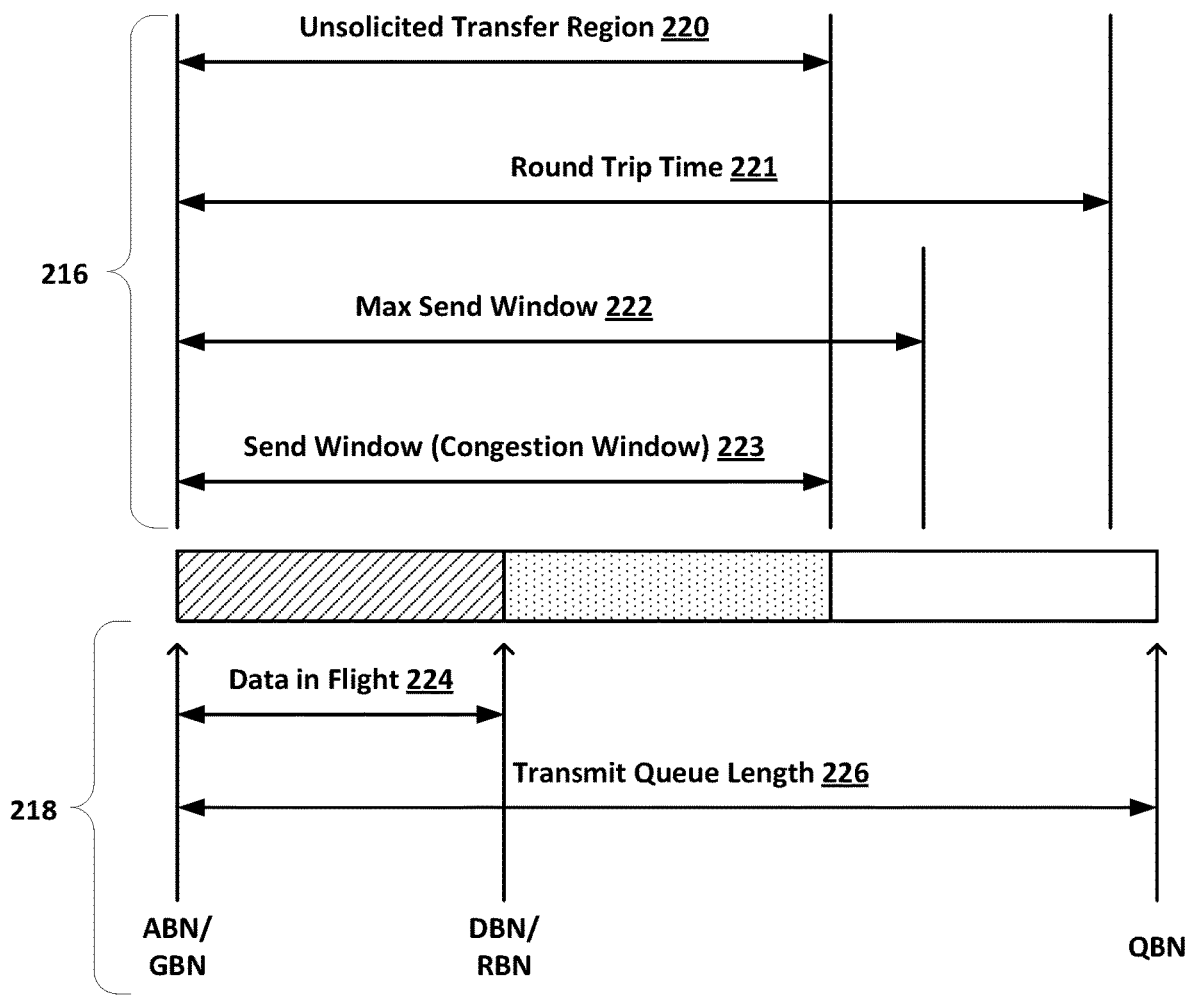
FIG. 7 is a conceptual diagram illustrating example semantics and queues of the rFCP extensions at a sender node.

FIG. 7 is a conceptual diagram illustrating example semantics 216 and an example transmit queue 218 of the rFCP extensions at a sender node. The general theory of operation of the rFCP extensions is as follows. The rFCP sender node at a source DPU receives data packets from a host. The rFCP sender enqueues the data packets in a queue and then sends the data packets to the rFCP receiver node at a destination DPU. The rFCP receiver treats the received data packets as implicit requests and issues a grant/ACK message that carries an rFCP extension header that acknowledges the data packets. The rFCP sender is configured to send just enough data packets (i.e., data in flight 224) to cover the round trip delay from data packets (DBN) to ACK packets (ABN) through use of its send window 223. The rFCP receiver, in turn, controls the rate of grants, and signals congestion at the receiver-end back to the rFCP sender as a slow down through a window scale down factor. The rFCP sender scales down the amount of data in flight 224 to reduce the congestion seen by the rFCP receiver, or reverts to request-grant exchange if the congestion persists (e.g., when data in flight 224 surpasses the send window size 223/ unsolicited transfer region 220) or if explicitly flagged by the rFCP receiver.

Since rFCP packets are sprayed over all the available links, packets may encounter congestion at various points in the network fabric. The network fabric also signals the congestion experienced through marking explicit congestion notification (ECN) on those packets. The rFCP receiver may provide information about marked packets to the rFCP sender through the grant/ACK message. The grant generation may also use a delayed ACK method and generate a grant/ACK for multiple data packets. The rFCP receiver uses an additional ACK block sequence number (ABN) to acknowledge successful delivery of the packets sent by the rFCP sender.

Transmit queue 218, illustrated in the bottom of the conceptual diagram of FIG. 7, show examples of the set of block sequence numbers maintained by the sender node to track enqueued blocks. In the example of FIG. 7, the sender node maintains a grant block sequence number (GBN) that indicates a last granted block and/or an ABN that indicates a last ACKed block, a request block sequence number (RBN) that indicates a last block for which a request has been sent and/or a data block sequence number (DBN) that indicates a last block that was sent from transmit queue 218. In other examples, the rFCP receiver node may maintain one or more receive queues that each use a similar set of block sequence numbers to track enqueued blocks. The rFCP sender node a queue tail block number (QBN) that represents a tail block of the transmit queue. The distance between QBN and ABN/GBN is the transmit queue length 226 of transmit queue 218.

As shown in FIG. 7, the rFCP sender node is allowed to send packets to the rFCP receiver node in the unsolicited mode until the data in flight 224 is equal to the send (unACKed) window size 223. If the data in flight 224 extends beyond the unsolicited transfer region 220 (which is equivalent to the send window size 223), the rFCP sender node reverts to the request-grant exchange. The send window 223 is scaled up/down based on congestion, which may be signaled by the rFCP receiver or determined by the rFCP sender. The rFCP receiver may signal congestion in three different ways. First, the rFCP receiver may indicate the number of ECN marked bytes or blocks received in every grant/ACK message that is sent back to the rFCP sender. Second, the rFCP receiver may calculate a window scale down factor which is used by the rFCP sender to scale the maximum send window. Third, the rFCP receiver may maintain the send window as being between a max segment size (MSS) and a max send window size 222, where the max segment size is, e.g., 1460 Bytes for TCP/IPv4/Ethernet. The congestion avoidance and control methods supported by the rFCP are described below.

When a packet is acknowledged, it can be retired from the transmit queue 218. The rFCP receiver is not aware of the packet boundaries when it updates an ABN in the grant/ ACK message. The rFCP sender may then determine the total number of blocks being retired by calculating (Current. ABN-GNT.ABN) and then walking through the packet or WU list retiring the packets and tracking the number of blocks retired for every packet until all of the acknowledged blocks have been retired from transmit queue 218.

The rFCP sender's ABN always points to the oldest un-ACKed packet. If the ABN does not fall on a packet boundary (which is likely), the partially ACKed packet is not retired from transmit queue 218, but is held back as the oldest unACKed packet if the packet has undergone LSO. This may be important if the outgoing packet is segmented by the transmit logic, creating multiple segmented packets. With every packet that is retired from transmit queue 218, the rFCP sender also updates an oldest or last ACKed packet sequence number (APSN). The APSN may be used by the rFCP sender during packet retransmissions.

Many rFCP senders may decide to send packets to the same rFCP receiver at the same time and since, in the unsolicited mode, the rFCP senders are allowed to send packets without admission control, several issues may occur. As one example, the network links may become congested, causing build up at queues/buffers of intermediate switches. As another example, the queue/buffer build up in the intermediate switches may cause packet loss or large reordering due to latency variations. As a further example, receiver resources, such as buffer space and reorder table space, can be overrun. To avoid deadlock, the rFCP receiver may be allowed to drop packets which will cause packet loss.

One lost packet may be recovered by the NACK mechanism, for a given flow/tunnel every round trip time (RTT) 221, which makes recovery from loss slow. As each rFCP sender is allowed to send a certain amount of data to a particular rFCP receiver without receiving an ACK, if many senders decide to send data at the same time, the receiver-end network switches or receiver buffer may be overwhelmed by the incoming packets. This situation potentially has no bound and can lead to sustained congestion and packet drops due to buffer overruns. These packet losses can be very costly for recovery through the NACK mechanism or through TCP or remote direct memory access (RDMA). This issue may be kept in control through a feedback mechanism that asks the rFCP senders to reduce the rate at which they send packets to an rFCP receiver. In this way, the rFCP extension has built-in mechanisms to avoid entering into a congested situation.

Figure 8:
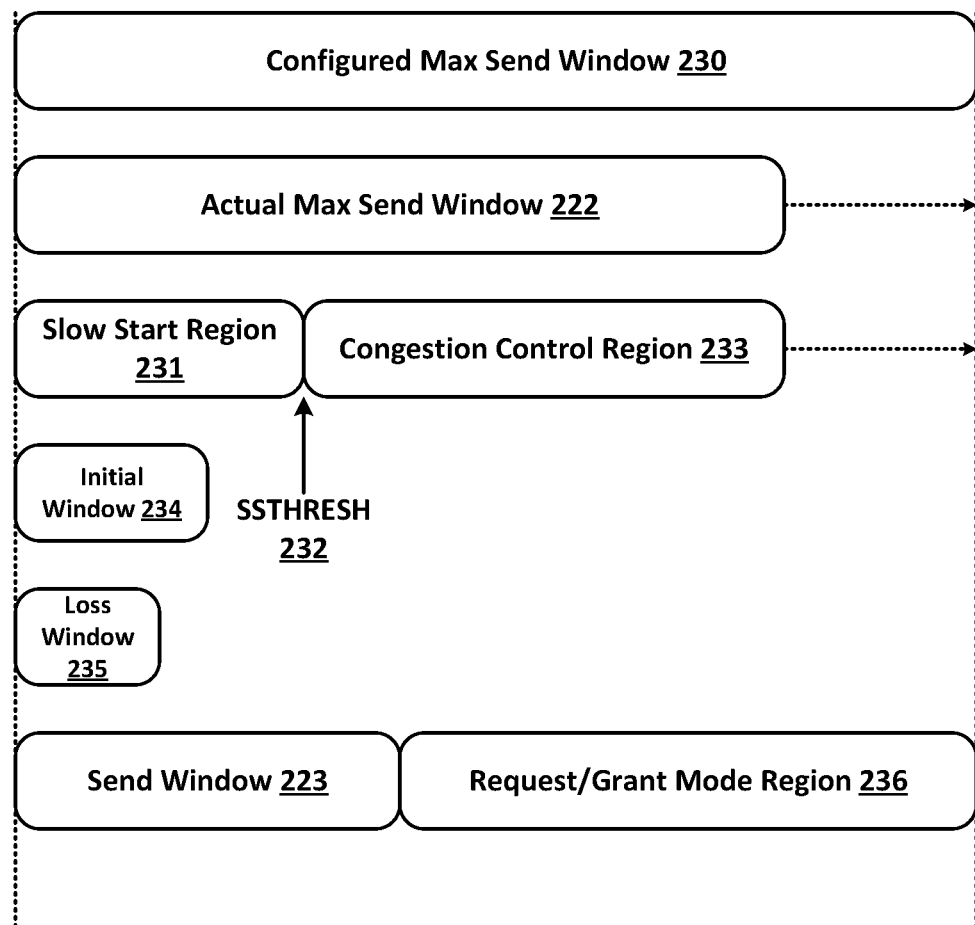
FIG. 8 is a conceptual diagram illustrating an example of send window-based congestion control mechanisms of the rFCP extensions at a sender node.

FIG. 8 is a conceptual diagram illustrating an example of send window-based congestion control mechanisms for the rFCP extensions at a sender node.

A slow start is a mechanism by which a send window 223 grows from an initial (small) window size 234 to a configurable threshold 232. In the illustrated example, the configurable threshold 232 is referred to as a slow start threshold or SSTHRESH. During the slow start, the rFCP sender learns more about the rFCP receiver congestion status with data packet-grant/ACK exchanges. If the rFCP receiver is not congested (as signaled by the lack of ECN marked packets, packet loss, or a number of active senders as seen by the receiver), then the send window 223 at the rFCP sender grows by the ACK (byte/block) size with every incoming ACK message. The slow start is based on Allman et al., "TCP Congestion Control," IETF Network Working Group, RFC 5681 September 2009.

If the rFCP send window were incremented by the max segment size (MSS) for every incoming ACK (as specified by the original TCP slow start) the window may grow very quickly if the rFCP receiver sends a flurry of small ACKs. To prevent the rFCP sender from quickly growing its send window, a more appropriate window increment is calculated as the ACKed data size. When in slow start region 231, send window 223 thus grows from an initial window size 234 to the configurable threshold 232 (e.g., SSTHRESH) with every incoming ACK. Typically, the configurable threshold 232 is set to the configured max send window size 230 as the maximum allowed send window based on the desired bandwidth and fastest RTT. If the transmit queue, once active, experiences congestion, then the configurable threshold 232 is reduced. If the configurable threshold 232 is smaller than actual max send window 222 (as happens in the case of packet loss), the send window 223 grows slower once it exceeds the configurable threshold 232. The send window 223 follows the congestion control scheme when in the congestion control region 233 (i.e., when send window 223 is greater than configurable threshold 232 and less than maximum send window 222). In congestion control region 233, the send window 223 only grows by MSS every RTT.

An rFCP transmit queue may transition to slow start region 231 whenever it becomes ACTIVE from IDLE, experiences packet loss (indicated by NACK), upon a retransmit timeout, or switches back from request-grant mode region 236 to unsolicited mode. An rFCP transmit queue may transition from the unsolicited mode to the request-grant mode region 236 when the rFCP receiver signals congestion. Once the congestion at the rFCP receiver goes away, the rFCP transmit queue may transition from the request-grant mode region 236 to slow start region 231 in the unsolicited mode and start to rebuild its send window 223 from an initial window value 234.

Congestion control region 233 works in conjunction with slow start region 231. Whenever the rFCP sender experiences a packet loss, the send window 223 is immediately set to a loss window size 235 and the configurable threshold 232 (e.g., SSTHRESH) is reduced as described above. After the packet loss, the send window 223 grows again from the loss window size 235 by the ACK size while in the slow start region 231. Once send window 223 crosses the configurable threshold 232 into the congestion control region 233, the send window 223 grows by MSS every RTT. The congestion control is also based on RFC 5681, cited above.

ECN based congestion avoidance works on top of the congestion control mechanisms described above. The packets may experience congestion at intermediate switches when traveling through the network fabric. This issue is more prominent when the rFCP sender uses an ECMP based packet spraying to choose an optimal path to send packets through the network fabric. For example, if the rFCP sender chooses to use regular ECMP for sending packets through the network, the 5-tuple used would be based on a specific FCP tunnel IP addresses and ports. This can potentially have elephant flow issues as for a given tunnel (potentially carrying several TCP flows) the packets are now bucketed in a same 5-tuple and take the same path through the network fabric. This may lead to more congestion unlike the ECMP on a regular TCP flow. To avoid the elephant flow limitation, the rFCP sender may deploy multiple tunnels between sender and receiver, allowing them to potentially choose separate paths.

The assumption is that rFCP will use a packet spray similar to FCP and the chance of congestion in network switches is reduced as the traffic is evenly distributed among all spine links. The TOR switch at the destination-end that acts as an aggregation point for a specific rFCP receiver may still experience short term congestion when there is a burst of unsolicited incast traffic. The TOR switch can mark the ECN for packets based on the congestion seen at its destination queue. The rFCP receiver receiving the marked packets can communicate information about an amount of marked bytes or blocks arriving at its queue to the rFCP sender. This will cause the rFCP senders to reduce the size of their send window 223 using the ECN based congestion control as described in Bensley et al., "Data Center TCP (DCTCP): TCP Congestion Control for Data Centers," IETF, RFC 8257 October 2017.

For an rFCP queue, the ECN based congestion control may operate as follows. The rFCP receiver's rFCP queue receives ECN marked packets. The rFCP queue state, records the total number of bytes or blocks received carrying ECN indication. The total amount of ECN marked bytes or blocks per grant/ACK are communicated back to the rFCP sender through the grant/ACK message. The marked blocks value is limited to the number of ACKed blocks per message. The rFCP sender keeps track of a ratio of marked blocks to total blocks acknowledged by the rFCP receiver for an RTT interval. Based on the ratio of marked to total blocks, the rFCP sender proportionally adjusts its send window 223 to avoid congestion from happening. To reduce a jitter in the window size variations due to ECN, the actual value of ECN factor (also known as alpha) may be calculated once every RTT. The alpha is averaged through an exponential moving window averaging algorithm. The ECN marking is an early warning causing the rFCP senders to act before a packet loss happens and when the rFCP senders reduce their send window 223 by half causing throughput loss.

As the rFCP extension uses a packet spray method to send packets to the rFCP receiver, the ECN based congestion control may not be effective as the congestion is not necessarily confined to a specific fabric path. A simpler scheme, referred to as total transmit queue length based congestion control, is proposed here for effective congestion control. The rFCP senders may continue to use slow start region 231 to send packets and regular congestion control region 233 in case of packet loss. The rFCP senders may also send a transmit queue length (TxQueueLength) value in every packet. The rFCP sender may calculate the TxQueueLength as being equal to QBN-ABN (as illustrated in FIG. 7). The rFCP receiver may signal the rFCP senders to slow down by reducing the actual max send window 222, which is equal to the configured max send window 230 scaled by a window scale down factor, if the rFCP receiver buffer has enough data to maintain throughput. The rFCP receiver may send the window scale down factor in every grant/ACK message as part of the rFCP extension header. The rFCP receiver may compute the window scale down factor based on a ratio of a total sender transmit queue length and the transmit queue length received from the specific rFCP sender node. The total sender transmit queue length may be calculated as the sum of the transmit queue lengths of all tunnel-connected rFCP senders. The rFCP sender may then calculate its actual max send window 222 as configured max send window 230 multiplied by the window scale down factor.

The rFCP receiver may communicate the congestion status to the rFCP sender through a flag in the grant/ACK message as a part of the rFCP extension header. The rFCP receiver may send the congestion status under following conditions: the receiver buffer limit is reached; the receiver reorder table limit is reached; the receiver detects loss of multiple packets in a given window; or the total sender transmit queue length as seen by the receiver is more than a set threshold. The congestion status, when set, may be cleared by an RTT timer if none of the conditions mentioned above are true for a period of RTT. The rFCP sender, upon receiving congestion status in a grant/ACK message, may react as follows: set the congestion status at the sender when the congested flag is set in the grant message; disable the unsolicited mode and switch to the request-grant mode region 236 as long as the congested status is set; set the send window 223 to the initial window 234; do not update the send window 223 when congested status is set; when the incoming grant message clears the congested status, initiate a timer to clear the congested status at the sender (typically RTT); or if the queue goes IDLE when in the congested state, the congested status is reset by an aging timer.

All of the above described congestion avoidance schemes are mutually independent, but may work together to achieve the desired congestion avoidance and control, as illustrated in FIG. 8. The rFCP sender calculates the send window 223 based on a combination of all the congestion avoidance and control schemes described above. Depending on the current window region (e.g., slow start region 231, congestion control region 233, or request/grant mode region 236) and congestion input (such as packet loss, ECN, and window scale down factor), the rFCP sender calculates a new send window value 223.

For the rFCP extension, the considerations with respect to packet reorder and receiver resources may be different than for FCP. Many rFCP senders sending data at the rFCP receiver may cause congestion at the destination-end TOR switch, the receiver staging buffer (PSW), or the receiver buffer itself. This incast of uncontrolled flow of packets at the rFCP receiver may cause the following problems: the receiver buffer may become full and yet all the received packets may be out of order thereby halting processing of any of the packets; the receiver buffer may not be full but the receiver does not have any reorder database entries to absorb the incoming packets; the reorder timeout becomes futile at the receiver since it is unable to absorb the retransmitted (NACKed) packets that may potentially fill a hole in reorder sequence and allow multiple packets to be processed by the receiver. In all of the above cases, the rFCP receiver will need to drop some of the incoming traffic due to lack of resources to process them. The packet drop for rFCP traffic may be inevitable, so the regular FCP traffic may be separated from the impact of incast burst of rFCP traffic so as to not suffer packet loss. For example, the reorder database may be logically partitioned between request-grant FCP and rFCP tunnels.

For rFCP, a deadlock avoidance threshold may be configured such that the reorder database drops any out of order packets once the database utilization level reaches the deadlock avoidance. The remaining entries may be reserved to accept in order packets that will potentially fill-up holes and drain some of the packets from the database. The reorder state machine may keep a record of highest dropped packet sequence number so that it can signal rFCP state machine to generate a NACK without waiting for slower sender retransmit timeout. The rFCP receiver buffer pools or any other resources such as buffer pointers, work units, etc. for the FCP and rFCP may be separate, and for rFCP, similar deadlock avoidance mechanisms may be employed. The FCP resources may be separately configured and not overlap the rFCP resources.

Figure 9A:
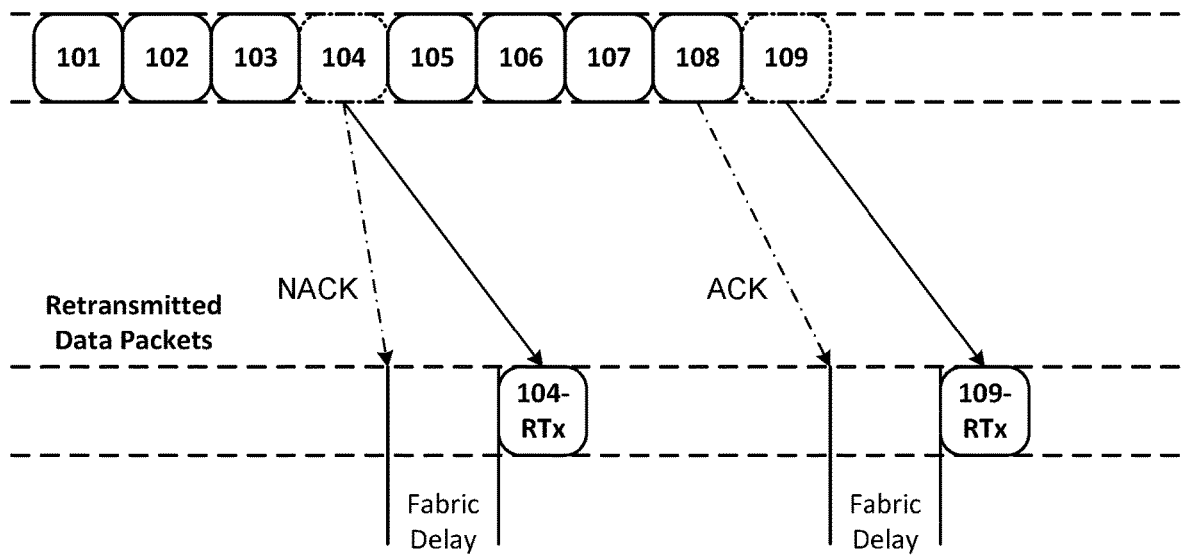
FIG. 9A is a conceptual diagram illustrating example retry mechanisms of the rFCP extensions for lost data packets at a receiver node.

FIG. 9A is a conceptual diagram illustrating example retry mechanisms of the rFCP extensions for lost data packets at a receiver node 238. The rFCP protocol is designed to be resilient to any kind of packet loss and recover from data, ACK or NACK packet loss with the help of built-in timer. Data packet loss resiliency is described with respect to FIG. 9A, and ACK and NACK packet loss is described with respect to FIG. 9B.

Data packet loss can be viewed as two kinds of packet loss scenarios. Either the packet loss could happen in a middle of stream of packets or an unlucky scenario where the last packet during a transfer could be lost and the rFCP sender does not have any more data to send. In the first scenario, the packet loss occurs somewhere in middle of a stream of packets (e.g., data packet 104 illustrated using dotted lines to denote that it was not received by receiver node 238). The rFCP receiver node 238 detects the packet loss of data packet 104 via re-order timeout. The rFCP receiver 238 then sends a grant/NACK for data packet 103 as the last correctly received data packet to the rFCP sender node indicating a packet loss. In response, the rFCP sender node retransmits the last un-ACKed packet and the rFCP receiver 238 receives the retransmitted packet (e.g., data packet 104-RTx) and makes forward progress.

In the second scenario, the last packet of the packet stream is lost (e.g., data packet 109 illustrated using dotted lines to denote that it was not received by receiver node 238). The rFCP sender queue goes IDLE after sending the last packet. The rFCP receiver 238 never gets the last packet, and generates a grant/ACK for data packet 108 as the last correctly received data packet to the rFCP sender node. The rFCP sender is waiting for an ACK for data packet 109 and, when it is not received, eventually times out and retransmits the last un-ACKed packet. The rFCP receiver 238 then receives the retransmitted packet (e.g., data packet 109-RTx) and sends an ACK for data packet 109. With both rFCP receiver 238 re-order timeout and rFCP sender retransmit timeout, any data packet loss may be recovered by rFCP.

Figure 9B:
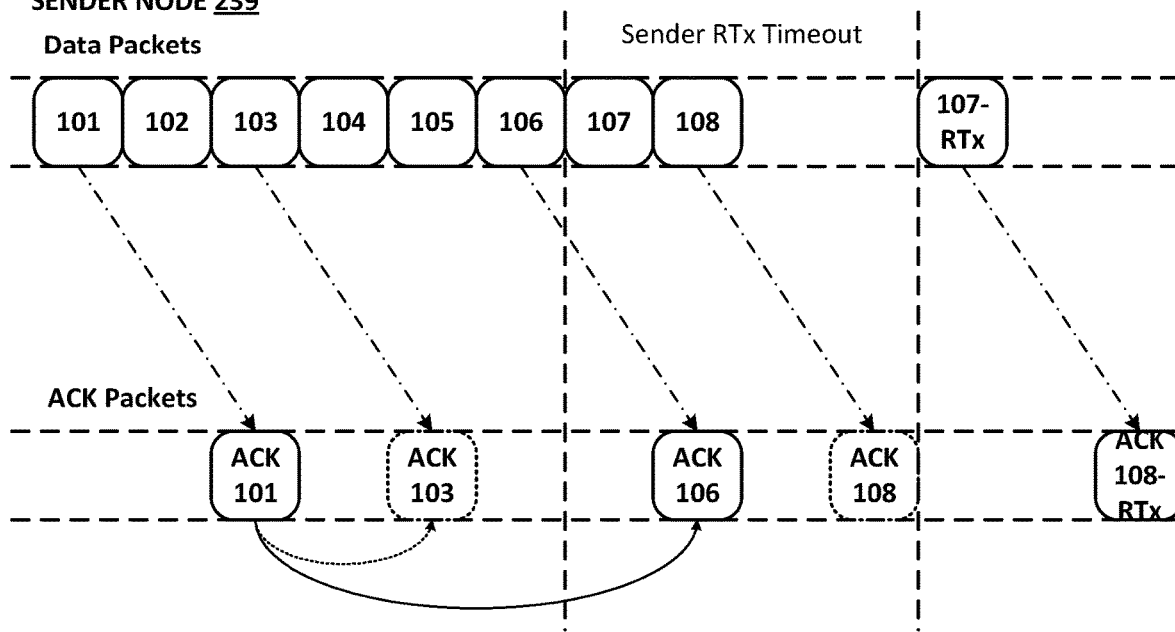
FIG. 9B is a conceptual diagram illustrating example retry mechanisms of the rFCP extensions for lost acknowledgement packets at a sender node.

FIG. 9B is a conceptual diagram illustrating example retry mechanisms of the rFCP extensions for lost acknowledgement packets at a sender node 239. For the rFCP extension, the grant packets carrying ACK or NACK are similar in the sense that they both communicate the ACK block number (ABN) pointing to the last correctly received data packet. The NACK flag additionally instructs the rFCP sender 239 to send the oldest un-ACKed packet. Similar to data packets, the grant packets carrying ACK or NACK can get lost in the network. Though the probability is small for a loss of the grant packets as they are relatively small and are sent over highest priority class to minimize latency or packet drops due to congestion, packet loss can still occur due to link-faults, bit-errors, etc. The rFCP extension is resilient to such losses.

In the example illustrated in FIG. 9B, the rFCP sender 239 sends data packets 101 through 108. The rFCP receiver sends grant/ACK packets 101, 103, 106 and 108. During the transit, the ACKs 103 and 108 (illustrated using dotted lines) are lost and thus not received by the rFCP sender 239. As the rFCP sender 239 receives ACKs 101 and 106, it considers that all the data packets through 106 are ACKed and the loss of the ACK 103 is completely transparent to the sender 239. When the rFCP sender 239 does not receive the ACK 108, however, the sender 239 eventually times out and retransmits the last un-ACKed packet (e.g., data packet 107-RTx). The rFCP receiver has already received data packet 107 so the new incoming data packet 107-RTx is dropped by the receiver. However, since the rFCP sender 239 set the RTx flag in the retransmitted data packet 107-RTx, the rFCP receiver treats the duplicate packet as a loss of ACK and retransmits ACK 108-RTx to the rFCP sender 239. Once the rFCP sender 239 receives the ACK 108-RTx, it retires data packets 107-108 from its transit queue as successfully delivered to the receiver.

As another example, if there were more data packets following data packet 108 (e.g., 109, 110 (not shown in FIG. 9B)) and the rFCP receiver received data packet 110 but detected a missing data packet 109 via re-order timeout, the rFCP receiver would send a grant/NACK 108 as the last correctly received data packet to the rFCP sender node 239 indicating a packet loss (instead of the grant/ACK 108 as described above). In the case where that NACK 108 is lost, the rFCP sender 239 would eventually time out and retransmit data packet 107-RTx as the last un-ACKed packet. After receiving the duplicate data packet 107-RTx, the rFCP receiver retransmits NACK 108-RTx, asking the rFCP sender 239 to retire data packets 107-108 from the transmit queue and retransmit data packet 109. Thus, for any kind of packet loss, the rFCP extension relies on retry timers to recover and remain resilient.

If there is a link loss, assuming all packets are of approximately same length, every Nth packet is lost and needs to be recovered one at a time by a single (per lost packet) NACK mechanism. The idea of S-NACK (Selective NACK) is an optimization over single packet NACK. The rFCP receiver sends an N-bit vector (e.g., 32-bit vector) to the rFCP sender marking all the missing packets in the next expected sequence of N consecutive packets. Once the rFCP receiver encounters a reorder timeout for a packet sequence on a given tunnel, the receiver may create the bit vector of missing packets. The rFCP sender may use the information provided in the bit vector to selectively send the missing packets to the receiver, thereby improving the recovery of multiple packet loss by a significant factor. The rFCP receiver maintains a state for the sent NACK bit vector and may retry NACKs until all the missing packets are received. For successive NACK retries, the bit vector and ABN reflect the successfully received missing packets.

There are many possible root causes for unreliability in a network-links may break, switch hardware may fail permanently or intermittently, packets may be dropped due to congestion, and software bugs and operational errors may provoke failures. All of these causes ultimately result in packets being lost in transit from a source to a destination. At one extreme is the low probability of losing a packet to bit errors; at the other extreme is the relatively high probability of packet loss due to network congestion.

Failures can be broadly classified as transient or permanent. In a transient failure some network component (node or link) loses packets for a short time—there is no permanent damage, and the component continues to operate normally after a short hiccup. In a permanent failure the component stops operating entirely, and it is up to the network to re-route traffic around the failure. Transient failures are typically detected by adding redundancy to packets. Permanent failures are detected via loss of signal (LOS) or time-outs for "hello" messages between neighboring nodes. One category of failures that is not easily detected by current networks is silent packet drops by switches. Operators currently gather extensive telemetry from switches to figure out where packets are being black-holed by collecting stats of how many packets went in vs. how many came out.

The state of the art is to build internal data center networks using a multi-tier Clos topology using switches or routers with all forwarding done at the IP layer. There are three techniques used for populating forwarding tables in switches and consequently also three recovery techniques. First, unassisted border gateway protocol (BGP) in which switches run BGP to determine the network topology and populate forwarding tables. Second, assisted BGP in which, in addition to switches running BGP, a central controller potentially overrides the forwarding tables in switches to achieve some effect like better load balancing. Third, controller only in which a centralized controller computes the forwarding tables and distributes them to switches. There is no BGP in this technique. Following a failure, a node will detect the failure within tens of milliseconds if the detection is hello based and within microseconds if it is LOS based. Recovery from the detected failure may occur within hundreds of milliseconds to multiple seconds, during which time all packets that traverse a failed link or node will continue to be black-holed.

FCP includes a fast failure recovery mechanism that uses LOS as the principal detection mechanism. A DPU that detects LOS from its neighbor notifies all DPUs with which it has tunnels established about the failure. The notification may be in the form of a global path health (GPH) vector that has one bit for each possible path between the detecting DPU and a notified DPU. For example, a GPH vector may be 128 bits arising from 128 possible paths that exist in a network of DPUs with 8 DPUs per logical rack and 16 connections to core switches. In FCP, GPH vectors may be communicated with request/grant packets and data packets as long as the path failure exists. This GPH vector mechanism may be insufficient because it can only handle failures of links and nodes immediately adjacent to a DPU.

The techniques described in this disclosure include a retry mechanism included in rFCP. The retry mechanism uses per tunnel PSNs to detect missing packets at a rFCP receiver node of a destination DPU via fast timeout. Once the rFCP receiver has detected a missing packet, it issues a NACK for that packet. The retry mechanism further uses per tunnel path numbers to identify the path on which the detected missing packet was sent. The rFCP receiver then avoids use of the identified path when sending the NACK for the missing packet to a rFCP sender node of a source DPU and includes the identified path number in the NACK such that the rFCP sender node may also avoid use of the identified path when retransmitting the missing packet.

Every rFCP packet may be required to carry, e.g., within the 16-bit UDP source port, two 8-bit path numbers: the number of the path along which this packet is to be sent (current path number (CPN)), and the number of the path along which the immediately preceding packet for this tunnel was sent (preceding path number (PPN)). The PPN of the packet immediately following the missing packet is now used by the rFCP receiver to send the NACK along any path except the PPN path since this path has likely failed. This PPN is also placed in an avoid path number (APN) field of the NACK to signal the rFCP sender node to also avoid the APN path. Note that the NACK packet is an rFCP packet so it will have its own PPN/CPN values in the UDP source port field. The CPN of the NACK packet should be set to anything but the APN path; the PPN of the NACK packet should be set to the path taken by the previous packet going in the same direction. When an rFCP sender node receives a NACK (APN, PSN) for a tunnel, it retransmits the packet PSN along any path except the APN path.

The entire process of detection and retransmission is likely to take approximately 50 microseconds during which the tunnel is stalled. The implication of this is that while the broken path exists, the tunnel will not be able to operate at full rate. The degraded performance will persist until routing protocol software has fixed the tables in the switches so as to avoid the hidden broken path. As noted above, this time can be many seconds.

To improve this performance, techniques described in this disclosure include mechanisms for an rFCP receiver node at a destination DPU to monitor the frequency of reorder timeouts on each of its paths (e.g., 256 paths). If reorder timeouts for a path occur at a rate higher than some threshold, the rFCP receiver node sends a notification to a rFCP sender node of a source DPU to avoid use of the path. In some examples, the rFCP receiver node of the destination DPU may send a notification to all tunnel-connected DPUs to not use one or more identified broken paths. In one example, the notification may be similar to the existing GPH vector mechanism in FCP except the trigger is not LOS but a high time-out rate.

The proposed scheme recovers from permanent failures visible to a DPU within approximately 50 microseconds by removing the broken path(s). Packets black-holed during this period are retransmitted so there is no packet loss. The proposed scheme also recovers from permanent failures not directly visible to a DPU, and similarly no packets are lost because they are retransmitted. The proposed scheme not only handles all permanent failures, but it handles transient failures anywhere in the network between DPUs. The cost of this scheme is low.

Figure 10:
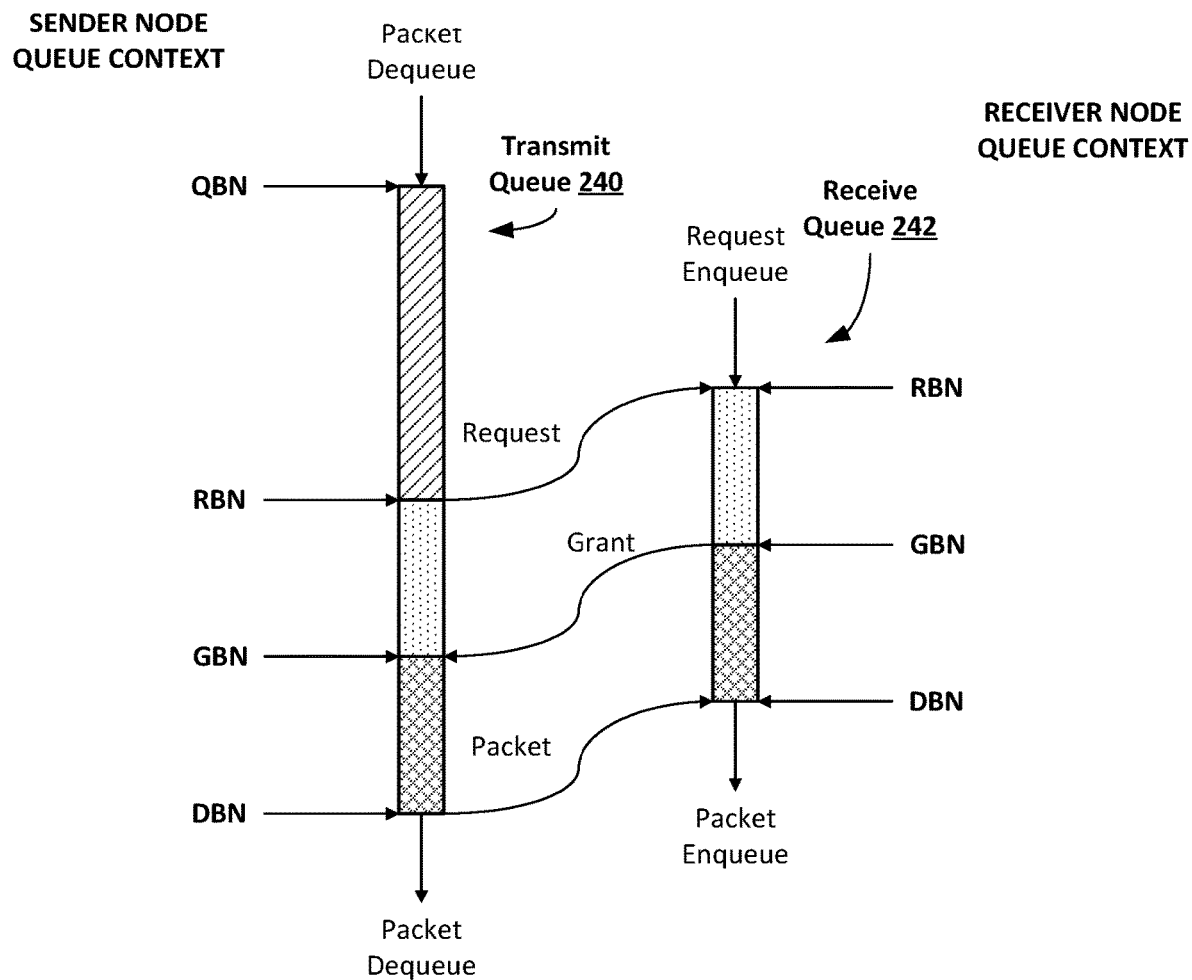
FIG. 10 is a conceptual diagram illustrating an example of FCP queue contexts at sender and receiver nodes.

FIG. 10 is a conceptual diagram illustrating an example of FCP queue contexts at sender and receiver nodes. Each FCP queue at a DPU endpoint maintains a set of block sequence numbers for respective sender/receiver queues to track the queue state. The sequence numbers indicate the amount of data that has flown through the queue at any given time. The sequence numbers may be in units of bytes (similar to TCP), or in units of blocks (to reduce FCP header overheads). The block size may be 64, 128, or 256 Bytes, and may be negotiated at the time of FCP connection setup. As one example, the FCP header may carry a 16-bit block sequence number and span over 8 MBytes of data (128B) before wrapping around. In this example, the assumption is that the round trip time (RTT) or network delay is too low for the sequence number to wrap around in one RTT.

To support FCP, each DPU endpoint maintains the following set of block sequence numbers to track enqueued blocks, pending requests, or pending/ungranted blocks. A queue tail block number (QBN) represents the tail block in the transmit queue 240 at the FCP sender. Fabric transmit/output queue 240 keeps track of incoming packets (WUs) available for transmission to the FCP receiver in units of blocks. Once a WU is added to the queue 240, the QBN is incremented as follows: QBN+=WU_size/block_size. The transmit queue 240 only keeps track of WU boundaries at the time of dequeue, which guarantees never to transmit partial WUs on the fabric. A WU however may be split into multiple maximum transmission unit (MTU) size packets at the time of transmission.

At the FCP sender, request block number (RBN) indicates the last block for which a request has been sent over the fabric by the FCP sender. The difference between QBN and RBN at the FCP sender represents the number of unrequested blocks in the transmit queue 240. If QBN is larger than RBN, the FCP sender can send a request message for the unrequested blocks through a local request scheduler. The local request scheduler may rate limit the outgoing request messages. It may also throttle down overall requested bandwidth throughput via a request rate limiter as a function of long term "near" fabric congestion. The near fabric congestion is termed as a local phenomenon at the FCP sender due to spine link loss. RBN is incremented based on the maximum allowed/configured request size. The outgoing request message carries the updated RBN value. At the FCP receiver, RBN indicates the last block for which a request is received from the fabric by the FCP receiver.

When a request message arrives out of order at the FCP receiver, the FCP receiver updates its RBN with the message RBN if the request message RBN is newer compared to previously accepted RBN. Out of order request messages are discarded if they carry RBN older than the accepted RBN. When a request message is lost, the subsequent request message carrying a newer RBN successfully updates the RBN at the FCP receiver, thus recovering from the lost request message.

If the FCP sender sends its last request message and the request message gets lost, the FCP receiver is not aware of the request message loss since it was the last request from the FCP sender. The FCP sender may maintain a request retry timer and if, at the end of timeout, the FCP sender has not received a grant message, the FCP sender may retransmit the request again in an attempt to recover from presumed loss.

At the FCP receiver, grant block number (GBN) indicates the last granted block in the receive queue 242. The distance between RBN and GBN represents the number of ungranted blocks at the receive queue 242. An egress grant scheduler may move GBN forward after grant is issued for the receive queue 242. The GBN is updated by the minimum of an allowed grant size or the difference between RBN and GBN. At the FCP sender, GBN indicates the last block number that is granted by the FCP receiver. GBN, like RBN, may not conform to a WU boundary in the output queue 240. The distance between RBN and GBN represents the number of ungranted blocks at the transmit queue 240. The transmitter is allowed to go over the GBN to complete the current WU processing.

When grant messages arrive out of order at the FCP sender, the FCP sender updates its GBN with the newest GBN compared to previously accepted GBN. Out of order grant messages are discarded if they carry GBN older than the accepted GBN. When a grant message is lost, the subsequent grant message successfully updates the GBN at the FCP sender, thus recovering from the lost grant message.

When the FCP receiver sends a last grant message and the grant message is lost or when the FCP sender receives the grant and sends the packet that is dropped in the fabric, the FCP receiver is not aware of the grant message loss or the packet loss since it only knows that it sent the grant and failed to get a packet back. If there are more packets in the tunnel, the tunnel will recover from the loss due to reorder timeout. The FCP receiver may maintain a timeout and if, at the end of timeout, the FCP receiver has not received a packet, the FCP receiver retransmits the grant again in an attempt to recover from the grant/packet loss. In response to the timeout grant, if the FCP sender has already sent the packet, the FCP sender may send a packet with zero payload, only carrying the DBN. The zero length packet travels through regular data channel and updates the receiver state for the packet loss. In response to the timeout grant, if the FCP sender did not receive the earlier grant, the FCP sender responds to the timeout grant with a regular packet transmission.

At the FCP sender, data block number (DBN) indicates the last block that was transmitted from the transmit queue 240. The distance between the GBN and DBN represents the number of granted blocks to be transmitted. The transmitter is allowed to transmit blocks till the end of a current WU segment. At the FCP receiver, DBN indicates the last block that has been received after the reorder processing is complete. The DBN is updated when the packet is received from the fabric. The distance between GBN and DBN represents pending number of granted blocks not yet received or awaiting reorder at receive queue 242.

When a data packet arrives out of order at FCP receiver, it may go through a packet reorder engine. At the end of reorder process, the packets are sent to one of the processing cores (e.g., cores 140 from FIG. 4). If a packet is lost in the fabric, the reorder engine times out and moves on to the next packet provided there are more packets in the tunnel after the lost packet. If the packet is the last packet in the sender queue at the FCP sender, the loss may be detected after a timeout grant described above. The FCP sender may send a zero length packet in response to the timeout grant and the FCP receiver updates its state when the zero length packet is received. The lost packet is recovered through upper layer protocols.

FIGS. 11A-11B are conceptual diagrams illustrating examples of rFCP extension queue contexts at sender and receiver nodes. The FCP uses packet sequence numbers for packet spray/reorder spanning across multiple FCP queues that belong to same FCP tunnel. This may become an issue to support generation of NACK messages for selective packet retransmission for missing packets on a given queue because the packet loss in the FCP tunnel cannot be associated to a specific FCP queue. For packet retransmission support, the packet sequence number must be associated with the FCP queue and not the FCP tunnel. A single rFCP queue, therefore, is mapped to a single FCP tunnel.

FIG. 11A illustrates an example of the rFCP sender node queue context. Illustrated rFCP transmit queue 244 may be substantially similar to transmit queue 218 described with respect to FIG. 7. The QBN represents the tail block in transmit queue 244 at the rFCP sender. The ABN/GBN indicates a last ACKed or granted block. The DBN/RBN indicates a last block that was sent (or the last block for which an implicit request was sent) from transmit queue 218. The distance between the ABN/GBN and DBN/RBN represents the number of transmitted blocks to be acknowledged. The distance between QBN and ABN/GBN is the transmit queue length of transmit queue 244.

The rFCP transmit queue 244 is allowed to send packets until a send window of data is transmitted without receiving an ACK. The rFCP transmit queue 244 may exceed the send window by at most a maximum transmission unit (MTU) sized packet as once the packet is scheduled, the transmission only stops at the packet/WU boundary. The rFCP sender may only advance the window when the transmitted packets are ACKed by a grant message carrying the ABN or by a NACK with a block number greater than the ABN. The send window may be configured to cover for RTT and the desired bandwidth or what is popularly known as BDP or Bandwidth Delay Product.

The rFCP sender queue context includes transmit queue 244 and a retransmit queue (not shown). The rFCP sender may keep track of the packet sequence numbers of ACKed packets when it needs to retransmit the oldest un-ACKed packet. The sender-end retransmission can be triggered by a NACK or a retransmit timer event at the rFCP sender upon which the oldest un-ACKed packet is retransmitted and carries the presumed packet sequence number of the next expected packet by the destination. The APSN (i.e., the last ACKed packet sequence number) allows the rFCP sender to retransmit the oldest un-ACKed packet. The incoming ACK may acknowledge multiple packets and the last ABN may not fall on a WU/packet boundary. For the purpose of retransmission, the rFCP sender may assume the partially ACKed packet as not ACKed, and hold the WU in the retransmit queue. In the case of LSO support, this allows the whole WU carrying multiple packets to be retransmitted in case a packet loss occurs for a packet that is part of bigger WU undergoing segmentation.

The transmit queue 244 holds the WUs/packets that are yet to be transmitted to the destination. The rFCP sender is allowed to transmit packets from the transmit queue 244 as long as the window for pending ACK packets has not been reached. The retransmit queue holds the packets that are transmitted but not ACKed by the rFCP receiver. Whenever a new ACK message is received, the retransmit queue head moves to the end of the WU that falls within the ABN boundary.

FIG. 11B illustrates an example of the rFCP receiver node queue context. The rFCP receiver queue context includes an rFCP receive queue 245 and an FCP receive queue 246 depending on whether the packets are transmitted using the unsolicited mode or the request-grant mode.

The rFCP receive queue 245, used for the unsolicited mode of rFCP, maintains the DBN indicating the last block that has been received and the ABN/GBN indicating the last ACKed or granted block. The distance between the DBN and ABN/GBN represents the number of unacknowledged or ungranted received blocks at rFCP receive queue 245.

FCP receive queue 246, used for the request-grant mode of either FCP or rFCP, may be substantially similar to receive queue 242 described with respect to FIG. 10. The RBN indicates the last block for which a request is received, the GBN indicates the last granted block, and the DBN indicates the last block that has been received. The distance between RBN and GBN represents the number of ungranted blocks at FCP receive queue 246, and the distance between GBN and DBN represents the number of granted blocks not yet received at FCP receive queue 246. The ABN indicated the last ACKed block, and the distance between the DBN and ABN represents the number of unacknowledged received blocks at FCP receive queue 246.

The rFCP receiver may provision enough buffer space to receive packets from all configured rFCP senders without generating any ACKs. As rFCP relies on a configured window allocated to every eligible rFCP sender and provisioned sender bandwidth to limit buffer overruns at the rFCP receiver end point and limit buffer overruns in the intermediate fabric switches.

Figure 12:
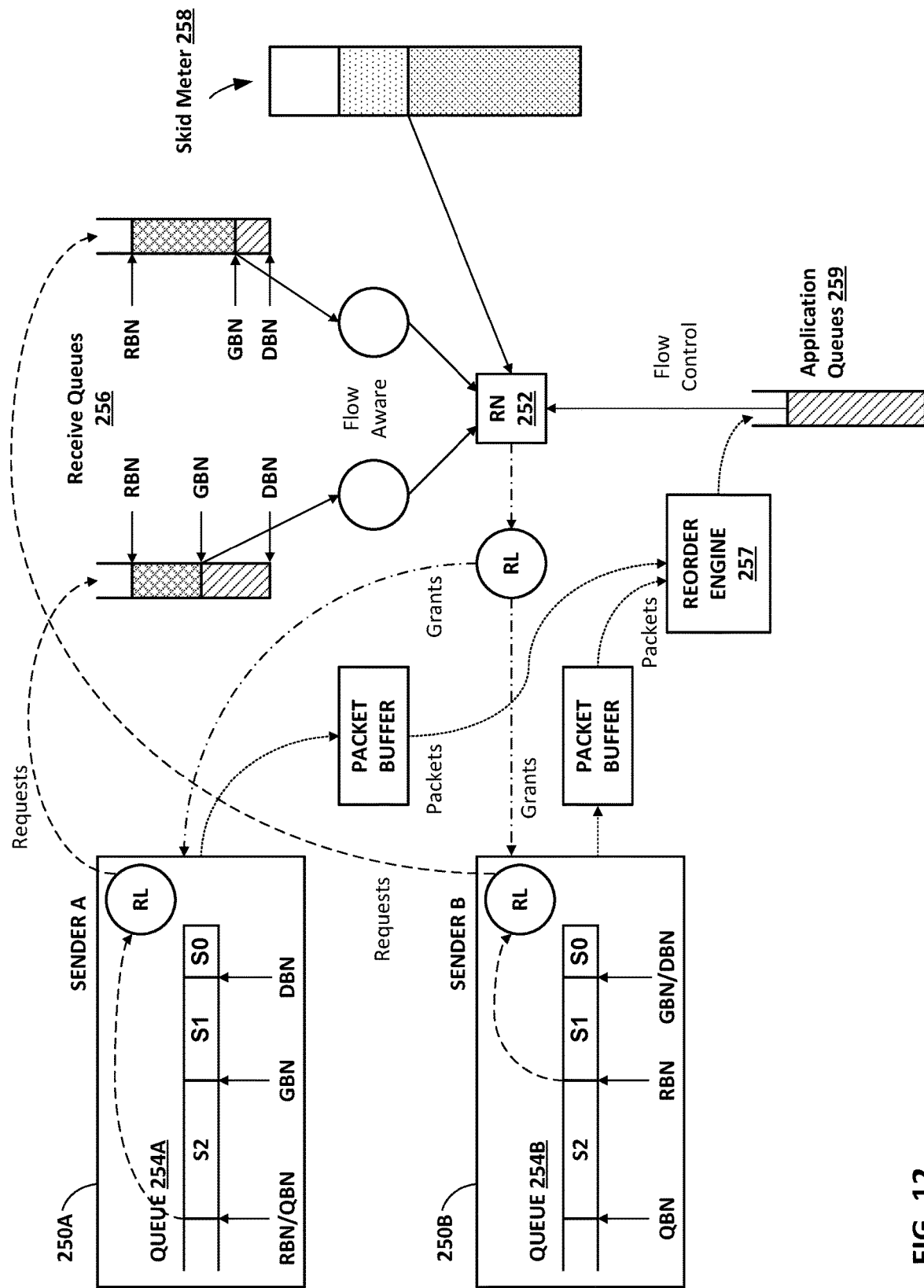
FIG. 12 is a conceptual diagram illustrating an example FCP operation to transfer an input packet stream from a sender node to a receiver node.

FIG. 12 is a conceptual diagram illustrating an example FCP operation to transfer an input packet stream from a sender node to a receiver node. The main goal of the FCP protocol is to transfer an input packet stream from one endpoint to another endpoint in an efficient manner with predictable latency maximizing fabric utilization. The FCP sender sprays packets among available paths. The FCP receiver reorders the packets of a queue-pair based on packet sequence numbers. Conceptually, FIG. 12 describes the handshake between transmit/receive queues.

The example of FIG. 12 includes two FCP sender nodes 250A and 250B (collectively "sender nodes 250"), each has a queue 254A, 254B of packets to be transmitted to the same FCP receiver node ("RN") 252. Receiver node 252 maintains receive queues 256. Sender nodes 250 request bandwidth for the packets within queues 254A, 254B by sending the request messages (shown as dashed lines) to respective receive queues 256 at receiver node 252. The requests are paced using rate limiters (RLs) of sender nodes 250.

Receiver node 252 distributes bandwidth in response to the request messages by sending the grant messages (shown as dot-and-dashed lines) to sender nodes 250. Distribution of egress bandwidth may be traffic flow weight aware. Receiver node 252 keeps track of buffer occupancy, pending grants based on skid meter 258, and tracks long term fabric congestion to pace out grant messages. The grants are paced by a rate limiter (RL) of receiver node 252 at slightly lower than maximum rate to make sure that the fabric buffering is minimal or the fabric latency jitter is low. The level of skid meter 258 can be used to control the number of pending bytes on the fabric. The skid meter 258 is incremented on the grant transmit time and decremented on the packet arrival time. Receiver node 252 recovers from a request loss or an out of order request arrival based on the request number in the message. The lost request messages are recovered by a next incoming request message.

In response to the grant messages, sender nodes 250 transmit packets (illustrated as dotted lines) from queues 254A, 254B to receiver node 252. At a packet reorder engine 257 of receiver node 252, the packets may be reordered on a per tunnel context before they are pushed to application queues 259. The example of FIG. 12 shows that receiver node 252 may be performing packet reordering and enqueuing a packet after the reorder is complete. Due to packet loss, the reorder engine times out and enqueues the next packet in order for processing.

To reduce the amount of reorder resources required to support the protocol, the request/grant messages are not reordered when received by the endpoint node. Instead, the sliding window queue block sequence numbers are cumulative. Due to the sliding window nature of request/grant handshake, each new message provides updated information about the window. Receiver node 252, hence, only needs to pay attention to the message that updates the window going forward. The block sequence numbers are used such that the endpoint node only needs to remember the highest sequence number received for each type of message that updates the forward window movement.

Figure 13:
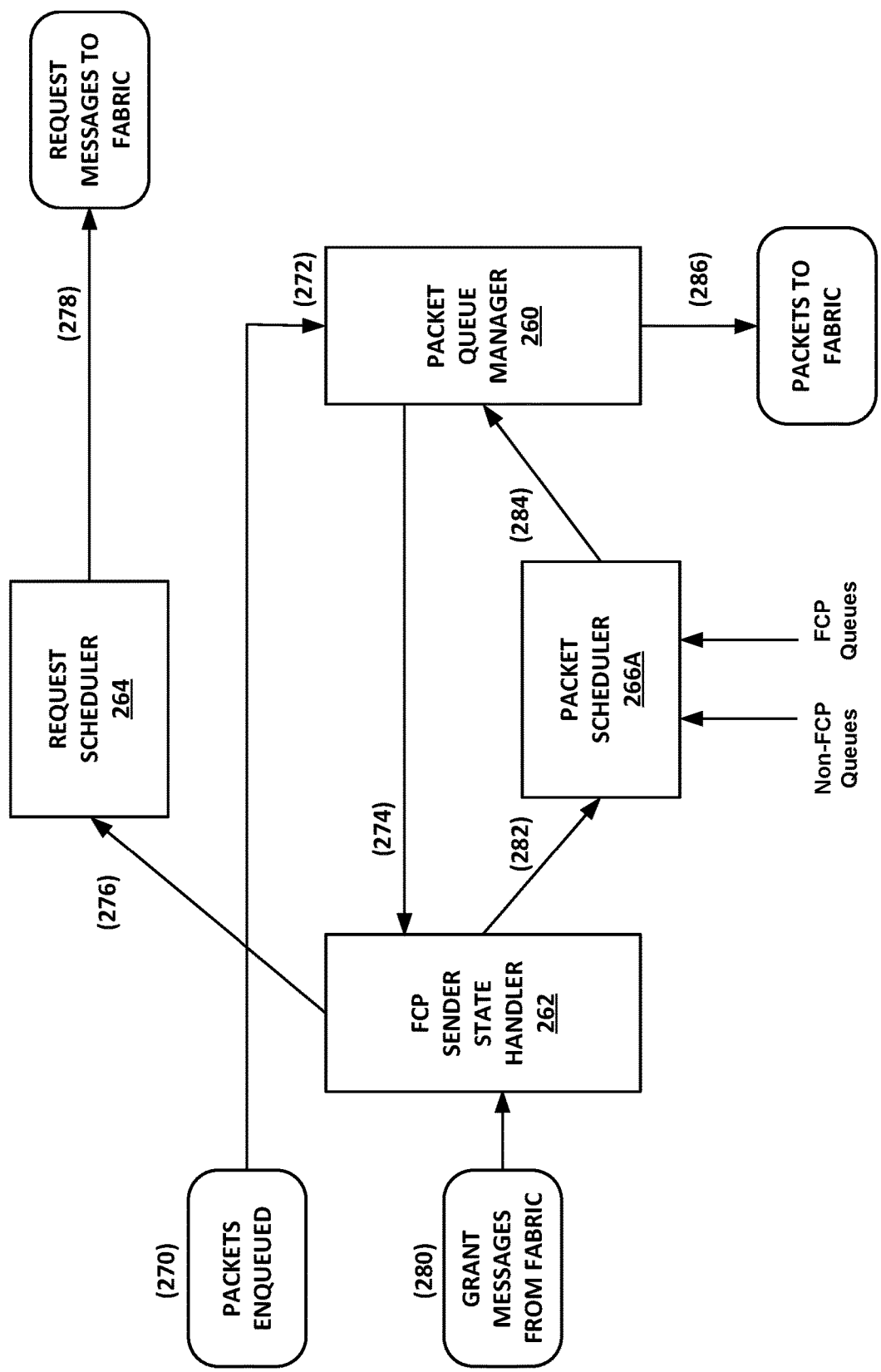
FIG. 13 is a conceptual diagram illustrating an example FCP sender node operation flow.

FIG. 13 is a conceptual diagram illustrating an example FCP sender node operation flow. Packets/payload to be transported across a network fabric are first enqueued in packet queues of the FCP sender node of a source DPU awaiting grant for transmitting the packets/payload to a FCP receiver node of a destination DPU (270), (272). Packet queue manager 260 maintains the queues for both FCP and non-FCP traffic flows (272). The packets for FCP and non-FCP should be pushed into separate queues.

The packet queue manager 260 sends information about enqueued packet/payload size to update a FCP transmit queue state at FCP sender state handler 262 (274). FCP sender state handler 262 maintains per queue FCP state used to generate a request message to send to the FCP receiver node (276), (278). For non-FCP queues, FCP sender state handler 262 may operate in infinite grant mode where the grant is internally generated as if a grant was received from the fabric. The non-FCP queues get leftover bandwidth after FCP bandwidth demands are met. The FCP demands include request messages, grant messages, and FCP data packets.

Based on the FCP transmit queue state of a non-empty FCP queue (QBN>RBN), FCP sender state handler 262 participates in a request generation by generating a request to a request scheduler 264 (276). The request scheduler 264 may include multiple priority-based request queues to schedule request messages for transmission over the network fabric to the FCP receiver node (278). The request messages are rate limited and paced based on requested payload size to manage fabric congestion.

For non-FCP queues as well as unsolicited decision queues (i.e., queues where QBN-GBN<Unsolicited_Threshold), the FCP sender state handler 262 generates internal grants. The non-FCP internal grants, unsolicited internal grants, and fabric grants are enqueued in separate queues of packet scheduler 266A (282). FCP sender state handler 262 parses the incoming fabric grants (280) against the FCP transmit queue state as the arrivals could be out of order. The accepted FCP grants are queued in separate queues of packet scheduler 266A (282).

The packet scheduler 266A maintains two sets of queues, one for non-FCP and one for FCP (grant message based). The packet scheduler 266A can be viewed as a hierarchical scheduler with strict priority for FCP packets that allows the non-FCP packets to use leftover bandwidth. Alternatively, the packets can be scheduled between FCP/non-FCP flows based on weighted round-robin (WRR). A global rate limiter on an aggregate basis should be used to limit overall bandwidth going out of the sender node. The FCP packet queues may be served on an SRR (strict round-robin) basis and a winning packet is sent to packet queue manager 260 (284) to dequeue and send the packet descriptor for transmission processing and queuing (286). The non-FCP packet queues may be served based on WRR scheduling.

Packet queue manager 260, upon dequeuing the packet/payload (286), sends a size update to the FCP transmit queue state at FCP sender state handler 262 (274) and the request pacer. The packet, in case of payload dequeue, could result in one or more packets due to MTU segmentation of the payload in response to grant messages. Each new packet on a tunnel is tagged with a running per tunnel packet sequence number (PSN). The packet buffer stores all the outgoing FCP packets along with the packet handles containing Tunnel-ID and PSN.

The FCP sender node operation can be split into following main sections: transmit buffer management, request generation, and packet scheduler.

Transmit buffer management at the FCP sender node is briefly described here. For each FCP queue, four block numbers are maintained as FCP queue state, as described above with respect to FIG. 10. The window from RBN to GBN indicates the "request window" requested over the fabric. The window from QBN to DBN indicates the "transmit window" and represents blocks stored in the transmit buffer. Assuming that most of the times DBN=GBN, the transmit window is equal to QBN-GBN. The window from QBN to RBN should be just large enough to bring the data from host memory and generate a work unit for the FCP queue. The RBN will eventually reach QBN in the process or request generation based on the request window based back pressure sent to the FCP sender node.

By default, the FCP limits the "request window" size up to a maximum request block size (MRBS) based on the maximum queue drain rate and round-trip time (FCP request to FCP grant) from the destination queue. The value of MRBS is software programmed based on the estimated maximum queue drain rate and RTT, also known as BDP or bandwidth delay product. After an FCP queue has reached its maximum allowed request window, it should assert flow control to flow-processors. The maximum allowed request window is a function of request window scale factor and MRBS. The scale down factor can be directly used to calculate the maximum allowed request window or could be derived based on a table lookup. The maximum allowed request window determines the back pressure to be sent back to the flow-processor based on the unrequested blocks in the queue.

The FCP sender calculates a flow weight based on an amount of data that needs to be transferred using a given FCP queue. The derived flow weight is a dynamic entity for the queue that is updated constantly based on the dynamics of transfer work requirements. The FCP sender communicates the flow weight to the destination node through every outgoing FCP request message. The FCP receiver estimates the source queue drain rate based on the source queue flow weights of all incast flows. In other words, it generates a scale down factor for a given FCP sender based on a ratio of the work required for a given FCP sender and the total amount of work that needs to be processed for all the active FCP sender nodes seen by the FCP receiver node. The FCP receiver node maintains the sum of all flow weights as and when the requests arrive by maintaining the individual per queue flow weight in its database. The grant scheduler at the FCP receiver node computes a "scale down" value for the FCP sender node and sends the factor with every FCP grant message.

When the queue becomes empty and the granted data is received, the queue is considered idle and the flow weight may be reset through an aging timer causing it not to participate in the total flow weight. The FCP sender may reset the scale down through an aging timer once the queue becomes empty at the FCP sender similar to the FCP receiver. Software may also program the global transmit buffer size (GTBS). The value of GTBS represents size of the transmit buffer. Software should keep separate transmit buffer for different traffic priority class. The FCP asserts flow control if the total transmit buffer, across all FCP queues reaches the GTBS limit. The buffer may also be carved on a priority/class basis with separate GTBS pools or can be managed as a single entity with separate thresholds per class/priority.

Request message generation at the FCP sender node is described. The request scheduler in FCP operation may be split in two functions: request scheduling and rate limiting, although this is one example implementation.

In the request scheduling function, each requesting FCP queue arbitrates through the request scheduler to send out requests. The FCP queues are grouped into priority-based groups for scheduling purposes. The request scheduler may select one of the priority groups through a hierarchical deficit weighted round-robin (DWRR) scheme. Once a priority group is selected, the FCP queues within the priority group are served in a round-robin (RR) manner.

When the queue schedules an FCP request, the request can carry up to a maximum configured request size worth of requested blocks or till the end of the queue. The FCP queue may only be allowed to participate for the request scheduler if it has more unrequested blocks (QBN>RBN). The assumption is that the FCP sender node will react to the request window scale down factor from the FCP receiver node and cease to enqueue WUs in the FCP transmit queue. The incoming grant carries the scale factor that may increase/reduce the allowed request window.

In the rate limiting function, the request rate is controlled so that the FCP sender node does not make requests for data faster than it can transmit data. The rate, referred to as the request data rate limiter, should be software programmable. As one example, the FCP sender node may be able to source more than 400G of host bandwidth from its PCIe interfaces, but can only support a 200G of outgoing network connectivity. If the FCP sender node is allowed to send all of the ~400G worth of requests to different FCP receiver nodes and if the FCP sender node receives an incast of grants (grant collisions), it will not be able to deliver the promised bandwidth to the FCP receiver nodes. In this example, the FCP sender node will cause a near-end congestion and thereby become the master controller of traffic admitted to the fabric. The FCP receiver grant scheduler will no longer be able to pull data from the FCP sender node with a predictable latency or RTT.

The request data rate limiter paces out requests based on the capability of the transmitted data rate. The rate limiter uses block size carried in the request message to pace the request messages. The block sizes are rounded to the block boundary for every packet and a correction is performed for the request pacer when the actual packets are transmitted to the fabric. Similarly, the request data rate limiter is charged whenever a speculative or non-FCP packet is transmitted so that the source node transmit bandwidth is at no time oversubscribed. Returning to the above example in which the FCP sender node supports 200G of outgoing network connectivity, the outgoing requests may be paced to about 200G of throughput (1−ε) where ε is a small number between 0-1. By varying ε, FCP can limit the rate at which the sender node can generate requests towards the fabric. In some examples, the FCP sender node may also control bandwidth consumed by the request messages themselves. As a result, the FCP sender node may include another rate limiter referred to as request control rate limiter.

A packet scheduler operation at the FCP sender node is briefly described here. The FCP sender node schedules FCP/non-FCP packets based on incoming grant messages (FCP) and based on scheduling criteria and buffer occupancy (non-FCP). The traffic streams from FCP/non-FCP queues may be optionally separately rate limited and subjected to DWRR arbitration or the FCP traffic can be configured with strict priority. The overall traffic is subjected to a global rate limiter to limit the outgoing traffic to max bandwidth throughput. The non-FCP scheduler may receive a per non-FCP queue back pressure from the per queue packet port buffer due to destination queue congestion. The non-FCP scheduler schedules packets to queues that are not being back pressured. The FCP packets, when not being rate limited or bandwidth share limited, may only be subjected to a temporary link level datapath back pressure from downstream modules. The overall bandwidth rate limiter controls the amount of bandwidth being injected in the network in case that FCP grants cause a temporary grant congestion at the FCP sender node. As the overall grant and request rates are controlled to operate slightly less than the overall maximum bisection bandwidth, the transmit queue congestion will be only temporary. The share of FCP traffic and non-FCP traffic may be explicitly carved out. In addition, the network guarantees the delivery of FCP packets (i.e., data/request/grant) at a higher priority over non-FCP traffic. For example, if the non-FCP traffic experiences congestion, the network may drop the non-FCP packets. The FCP packets, however, should not be dropped as the congestion in the FCP traffic may be temporary due to end-to-end admission control.

Non-FCP packets/payload segments are scheduled whenever the non-FCP queues are non-empty. The outgoing non-FCP packets are enqueued with the packet scheduler where they are rate limited if the traffic needs to be shared between FCP/non-FCP queues. The regular FCP packets/payload segments are scheduled whenever a grant is received for the queue. The FCP packet queue has the highest priority and it is served ahead of the non-FCP queues. The FCP sender node sends traffic until the current packet/segment boundary and updates the DBN based on the transferred packet size. Any additional bytes sent by the FCP sender node due to the packet boundary transfer constraint are compensated at the grant pacer at the FCP receiver node. The outgoing packets may not always end at block boundary. The rounding off error is compensated at the request pacer for every outgoing packet.

In this way, the techniques of this disclosure enable delayed packet segmentation at the FCP sender node until the FCP grant message is received. Once the grant message is received, transport layer FCP packet segmentation may be performed on the data identified in the queue. The generated FCP packets may then include additional data received from the cores of the source DPU after the request message was sent but before the grant message was received for the queue.

Allowing a small flow to send packets without an explicit request grant handshake may reduce both the latency and the overhead on the network. The speculative bandwidth should be used very carefully, however, as it can cause a FCP receiver node to be overwhelmed with unsolicited incast traffic. According to the disclosed techniques, every FCP sender node may be allowed to use a certain share of its bandwidth (destination node buffer) for unsolicited traffic and, if the un-granted queue build-up is small and below a certain threshold, the queue may be allowed to send unsolicited packets without waiting for an explicit request/grant message exchange. The unsolicited packets may only be sent by the FCP sender node provided the un-granted queue size is small, and the FCP sender node has available bandwidth share for unsolicited traffic. The FCP packets are served in order of grant arrival, for scheduled packets due to the arrival of FCP grant, or in the order of enqueue, for unsolicited packets. The unsolicited packets potentially have lower latency as they avoid a round trip delay of request and grant message exchange.

Figure 14:
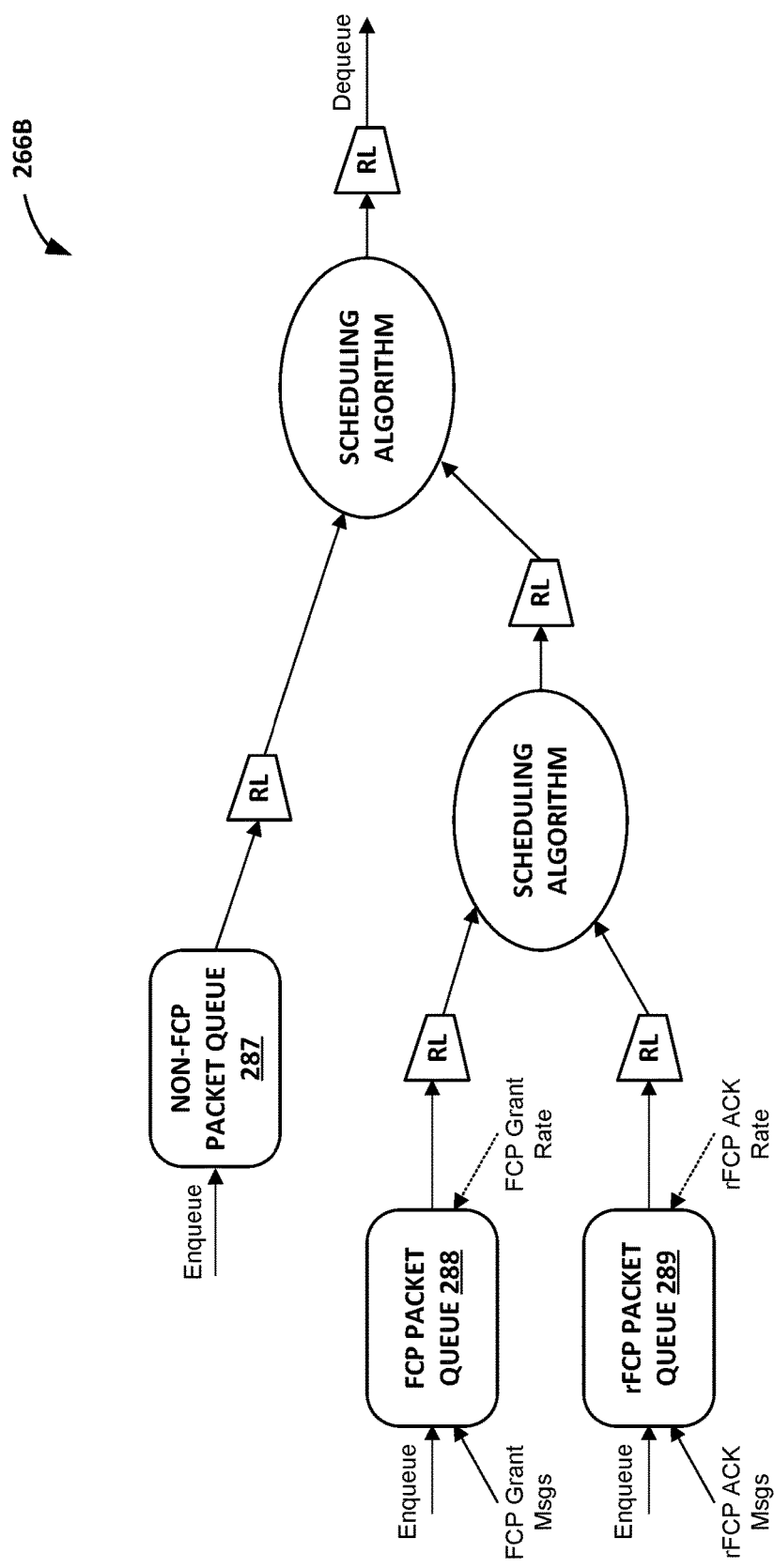
FIG. 14 is a conceptual diagram illustrating an example data packet scheduler configured to support the rFCP extensions.

FIG. 14 is a conceptual diagram illustrating an example data packet scheduler 266B configured to support the rFCP extensions. The rFCP data packet scheduler 266B may operate similar to the FCP packet scheduler 266A described with respect to FIG. 13, but instead of two sets of queues, rFCP data packet scheduler 266B maintains three sets of queues, i.e., one for non-FCP, one for FCP (request-grant mode-based), and one for rFCP (unsolicited mode-based).

In the illustrated example, the packet scheduler 266B includes a non-FCP packet queue 287 and an associated rate limiter (RL), and an FCP packet scheduler structured as a tree including a FCP packet queue 288 with an associated RL and an rFCP packet queue 289 with an associated RL. FCP packet queue 288, which is drained based on an incoming grant rate with associated upper limit on FCP traffic, is coupled with rFCP packet queue 289 in a scheduler hierarchy. The rFCP packet queue 289 is drained based on a packet enqueue rate and an incoming ACK rate. Additionally, the rFCP packet queue 289 may consist of per priority queueing among rFCP queues and the associated DWRR scheduler. Each of the FCP traffic groups (legacy and reliable) may be provisioned with another layer of rate limiters (RLs) and an overall global FCP traffic rate limiter as shown.

Figure 15:
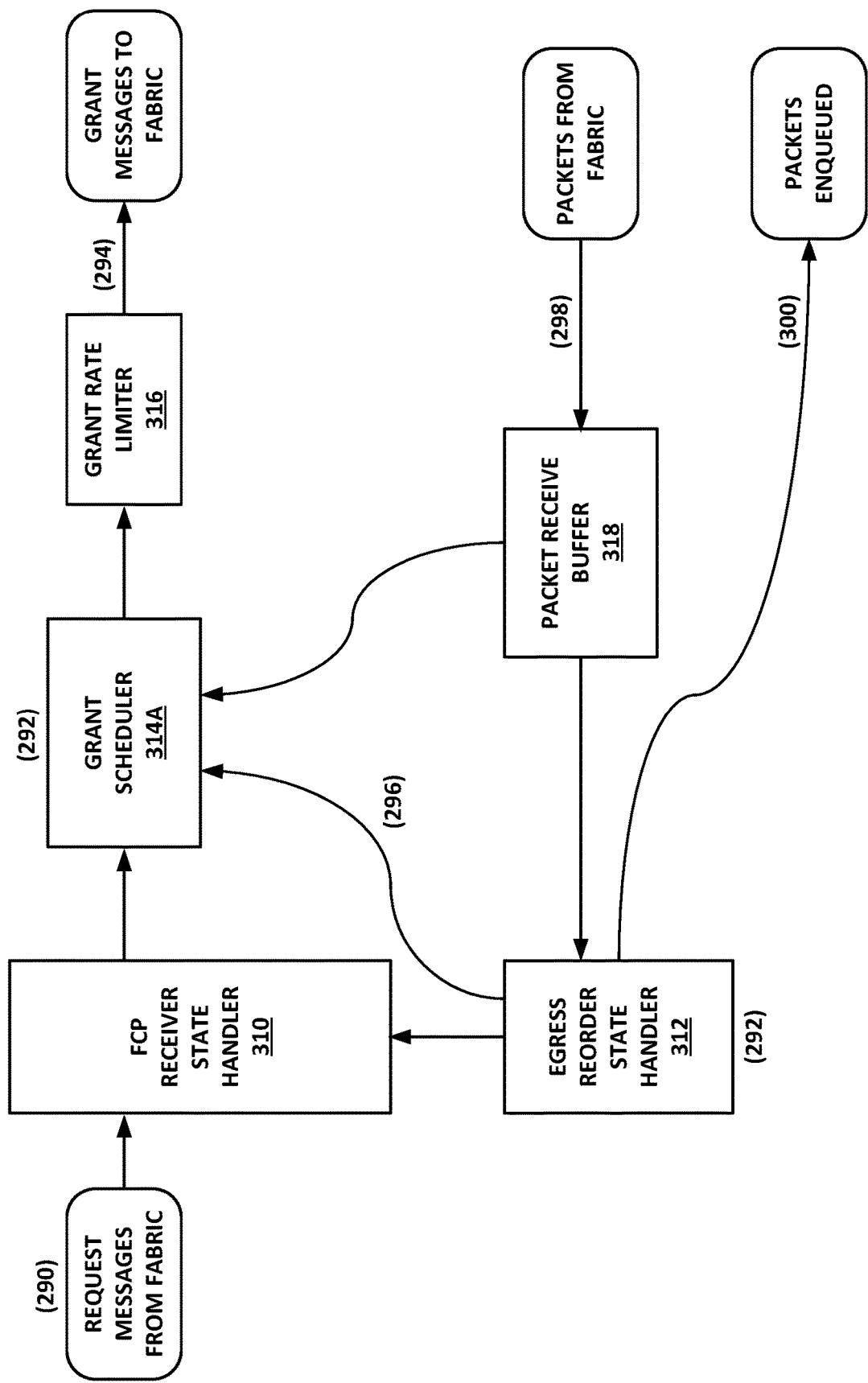
FIG. 15 is a conceptual diagram illustrating an example FCP receiver node operation flow.

FIG. 15 is a conceptual diagram illustrating an example FCP receiver node operation flow. An FCP receiver state handler 310 maintains a per queue FCP egress context such as RBN, GBN, DBN, etc. An egress reorder state handler 312 maintains a database of packet reorder contexts per tunnel. An FCP grant scheduler 314A may support two or more grant queues for high and low priority. Grants may be rate limited/paced by grant rate limiter 316 based on fabric congestion.

The FCP receiver state handler 310 receives request messages from the network fabric (290) and after the initial parsing (e.g., filtering of duplicates), the accepted request messages update the FCP egress per queue context at FCP receiver state handler 310. Once a receiver queue at FCP receiver state handler 310 is non-empty, it is scheduled for grant generation by the grant scheduler 314A (292). The winner queue is allowed to send a grant message when grant rate limiter 316 allows the next grant message to be generated (294). The grant scheduler 314A reacts to the reorder buffer state at egress reorder state handler 312 (296) and stops sending all the new grants if the reorder buffer state (out of order bytes, grants in flight, and buffer occupancy) reaches a limit. The grants may also react to fabric congestion and faults, and the grant rate may be modulated in reaction to the measure of fabric congestion. The base grant rate is configured by software. The grant size per grant is based on a receive queue size and limited up to a maximum allowed grant size.

The network fabric interface receives packets and they are stored in a packet receive buffer 318 awaiting reorder (298). The packets are enqueued to downstream blocks once the packets are reordered (300). The egress reorder state handler 312 maintains a per tunnel reorder state context. The reorder engine at egress reorder state handler 312 performs a reorder based on packet arrival on a tunnel and maintains a reorder timer on a per tunnel basis. If a tunnel has out-of-order packets and an expected packet does not arrive in the reorder timer timeout period (~2×RTT), a timeout causes the reorder engine to skip the packet and search for the next packet.

The FCP receiver node operation can be split into following main sections: grant generation, fabric load balancing, and receive buffer management.

Grant generation at the FCP receiver node is described briefly here. The grant generation operation can be divided into a grant queue scheduler and a grant pacer. The grant scheduler may provide flow fair bandwidth distribution for traffic delivered to the FCP receiver node. The grant scheduler also limits the grants based on buffer usage, number of outstanding granted blocks, and the status of reorder buffer.

The FCP queues are split as tunnels and priorities. The FCP grant scheduler groups the queues based on their priority for scheduling purposes. The grant scheduler may select one of the priority groups through strict priority or a hierarchical DWRR scheme. On top of each priority group scheduling, a flow aware algorithm may be used to arbitrate among FCP queues that are part of the priority group. Incoming flow weights from FCP queues may be normalized and used by the DWRR grant scheduler for updating credits to the arbitrating FCP queues.

The grant pacer provides admission control and manages fabric congestion. The grant pacer may be implemented at as a leaky bucket that allows a grant to be sent whenever the bucket level falls below a certain threshold. When a grant is sent, the bucket is loaded with size granted blocks in the grant message. The bucket is leaked down at a certain rate that is a function of the incoming fabric rate and number of active fabric links. The grant pacer is compensated for corrections based on actual arriving packet size, and non-FCP packets so that the fabric remains un-congested in the long term.

The FCP receiver node controls the rate of incoming data packets through pacing FCP grants using a grant data rate limiter and a grant control rate limiter, which are similar to the request data rate limiter and the request control rate limiter described above with respect to the FCP sender node operation. In addition, the grant pacer keeps track of pending blocks over fabric by incrementing a granted block counter at the time of sending FCP grant messages and decrementing the counter with the data block count at the time of receiving FCP data packets. The grant pacer also keeps track of pending packets in the reorder buffer and stops generating new FCP grants if the pending packets in reorder are more than a threshold.

The FCP receiver node may perform explicit congestion notification (ECN) marking of FCP packets based on a global view of packet flows in the switch fabric. The grant scheduler provides a unique view of total load based on the sum total of all pending requests seen at the grant scheduler. The ECN marking based on a global load seen by the destination endpoint provides a major improvement over ECN marking based on local congestion seen by individual switches/paths through the fabric. With data center TCP implementations relying on extensive use of ECN to manage congestion, the ECN marking based on global view of output egress queue at the grant scheduler is a significant improvement compared to disjoint and localized view of some of the paths through the fabric and provides better congestion management at TCP level.

Fabric load balancing at the FCP receiver node is described briefly here. FCP requires that all outgoing fabric links be balanced. One example scheme for implementation is to use a random shuffled DWRR scheduler that carries equal weights for all available links. The random shuffling of the round-robin pointer provides randomness in selection of a link and allows the fabric not to follow a set pattern.

Receive buffer management at the FCP receiver node is described briefly here. The grant scheduler generates FCP grant message for a queue if its RBN is ahead of GBN and grant pacer credits are available. The FCP sender node transmits data packets after it receives FCP grant messages for a queue. The FCP receiver node stores incoming data packets in the buffer memory. The FCP receiver node may reorder work unit messages based on packet sequence number and sends a work unit to an associated flow-processor in the destination access node.

Figure 16:
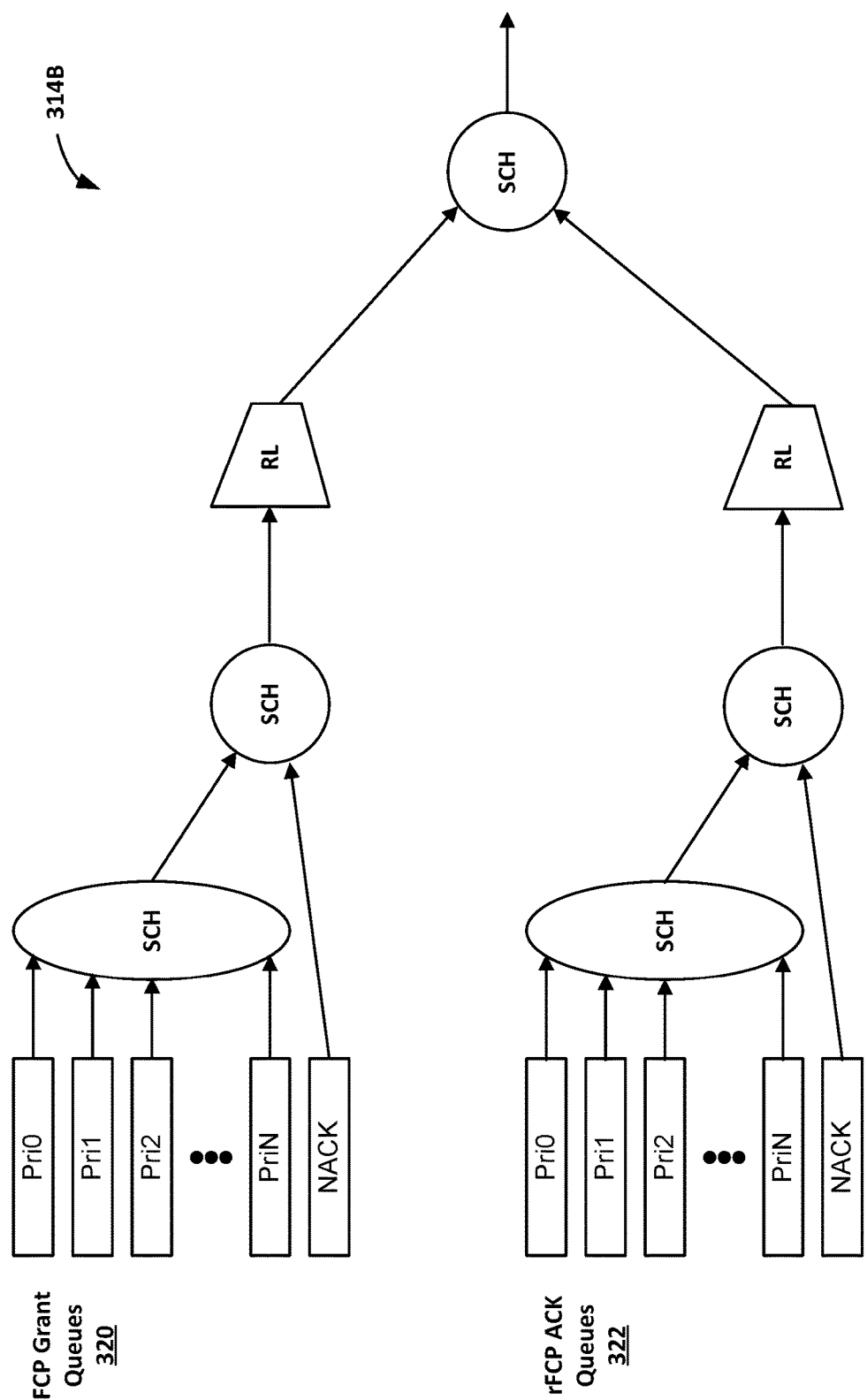
FIG. 16 is a conceptual diagram illustrating an example grant/ACK packet scheduler configured to support the rFCP extensions.

FIG. 16 is a conceptual diagram illustrating an example grant/ACK packet scheduler 314B configured to support the rFCP extensions. The rFCP grant/ACK scheduler 314B may operate similar to the FCP grant scheduler 314A described with respect to FIG. 15, but instead of a single set of priority queues, rFCP grant/ACK scheduler 314B maintains two sets of priority queues, i.e., one for FCP grants (request-grant mode) and one for rFCP ACKs (unsolicited mode). As illustrated, rFCP grant/ACK scheduler 314B includes FCP grant queues 320, used for FCP or rFCP in the request-grant mode, that support two or more grant queues for different priority levels and a NACK queue that may have a highest priority level. The rFCP grant/ACK scheduler 314B also includes rFCP ACK queues 322, used for rFCP in the unsolicited mode, that support two or more ACK queues for different priority levels, and a NACK queue that may have a highest priority level. Grants and ACKs may be rate limited/paced by rate limiters (RLs).

The grant/ACK scheduler 314B generates paced grant/ACK packets for the below described conditions. In the admission controlled mode (i.e., the request-grant mode) of FCP or the rFCP extension, new grants may be scheduled based on QoS policies and paced for size of grant per rFCP admission controlled traffic bandwidth provisioning. The grant packets carrying only ACKs and no new grants may be scheduled based on QoS policies but paced for control packet rate only. A simple queue structure consisting of ACKs may be built for scheduling only ACKs messages. An ACK may be issued only if required, i.e., DBN>ABN, else the ACK message generation may be squashed. NACKs may be scheduled and paced at higher priority than grants and ACKs. The NACKs may be scheduled out of single queue with strict priority to keep the design simple. When pacing, the scheduler may assume a default configured packet size for missing packets and later correct when the packets are received. Within a queue, ACKs and NACKs cannot co-exist, but a logical queue may be created for NACKs using the same physical queue memory as a linked list. The grant/ACK rate limiter (RL) may provision for small additional bandwidth to send ACK-only grant messages.

In the unsolicited or low latency mode of the rFCP extension, the new grants carrying ACKs may be scheduled based on QoS policies and paced for the size of ACK per rFCP unsolicited or low latency traffic bandwidth provisioning. NACKs may be scheduled and paced at higher priority than grants and ACKs. The NACKs may be scheduled out of single queue with strict priority to keep the design simple. A simple queue structure consisting of NACKs may be built for scheduling only NACK messages. When pacing, the scheduler may assume a default configured packet size for missing packets and later correct when the packets are received. Duplicate ACKs or NACKs may only charge the control message rate pacer.

An example rFCP extension operation is now described. A new packet/WU is enqueued in the rFCP queue at the rFCP sender node. The QBN is incremented by the packet length in blocks. If the number of outstanding unACKed blocks is smaller than the current send window, the packet is transmitted to the rFCP receiver node and the DBN is updated. Optionally the rFCP sender may choose to globally rate limit the speculative packets transmission. The DBN is updated every time a new (non-retransmitted) packet is transmitted. Packets are stamped with packet sequence number in the order of transmission from the rFCP queue and then sprayed over all available fabric paths.

Packets may arrive at the rFCP receiver node in any arbitrary order and may be put back in order before they are delivered to the FCP queue. The rFCP receiver node also maintains the next expected in order packet sequence number for the purpose of retransmission/NACK message generation. The rFCP receiver updates DBN and RBN based on the in-order packet arrival and schedules grant/ACK message generation. Grant messages are generated at a configurable number of blocks quanta to limit the number of messages flowing between the nodes. The rFCP grant messages are paced by the rFCP receiver similar to regular FCP grant messages.

Upon receiving the grant/ACK message, the rFCP sender starts walking through the retransmit queue freeing up packets and buffer space, and checking the packet length against the ACK block number reference until all the packets up to the ABN boundary are freed up. The last packet freed up may overflow the ABN boundary and the rFCP sender queue context may track the overflow and adjust it against the incoming ABN. As the rFCP sender walks through the packets until the ABN, it also may also update the last ACK-ed packet sequence number based on the number of packets per freed-up WU.

In case of packet loss, the rFCP receiver reorder engine may timeout and send a trigger to the rFCP receiver state machine to generate a NACK message with the last received DBN. The rFCP receiver may only send the NACK message when the ABN has caught up with DBN. Otherwise using DBN to send the NACK message may result in incorrectly pacing the ACK/NACK messages. The NACK messages may be paced similar to the grant/ACK messages.

The rFCP sender, upon receiving the NACK message, may process the NACK message as if an ACK was received and, once the ABN reference is leveled, the rFCP sender schedules a packet retransmission from the head of the re-transmit queue. Alternatively, if the last packets are lost, the rFCP sender may support a sender retransmit timer to retransmit the oldest un-ACKed packet. Optionally the rFCP sender may resend a request message instead of unACKed data packet. The reorder engine runs a per packet reorder timer and hence a rFCP tunnel may receive multiple NACK triggers as a missing packet will cause the reorder engine to send multiple NACK triggers to the rFCP state machine. The rFCP state machine may maintain a NACK pending state and associated NACK retry timers. Similarly, the ACK messages sent to the rFCP sender may be lost, in which case the rFCP sender may retransmit the last ACKed packet. The rFCP receiver reorder engine will drop these retransmitted packets as duplicates, but the reorder engine may send a duplicate ACK trigger to the rFCP receiver state machine to generate a duplicate ACK for the presumed lost ACK.

Figure 18:
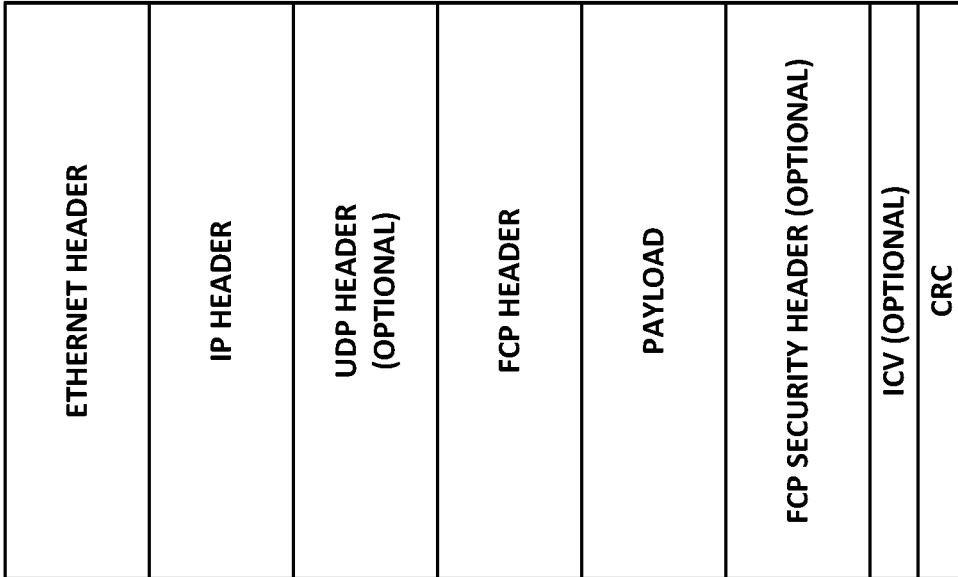
FIG. 18 is a conceptual diagram illustrating an example format of an FCP/rFCP data packet.
Figure 17:
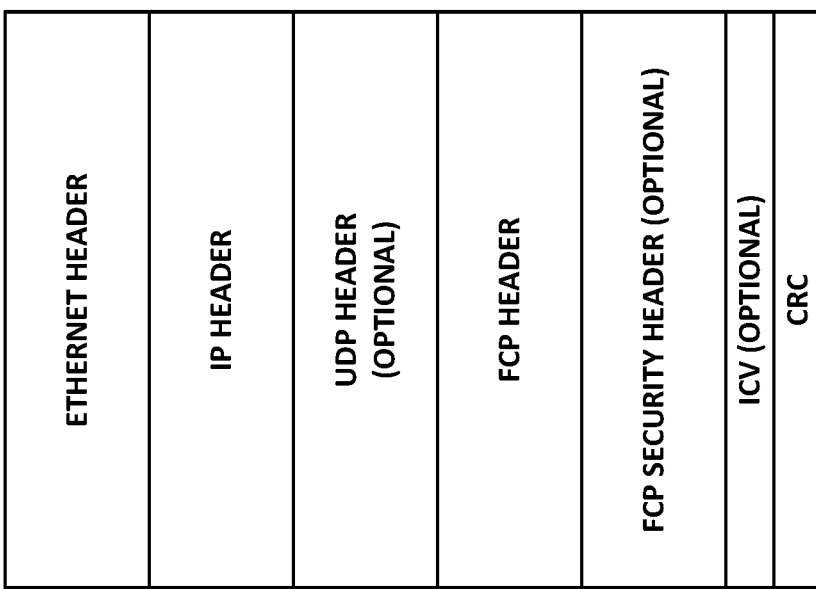
FIG. 17 is a conceptual diagram illustrating an example format of an FCP/rFCP control packet for request messages, grant/ACK messages, or NACK messages.

FIGS. 17 and 18 illustrate example formats of FCP and rFCP packets. In general, the packet formats are the same for both FCP and rFCP packets. For example, FCP may use the control packet format illustrated in FIG. 17 for FCP request and grant packets, and use the data packet format illustrated in FIG. 18 for FCP data packets. Similarly, rFCP may use the control packet format illustrated in FIG. 17 for rFCP request, grant/ACK, and NACK packets, and use the data packet format illustrated in FIG. 18 for rFCP data packets.

In these examples, each of the FCP/rFCP packets includes at least an Ethernet header, an IP header, and an FCP header. The FCP/rFCP data packet format of FIG. 18 also includes a data payload. Each of the FCP/rFCP packets may include an optional UDP header, and option FCP security header, and/or an optional integrity check value (ICV). In some examples, FCP/rFCP packets may be carried over UDP over IPv4 and, thus, include the optional UDP header. In other examples, FCP/rFCP packets may be carried directly over IPV6.

Each of the example FCP/rFCP packets includes the FCP header to carry information for the other side. The FCP header may be a multiple of 4 bytes and variable in size. The FCP header may generally include an FCP version field (e.g., FCP or rFCP), an FCP packet type field (e.g., request, grant/ACK, data, control, or NACK), a next protocol field identifying the protocol following the FCP header (e.g., IPv4 or IPV6), FCP flags (e.g., global ports health (GPH) matrix size, timestamp present, FCP security header present), an FCP tunnel number, a queue ID, one or more FCP block sequence numbers, and optional fields of GPH matrix, timestamp, and the FCP security header as indicted by the FCP flags. The FCP header fields may be protected with Ethernet frame cyclic redundancy check (CRC) or with the FCP security header (when present).

As described above, FCP control software establishes bidirectional tunnels between a sender node of a source DPU and a receiver node of a destination DPU. FCP/rFCP tunnels are optionally secured (encrypted and authenticated). In examples where the FCP control software provides end-to-end encryption and authentication for tunnels, a control protocol may handle the creation and distributions of keys for use by the encryption algorithm. In these examples, the FCP frame format may include four distinct contiguous regions defined by whether the data is encrypted and/or authenticated. For example, the pre-FCP headers (e.g., the Ethernet header, the IP header except source address and destination address in the IP header, and the UDP header) are neither encrypted nor authenticated; the source address and destination address of the IP header, the FCP header, the FCP security header, and some of the payload (in the case of a data packet) are authenticated but not encrypted; the remaining payload is both encrypted and authenticated; and the ICV is appended to the frame. In this way, the block sequence numbers (e.g., RBN, GBN, DBN, ABN, and/or PSN or APSN) carried in the FCP header are authenticated but not encrypted. Authentication of the block sequence numbers avoids spoofing of request and grant/ACK messages, and protects the transmit/receive queue state machines. In addition, the spraying of FCP packets of a packet flow across all available data paths makes snooping or sniffing of encrypted data within the packet flow difficult if not impossible because the snooper or sniffer would need to gain access to the encrypted packets on each of the data paths.

FIG. 17 is a conceptual diagram illustrating an example format of an FCP/rFCP control packet for request messages, grant/ACK messages, or NACK messages. A request message generated by a sender node may have the same format for both FCP and rFCP when operating in the request-grant mode. The FCP header of the FCP/rFCP request packet carries a RBN (request block number) and a request weight field that identifies the flow weight for the request packet. The grant scheduler at the receiver node may use the flow weight to fairly distribute the egress bandwidth for grant/ACK generation.

A grant/ACK message generated by a receiver node may have a slightly different format for rFCP than for FCP. The FCP header of the FCP grant packet carries a GBN (grant block number) and an FCP scale down field to request a scale down of the request window at the sender node. The FCP header of the rFCP grant packet includes an FCP flag to indicate whether the egress interface of the destination DPU is congested or not congested. In addition to the fields noted above for the FCP grant packet, the FCP header of the rFCP grant/ACK packet further carries an ABN (ACK block number), a marked blocks field to indicate a number of ECN marked blocks received by the receiver node, and a window scale down field to indicate a window scale down factor for send window scaling at the sender node.

A NACK message generated by a receiver node may only be used for rFCP. The FCP header of the rFCP NACK packet includes FCP flags to indicate whether the egress interface of the destination DPU is congested or not congested, and to indicate whether an APN (avoid path number) is valid or not valid. In addition, the FCP header of the rFCP NACK packet further carries an ABN, an APN field to indicate one or more APNs to be used by the sender node to avoid the indicated paths when retransmitting the packet (the APN field only carries a valid value if the flag is marked as valid), a window scale down field to indicate a window scale down factor for send window scaling at the sender node, a NACK bit vector field to indicate a bit vector indicating whether each packet is missing or received, and an APSN (ACKed packet sequence number) field to indicate the packet sequence number of the last ACKed packet (the APSN field is only valid if the NACK bit vector is non-zero).

FIG. 18 is a conceptual diagram illustrating an example format of an FCP/rFCP data packet. A data packet transmitted by a sender node may have a slightly different format for rFCP than for FCP. A sender node of a source DPU sends FCP data packets in response to an FCP grant message. The FCP header of the FCP data packet carries a PSN (packet sequence number) and a DBN (data block number). The sender node may optionally send a null FCP data packet with zero payload bytes and a "next protocol" field programmed with "no payload."

The FCP header of the rFCP data packet includes an FCP flag to indicate whether the data packet is a retransmitted packet. In addition to the fields noted above for the FCP data packet, the FCP header of the rFCP data packet further carries a transmit queue length field to indicate a scaled transmit queue length (e.g., QBN-ABN) at the sender node to be used by the receiver node to compute a window scale down factor.

Figure 19:
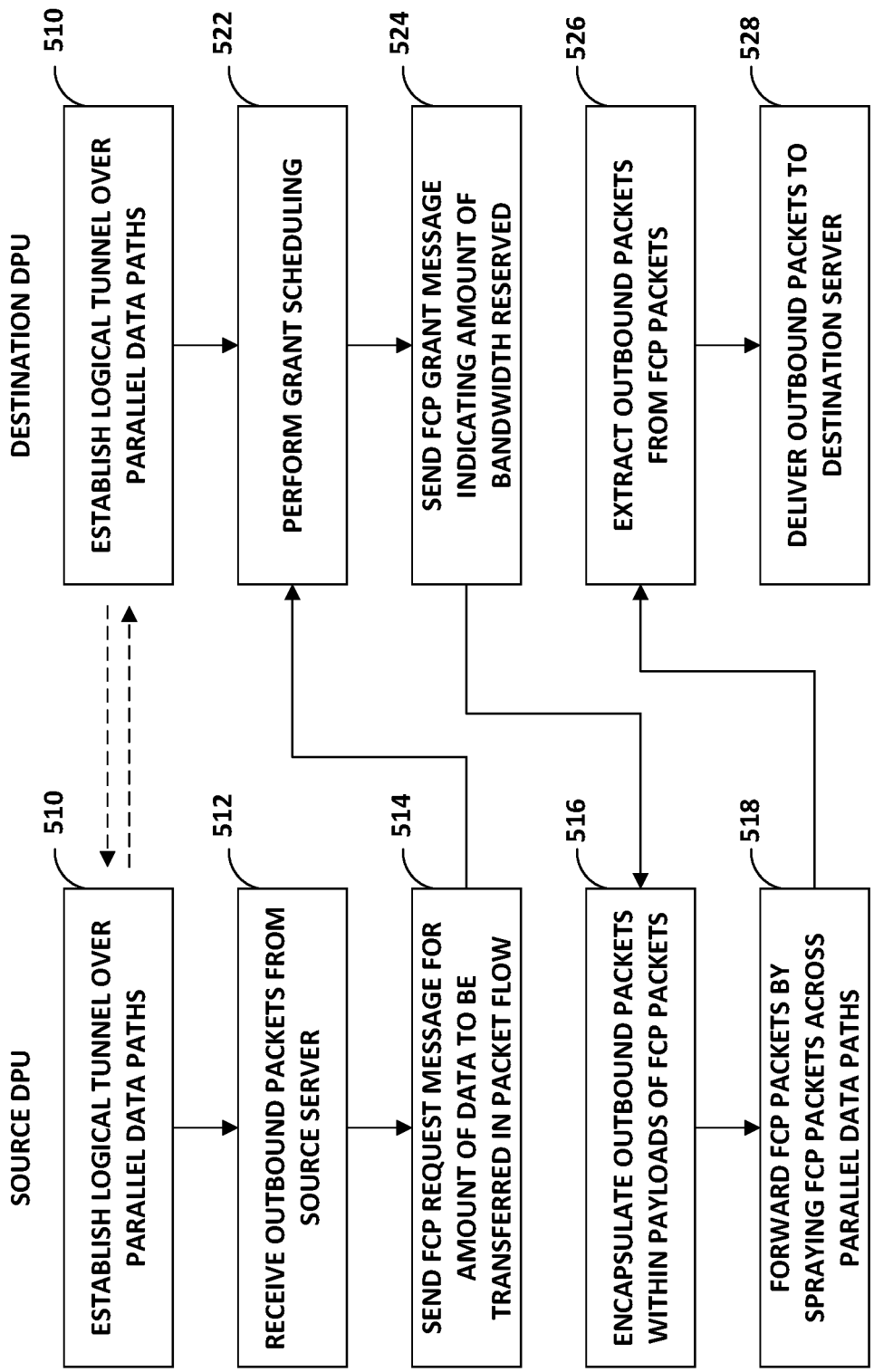
FIG. 19 is a flow chart illustrating an example operation of spraying packets using FCP between a source DPU and a destination DPU, in accordance with the techniques described herein.

FIG. 19 is a flowchart illustrating an example operation of spraying packets between a FCP sender node of a source DPU and a FCP receiver node of a destination DPU, in accordance with the techniques described herein. For ease of illustration the flowchart of FIG. 19 is described with respect to network system 8 of FIG. 1, including storage nodes 12, compute nodes, 13, DPUs 17, and network fabric 14 of data center 10. Nevertheless, the techniques illustrated by FIG. 19 are readily applicable to the other example network implementations described herein.

As shown in this example, a set of DPUs 17 exchange control plane messages to establish a logical tunnel over a plurality of parallel data paths that provide packet-based connectivity between the DPUs (510). For example, with respect to FIG. 1, network fabric 14 may comprise one or more tiers of switches and/or routers that provide multiple paths for forwarding communications between DPUs 17. Respective pairs of DPUs 17, possibly in response to direction from controller 21, exchange the control plane messages to negotiate a logical, end-to-end tunnel configured over multiple, parallel paths between the DPUs 17.

Once the logical tunnel is established, one of the DPUs (referred to as the "source DPU" in FIG. 19) may receive outbound packets associated with the same packet flow, e.g., from storage node 12 or compute node 13 (512). In response, the source DPU sends an FCP request message for an amount of data to be transferred in the packet flow (514). In response to receipt of the FCP request message, another one of the DPUs (referred to as the "destination DPU" in FIG. 19) performs grant scheduling (522) and sends an FCP grant message indicating an amount of bandwidth reserved for the packet flow (524).

Upon receipt of the FCP grant message from the destination DPU, the source DPU encapsulates the outbound packets within payloads of FCP packets, thereby forming each FCP packet to have a header for traversing the logical tunnel and a payload containing one or more of the outbound packets (516). The source DPU then forwards the FCP packets by spraying the FCP packets across the parallel data paths through network fabric 14 (518). In some example implementations, the source DPU may, prior to forwarding the FCP packets across network fabric 14, spray the FCP packets across a subset of DPUs that, for example, form one or more DPU groups 19, thereby providing a first-level fanout for distributing the FCP packets across the parallel data paths. In addition, as the FCP packets traverse the parallel data paths, each of the subset of DPUs may spray the FCP packets to a subset of core switches included in network fabric 14, thereby providing a second-level fanout reaching additional parallel data paths so as to provide increased scalability of the network system while still providing a high-level of connectivity between DPUs.

Upon receipt of the FCP packets, the destination DPU extracts the outbound packets that are encapsulated within the FCP packets (526), and delivers the outbound packets to the destination server (528). In some examples, prior to extracting and delivering the outbound packets, the destination DPU first reorders the FCP packets into an original sequence of the packet flow sent by the source storage node 12/compute node 13. The source DPU may assign a packet sequence number to each of the FCP packets of the packet flow, enabling the destination DPU to reorder the FCP packets based on the packet sequence number of each of the FCP packets.

Figure 20:
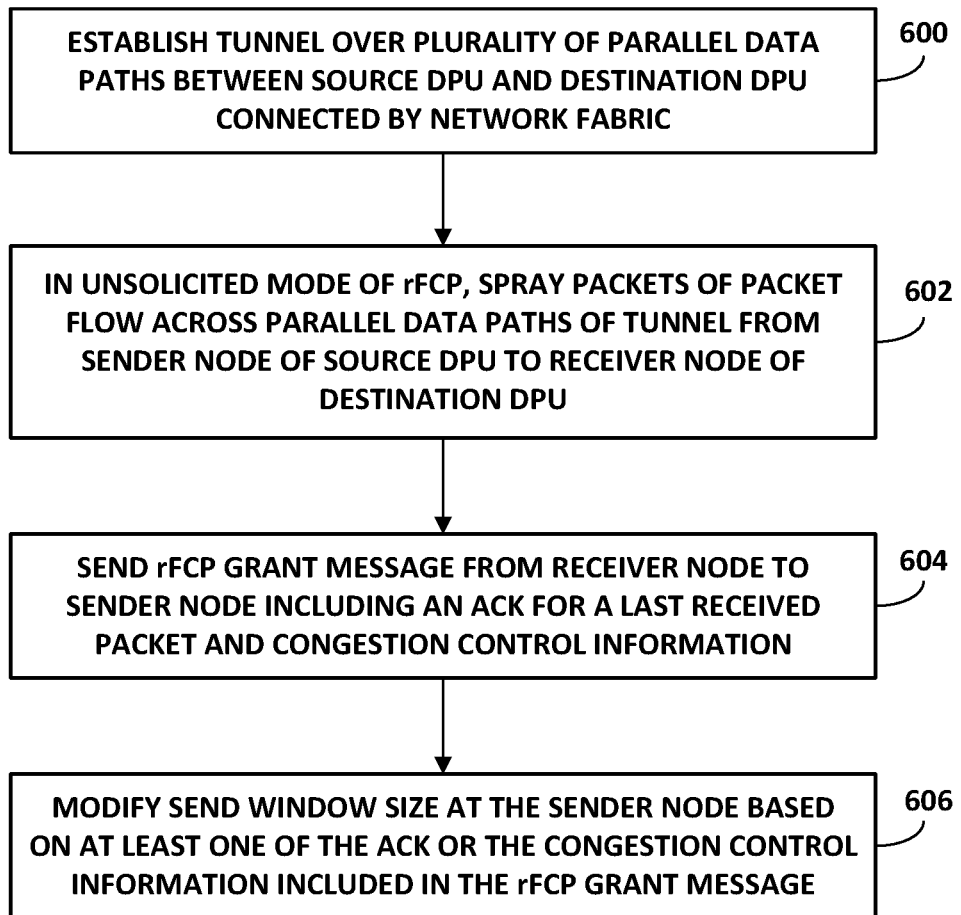
FIG. 20 is a flow chart illustrating an example operation of spraying packets using an unsolicited mode of rFCP between a source DPU and a destination DPU, in accordance with the techniques described herein.

FIG. 20 is a flow chart illustrating an example operation of spraying packets using an unsolicited mode of rFCP between a source DPU and a destination DPU, in accordance with the techniques described herein. The operation of FIG. 20 is described with respect to network system 8 of FIG. 1, including servers (i.e., storage nodes 12 and compute nodes 13), DPUs 17, and network fabric 14 of data center 10; and with respect to the multi-level network fanout of FIG. 3, including logical tunnel 44 and core switches 22 in network fabric 14 between DPUs 17. Nevertheless, the techniques illustrated by FIG. 20 are readily applicable to the other example network implementations described herein.

In the example of FIG. 20, the source DPU and the destination DPU are each executing the rFCP extension. As shown in this example, a set of DPUs 17 exchange control plane messages to establish a rFCP tunnel 44 over a plurality of parallel data paths between a source DPU and a destination DPU of the set of DPUs 17 connected by network fabric 14 having core switches 22 (600). For a particular packet flow, the source DPU comprises the one of DPUs 17 that is coupled to a source server of the packet flow, and the destination DPU comprises the one of the DPUs 17 that is coupled to a destination server of the packet flow.

Once the rFCP tunnel 44 is established, the source DPU may receive outbound packets associated with the same packet flow from the source server, e.g., one of storage nodes 12 or compute nodes 13. In response, when operating in the unsolicited mode of the rFCP extension, a sender node (e.g., a SF component 30) of the source DPU sprays rFCP packets of the packet flow across the plurality of parallel data paths of the rFCP tunnel 44 to a receiver node (e.g., a DF component 36) of the destination DPU by directing each of the rFCP packets to one of the parallel data paths (602). For example, the sender node of the source DPU may spray the rFCP packets of the packet flow to the destination DPU until an amount of data in flight is equal to a send window size.

In response to receipt of the rFCP packets of the packet flow, the receiver node of the destination DPU sends a rFCP grant message to the sender node including an acknowledgment (ACK) for a last received rFCP packet of the packet flow and congestion control information (604). In some examples, the receiver node may reorder the rFCP packets of the packet flow, and drop out-of-order rFCP packets once a reorder database utilization level reaches a deadlock avoidance threshold.

In response to receipt of the rFCP grant message, the sender node of the source DPU modifies the send window size based on at least one of the ACK or the congestion control information included in the rFCP grant message (606). In a first scenario, the sender node may modify the send window size by increasing the send window size from an initial window size up to a configurable threshold based on an amount of data acknowledged (ACKed) in the rFCP grant message. In a second scenario, the sender node may modify the send window size by increasing the send window size by a maximum segment size every round trip time when the send window size is greater than a configurable threshold and less than a maximum send window size. In a third scenario, the congestion control information included in the rFCP grant message comprises an amount of explicit congestion notification (ECN) marked bytes received by the receiver node, and the sender node may modify the send window size by reducing the send window size based on a ratio of the amount of ECN marked bytes to a total amount of bytes acknowledged in the rFCP grant message.

In a fourth scenario, the sender node includes a transmit queue length value in each rFCP packet of the packet flow that is sprayed to the receiver node, and the congestion control information included in the rFCP grant message comprises a window scale down factor computed by the receiver node based on a ratio of a total sender transmit queue length of all sender nodes and the transmit queue length received from the sender node. The sender node may then modify the send window size by reducing a maximum send window size based on the window scale down factor.

In a fifth scenario, the receiver node sets a congestion status flag included in the rFCP grant message sent to the sender node based on one or more of a receiver buffer limit being reached, a receiver reorder table limit being reached, a detection of loss of multiple packets in a given window, or a total sender transmit queue length being greater than a threshold. In this case, the congestion control information included in the rFCP grant message comprises the congestion status flag, and the sender node may modify the send window size by, in response to receipt of the set congestion status flag, setting the send window size to an initial window size, and transitioning from the unsolicited mode to the request-grant mode of the rFCP extension.

In some examples, the sender node is configured to determine whether to transition from the unsolicited mode to the request-grant mode of the rFCP extension based on the congestion control information included in the rFCP grant message. In other examples, in response to an indication of packet loss that comprises one of a negative acknowledgment (NACK) included in a rFCP grant message or a retransmit timeout at the sender node, the sender node is configured to set the send window size equal to a loss window size, and set a configurable threshold to be less than a maximum send window size.

Figure 21:
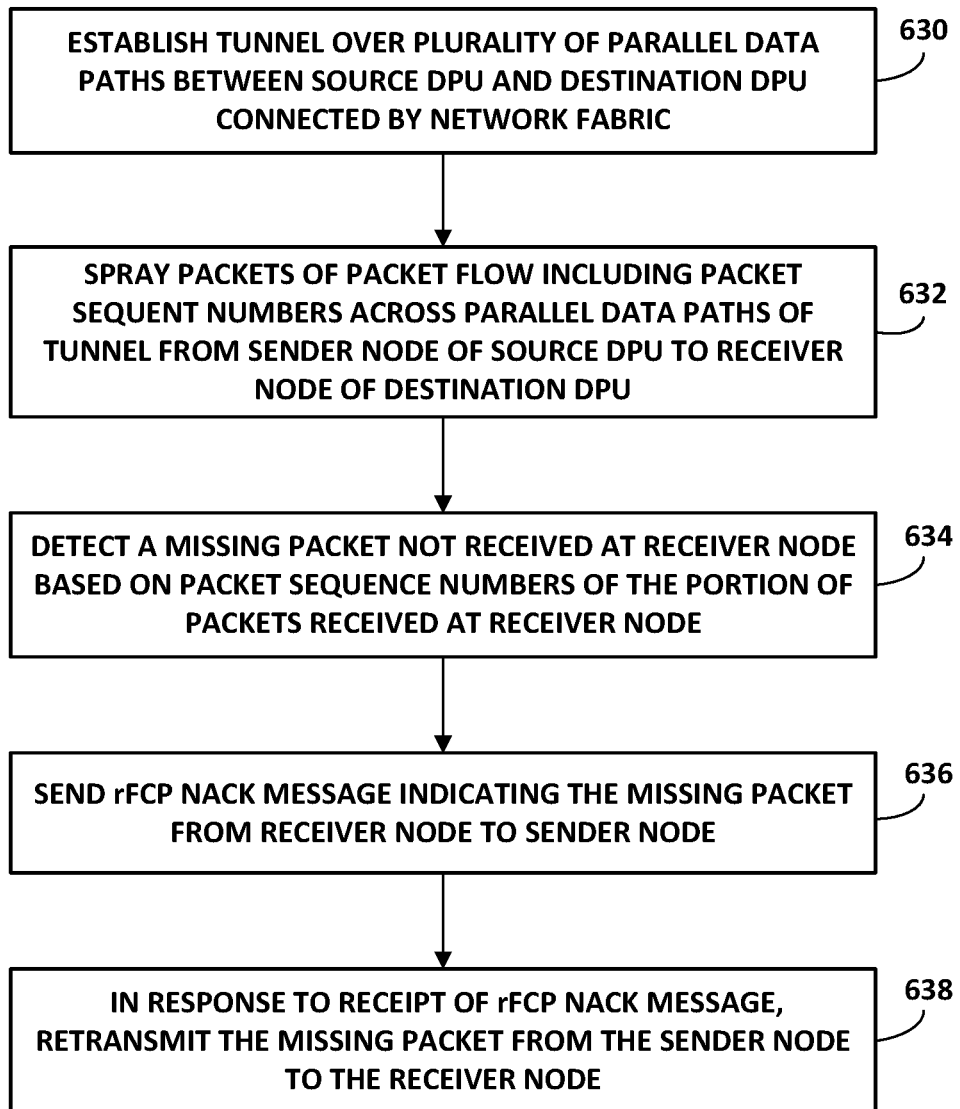
FIG. 21 is a flow chart illustrating an example operation of using failure resilience mechanisms to identify failed paths while spraying packets using an unsolicited mode of rFCP between a source DPU and a destination DPU, in accordance with the techniques described herein.

FIG. 21 is a flow chart illustrating an example operation of using failure resilience mechanisms to identify failed paths while spraying packets using an unsolicited mode of rFCP between a source DPU and a destination DPU, in accordance with the techniques described herein. The operation of FIG. 21 is described with respect to network system 8 of FIG. 1, including servers (i.e., storage nodes 12 and compute nodes 13), DPUs 17, and network fabric 14 of data center 10; and with respect to the multi-level network fanout of FIG. 3, including logical tunnel 44 and core switches 22 in network fabric 14 between DPUs 17. Nevertheless, the techniques illustrated by FIG. 21 are readily applicable to the other example network implementations described herein.

In the example of FIG. 21, the source DPU and the destination DPU are each executing the rFCP extension. As shown in this example, a set of DPUs 17 exchange control plane messages to establish a rFCP tunnel 44 over a plurality of parallel data paths between a source DPU and a destination DPU of the set of DPUs 17 connected by network fabric 14 having core switches 22 (630). For a particular packet flow, the source DPU comprises the one of DPUs 17 that is coupled to a source server of the packet flow, and the destination DPU comprises the one of the DPUs 17 that is coupled to a destination server of the packet flow.

Once the rFCP tunnel 44 is established, the source DPU may receive outbound packets associated with the same packet flow from the source server, e.g., one of storage nodes 12 or compute nodes 13. In response, a sender node (e.g., a SF component 30) of the source DPU sprays rFCP packets of the packet flow, including packet sequence numbers that indicate an order of the rFCP packets in the packet flow, across the plurality of parallel data paths of the rFCP tunnel 44 to a receiver node (e.g., a DF component 36) of the destination DPU by directing each of the rFCP packets to one of the parallel data paths (632).

In response to receipt of at least a portion of the rFCP packets of the packet flow, the receiver node of the destination DPU detects a missing packet of the packet flow based on the packet sequence numbers of the received portion of the rFCP packets (634). The receiver node then sends a rFCP negative acknowledgment (NACK) message indicating the missing packet (636). In response to receipt of the rFCP NACK message, the sender node of the source DPU retransmits the missing packet of the packet flow to the receiver node of the destination DPU (638).

In one example, the rFCP NACK message indicates the missing packet with an ACK for a last received rFCP packet of the packet flow and a set NACK flag. In that example, in response to receipt of the set NACK flag, the sender node retransmits the missing packet as a last unacknowledged rFCP packet of the packet flow. In another example, the rFCP NACK message indicates the missing packet with a bit vector including a set bit corresponding to a relative position of an expected packet sequence number of the missing packet within the packet flow. In that example, in response to receipt of the bit vector, the sender node selectively retransmits the missing packet as identified in the bit vector.

In one scenario, each rFCP packet of the packet flow includes a current path number (CPN) that identifies one path of the plurality of parallel data paths on which the respective rFCP packet is to be sent, and a preceding path number (PPN) that identifies another path of the plurality of parallel data paths on which a preceding rFCP packet of the packet flow was sent. In that scenario, the receiver node may identify a path of the plurality of parallel data paths on which the missing packet was sent based on a PPN of a subsequent rFCP packet that immediately follows the missing packet in the packet flow, and send the rFCP NACK message to the sender node on any path of the plurality of parallel data paths except the path identified by the PPN. The receiver node may then include the PPN of the subsequent rFCP packet in an avoid path number (APN) field of the rFCP NACK message. In that case, the sender node may retransmit the missing packet of the packet flow to the receiver node on any path of the plurality of parallel data paths except the path identified in the APN.

In some examples, the receiver node of the destination DPU may detect the missing packet of the packet flow via a reorder timeout when the receiver node is unable to reorder the received portion of the rFCP packets based on the packet sequence numbers of the received portion of the rFCP packets. In other examples, the receiver node may monitoring a frequency of reorder timeouts on each path of the plurality of parallel data paths and, in the case where the frequency of reorder timeouts for a given path is greater than a threshold, send a notification to sender nodes of the plurality of DPUs 17 connected to the destination DPU by the rFCP tunnel 44 to avoid use of the given path.

In further examples, the sender node of the source DPU may detect a missing rFCP NACK or rFCP ACK message via a retransmit timeout when the sender node does not receive the rFCP NACK or rFCP ACK message for a last unacknowledged rFCP packet of the packet flow and, in response to the retransmit timeout, retransmit the last unacknowledged rFCP packet with a set retransmit flag to the receiver node. In response to receipt of the retransmitted rFCP packet with the set retransmit flag, the receiver node of the destination DPU may transmit the missing rFCP NACK or rFCP ACK message to the sender node.

Figure 22:
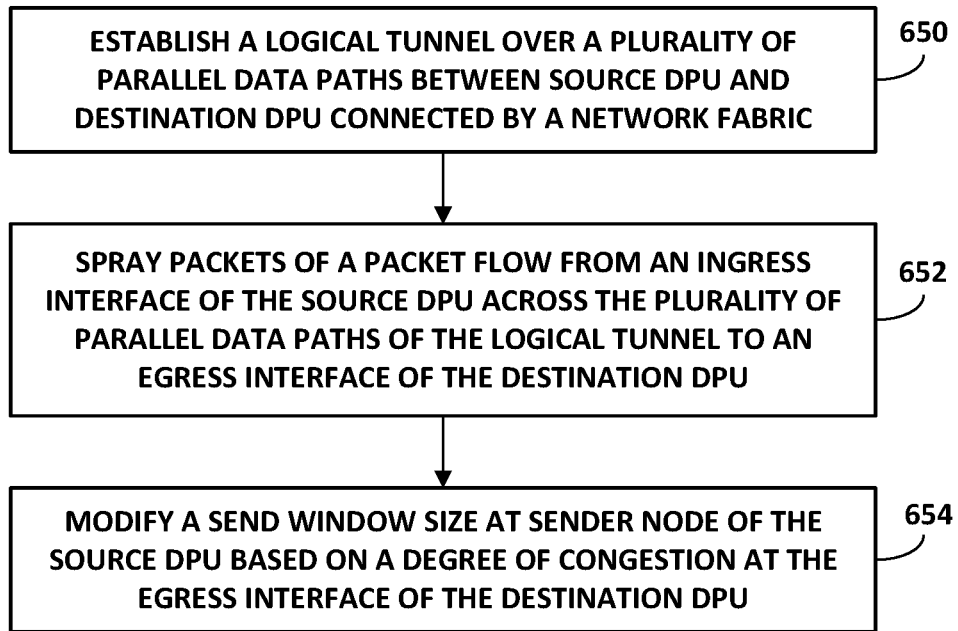
FIG. 22 is a flow chart illustrating an example operation of using congestion control mechanisms to modify a send window size while spraying packets using either a solicited or unsolicited mode of rFCP between a source DPU and a destination DPU, in accordance with the techniques described herein.

FIG. 22 is a flow chart illustrating an example operation of using congestion control mechanisms to modify a send window size while spraying packets using FCP or rFCP between a source DPU and a destination DPU, in accordance with the techniques described herein. The operation of FIG. 22 is described with respect to network system 8 of FIG. 1, including servers (i.e., storage nodes 12 and compute nodes 13), DPUs 17, and network fabric 14 of data center 10; and with respect to the multi-level network fanout of FIG. 3, including logical tunnel 44 and core switches 22 in network fabric 14 between DPUs 17. Nevertheless, the techniques illustrated by FIG. 22 are readily applicable to the other example network implementations described herein.

As shown in this example, a set of DPUs 17 exchange control plane messages to establish a logical tunnel 44 over a plurality of parallel data paths between a source DPU and a destination DPU of the set of DPUs 17 connected by network fabric 14 having core switches 22 (650). For a particular packet flow, the source DPU comprises the one of DPUs 17 that is coupled to a source server of the packet flow, and the destination DPU comprises the one of the DPUs 17 that is coupled to a destination server of the packet flow.

Once the logical tunnel is established, the source DPU may receive outbound packets associated with the same packet flow from the source server, e.g., one of storage nodes 12 or compute nodes 13. In response, a sender node (e.g., a SF component 30) of the source DPU sprays packets of the packet flow from an ingress interface of the source DPU across the plurality of parallel data paths of the logical tunnel 44 to an egress interface of the destination DPU by directing each of the packets to one of the parallel data paths (652). For example, the sender node of the source DPU may spray the packets of the packet flow to the destination DPU until an amount of data in flight is equal to a send window size. While spraying the packets of the packet flow, the sender node of the source DPU also continuously modifies the send window size based on a degree of congestion at the egress interface of the destination DPU (654).

In some examples, the sender node of the source DPU is configured to determine the degree of congestion at the egress interface of the destination DPU. In a first scenario, the sender node may measure round-trip latency from the source DPU to the destination DPU and back to the source DPU, and determine the degree of congestion at the egress interface of the destination DPU based on the round-trip latency or round-trip latency variation. In a second scenario, the sender node may receive a message from a receiver node (e.g., a DF component 36) of the destination DPU indicating the degree of congestion at the egress interface of the destination DPU.

In other examples, the receiver node of the destination DPU is configured to determine the degree of congestion at the egress interface of the destination DPU, and send a message to the sender node of the source DPU indicating the degree of congestion at the egress interface. In a first scenario, the receiver node may measure an amount of bandwidth at the egress interface of the destination DPU, and determine the degree of congestion at the egress interface based on a comparison of the measured amount of bandwidth to a maximum bandwidth for the egress interface of the destination DPU. In a second scenario, the receiver node may measure a length of a queue maintained at the receiver node of the destination DPU to receive the packets from the sender node of the source DPU, and determine the degree of congestion at the egress interface of the destination DPU based on the length of the queue increasing. In a third scenario, the receiver node may measure one-way latency from the source DPU to the destination DPU, and determine the degree of congestion at the egress interface of the destination DPU based on the one-way latency or one-way latency variation.

In a fourth scenario, the receiver node may identify one or more failed paths of the plurality of parallel data paths with the logical tunnel 44 between the source DPU and the destination DPU, and determine the degree of congestion at the egress interface of the destination DPU based on a number of the failed paths within the logical tunnel 44. In a fifth scenario, when the source DPU and the destination DPU are each executing the FCP or the rFCP extension, the receiver node may send an FCP grant message or an rFCP grant/ACK message to the sender node of the source DPU including congestion control information as the message indicating the degree of congestion at the egress interface of the destination DPU.

Various examples have been described. These and other examples are within the scope of the following claims.

What is claimed is:

1. A network system comprising:
a plurality of servers including a source server and a destination server;
a network fabric comprising a plurality of core switches; and
a plurality of data processing units (DPUs) including a source DPU coupled to the source server and a destination DPU coupled to the destination server, wherein the source DPU and the destination DPU are each executing a reliable fabric control protocol (rFCP) extension, and wherein the source DPU and the destination DPU are configured to establish a rFCP tunnel over a plurality of parallel data paths across the core switches included within the network fabric between the source DPU and the destination DPU,
wherein a sender node of the source DPU is configured to spray rFCP packets of a packet flow across the plurality of parallel data paths of the rFCP tunnel to a receiver node of the destination DPU by directing each of the rFCP packets to one of the parallel data paths, wherein the rFCP packets of the packet flow include packet sequence numbers that indicate an order of the rFCP packets,
wherein the receiver node is configured to, in response to receipt of at least a portion of the rFCP packets of the packet flow, detect a missing packet of the packet flow based on the packet sequence numbers of the received portion of the rFCP packets, and send a rFCP negative acknowledgment (NACK) message indicating the missing packet,
wherein the rFCP NACK message includes an avoid path number (APN) field, and
wherein the sender node is configured to, in response to receipt of the rFCP NACK message, retransmit the missing packet of the packet flow to the receiver node on any path of the plurality of parallel data paths except the path identified in the APN field.

2. The network system of claim 1,
wherein the rFCP NACK message indicates the missing packet with an acknowledgment (ACK) for a last received rFCP packet of the packet flow and a set NACK flag; and wherein, in response to receipt of the set NACK flag, the sender node retransmits the missing packet as a last unacknowledged rFCP packet of the packet flow.

3. The network system of claim 1,
wherein the rFCP NACK message indicates the missing packet with a bit vector including a set bit corresponding to a relative position of an expected packet sequence number of the missing packet within the packet flow; and
wherein, in response to receipt of the bit vector, the sender node selectively retransmits the missing packet as identified in the bit vector.

4. The network system of claim 1, wherein each rFCP packet of the packet flow includes a current path number (CPN) that identifies one path of the plurality of parallel data paths on which the respective rFCP packet is to be sent, and a preceding path number (PPN) that identifies another path of the plurality of parallel data paths on which a preceding rFCP packet of the packet flow was sent.

5. The network system of claim 4, wherein the receiver node:
identifies a path of the plurality of parallel data paths on which the missing packet was sent based on a PPN of a subsequent rFCP packet that immediately follows the missing packet in the packet flow; and
sends the rFCP NACK message to the sender node on any path of the plurality of parallel data paths except the path identified by the PPN.

6. The network system of claim 5,
wherein the receiver node includes the PPN of the subsequent rFCP packet in the APN field of the rFCP NACK message.

7. The network system of claim 1, wherein the receiver node detects the missing packet of the packet flow via a reorder timeout when the receiver node is unable to reorder the received portion of the rFCP packets based on the packet sequence numbers of the received portion of the rFCP packets.

8. The network system of claim 1, wherein the receiver node of the destination DPU is configured to:
monitor a frequency of reorder timeouts on each path of the plurality of parallel data paths; and
upon determining that the frequency of reorder timeouts for a given path is greater than a threshold, send a notification to sender nodes of DPUs connected to the destination DPU by the rFCP tunnel to avoid use of the given path.

9. The network system of claim 1, wherein the sender node is configured to:
detect a missing rFCP NACK or rFCP acknowledgment (ACK) message via a retransmit timeout when the sender node does not receive the rFCP NACK or rFCP ACK message for a last unacknowledged rFCP packet of the packet flow; and
in response to the retransmit timeout, retransmit the last unacknowledged rFCP packet with a set retransmit flag to the receiver node.

10. The network system of claim 9, wherein the receiver node is configured to, in response to receipt of the retransmitted rFCP packet with the set retransmit flag, transmit the missing rFCP NACK or rFCP ACK message to the sender node.

11. The network system of claim 1,
wherein the sender node of the source DPU has full mesh connectivity to a subset of DPUs included in a logical rack as a first-level network fanout, and wherein the sender node is configured to spray the rFCP packets of the packet flow across the first-level network fanout to the subset of the DPUs included in the logical rack; and
wherein each of the DPUs has full mesh connectivity to a subset of the core switches as a multi-level network fanout, and wherein each of the subset of the DPUs included in the logical rack is configured to spray the rFCP packets of the packet flow across the multi-level network fanout to the subset of the core switches.

12. A method comprising:
establishing a reliable fabric control protocol (rFCP) tunnel over a plurality of parallel data paths between a source data processing unit (DPU) and a destination DPU connected by a network fabric having a plurality of core switches, wherein the source DPU is coupled to a source server and the destination DPU is coupled to a destination server, and wherein the source DPU and the destination DPU are each executing a rFCP extension;
spraying, by a sender node of the source DPU, rFCP packets of a packet flow across the plurality of parallel data paths of the rFCP tunnel to a receiver node of the destination DPU by directing each of the rFCP packets to one of the parallel data paths, wherein the rFCP packets of the packet flow include packet sequence numbers that indicate an order of the rFCP packets;
in response to receipt of at least a portion of the rFCP packets of the packet flow:
detecting, by the receiver node, a missing packet of the packet flow based on the packet sequence numbers of the received portion of the rFCP packets, and
sending, by the receiver node, a rFCP negative acknowledgment (NACK) message indicating the missing packet, wherein the rFCP NACK message includes an avoid path number (APN) field; and
in response to receipt of the rFCP NACK message, retransmitting, by the sender node, the missing packet of the packet flow to the receiver node on any path of the plurality of parallel data paths except the path identified in the APN field.

13. The method of claim 12,
wherein the rFCP NACK message indicates the missing packet with an acknowledgment (ACK) for a last received rFCP packet of the packet flow and a set NACK flag; and
wherein retransmitting the missing packet comprises, in response to receipt of the set NACK flag, retransmitting, by the sender node, the missing packet as a last unacknowledged rFCP packet of the packet flow.

14. The method of claim 12,
wherein the rFCP NACK message indicates the missing packet with a bit vector including a set bit corresponding to a relative position of an expected packet sequence number of the missing packet within the packet flow; and
wherein retransmitting the missing packet comprises, in response to receipt of the bit vector, selectively retransmitting, by the sender node, the missing packet as identified in the bit vector.

15. The method of claim 12, wherein each rFCP packet of the packet flow includes a current path number (CPN) that identifies one path of the plurality of parallel data paths on which the respective rFCP packet is to be sent, and a preceding path number (PPN) that identifies another path of the plurality of parallel data paths on which a preceding rFCP packet of the packet flow was sent.

16. The method of claim 15, further comprising:
identifying, by the receiver node, a path of the plurality of parallel data paths on which the missing packet was sent based on a PPN of a subsequent rFCP packet that immediately follows the missing packet in the packet flow, and
wherein sending the rFCP NACK message comprises sending, by the receiver node, the rFCP NACK message to the sender node on any path of the plurality of parallel data paths except the path identified by the PPN.

17. The method of claim 16,
wherein the receiver node includes the PPN of the subsequent rFCP packet in the APN field of the rFCP NACK message.

18. The method of claim 12, wherein detecting the missing packet comprises detecting, by the receiver node, the missing packet of the packet flow via a reorder timeout when the receiver node is unable to reorder the received portion of the rFCP packets based on the packet sequence numbers of the received portion of the rFCP packets.

19. The method of claim 12, further comprising:
monitoring, by the receiver node, a frequency of reorder timeouts on each path of the plurality of parallel data paths; and
upon determining that the frequency of reorder timeouts for a given path is greater than a threshold, sending, by the receiver node, a notification to sender nodes of DPUs connected to the destination DPU by the FCP tunnel to avoid use of the given path.

20. The method of claim 12, further comprising:
detecting, by the sender node, a missing rFCP NACK or rFCP acknowledgment (ACK) message via a retransmit timeout when the sender node does not receive the rFCP NACK or rFCP ACK message for a last unacknowledged rFCP packet of the packet flow; and
in response to the retransmit timeout, retransmitting, by the sender node, the last unacknowledged rFCP packet with a set retransmit flag to the receiver node.

21. The method of claim 20, further comprising, in response to receipt of the retransmitted rFCP packet with the set retransmit flag, transmitting, by the receiver node, the missing rFCP NACK or rFCP ACK message to the sender node.

22. A computer-readable storage medium storing instructions that, when executed, cause one or more programmable processor to:
establish a reliable fabric control protocol (rFCP) tunnel over a plurality of parallel data paths between a source data processing unit (DPU) and a destination DPU connected by a network fabric having a plurality of core switches, wherein the source DPU is coupled to a source server and the destination DPU is coupled to a destination server, and wherein the source DPU and the destination DPU are each executing a rFCP extension;
spray, by a sender node of the source DPU, rFCP packets of a packet flow across the plurality of parallel data paths of the rFCP tunnel to a receiver node of the destination DPU by directing each of the rFCP packets to one of the parallel data paths, wherein the rFCP packets of the packet flow include packet sequence numbers that indicate an order of the rFCP packets;
in response to receipt of at least a portion of the rFCP packets of the packet flow:
detect, by the receiver node, a missing packet of the packet flow based on the packet sequence numbers of the received portion of the rFCP packets, and
send, by the receiver node, a rFCP negative acknowledgment (NACK) message indicating the missing packet, wherein the rFCP NACK message includes an avoid path number (APN) field; and
in response to receipt of the rFCP NACK message, retransmit, by the sender node, the missing packet of the packet flow to the receiver node on any path of the plurality of parallel data paths except the path identified in the APN field.

* * * * *